United States Patent
Prammer

(10) Patent No.: US 9,422,808 B2
(45) Date of Patent: *Aug. 23, 2016

(54) RELIABLE DOWNHOLE DATA TRANSMISSION SYSTEM

(71) Applicant: Martin Scientific, LLC, Downingtown, PA (US)

(72) Inventor: Manfred G. Prammer, Downingtown, PA (US)

(73) Assignee: Martin Scientific, LLC, Downington, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/818,928

(22) Filed: Aug. 5, 2015

(65) Prior Publication Data

US 2015/0337651 A1    Nov. 26, 2015

Related U.S. Application Data

(63) Continuation of application No. 14/193,556, filed on Feb. 28, 2014, now Pat. No. 9,133,707, which is a
(Continued)

(51) Int. Cl.
*E21B 47/13* (2012.01)
*E21B 47/12* (2012.01)
(Continued)

(52) U.S. Cl.
CPC .......... *E21B 47/122* (2013.01); *E21B 17/003* (2013.01); *E21B 17/028* (2013.01); *E21B 47/06* (2013.01); *E21B 47/065* (2013.01); *E21B 49/00* (2013.01); *G01V 11/002* (2013.01)

(58) Field of Classification Search
CPC .............................. E21B 47/12; E21B 47/122
See application file for complete search history.

(56) References Cited

U.S. PATENT DOCUMENTS 2,000,716 A    5/1935    Polk
2,370,818 A    7/1942    Silverman
(Continued)

FOREIGN PATENT DOCUMENTS

EP            0481865 B1    3/1996
WO    WO 2004/113677    12/2004
(Continued)

OTHER PUBLICATIONS

American Petroleum Institute, "Specification for Rotary Drill Stem Elements—API Specification 7", 40th edition, Nov. 2001, API Publishing Services, Washington, DC, Fig. 16 and Table 16, pp. 24-25.
(Continued)

*Primary Examiner* — Frederick L Lagman
(74) *Attorney, Agent, or Firm* — Baker & Hostetler LLP

(57) ABSTRACT

A downhole signal transmission system provides electric radiofrequency signals that are coupled to electrically conductive or non-conductive fluids through electrical insulators. A plurality of signal repeaters are tuned to the frequencies of the radiofrequency signals, and a plurality of transmission lines terminated by resonance circuits are also provided such that the terminating resonance circuits resonate on the frequencies of the electric radiofrequency signals. The plurality of signal repeaters and plurality of transmission elements are arranged to be redundant such that a failure of one or more of the signal repeaters or a failure of one or more of the transmission elements does not substantially affect the operation of the data transmission system. The signal repeaters and transmission elements also are arranged such that a failure of any of the signal repeaters or a failure of any of the transmission elements is communicated to the surface.

41 Claims, 61 Drawing Sheets

Related U.S. Application Data continuation of application No. 13/546,059, filed on Jul. 11, 2012, now Pat. No. 8,704,677, which is a continuation of application No. 12/470,842, filed on May 22, 2009, now Pat. No. 8,242,928.

(60) Provisional application No. 61/206,550, filed on Feb. 2, 2009, provisional application No. 61/128,582, filed on May 23, 2008.

(51) Int. Cl.
  *E21B 47/06* (2012.01)
  *E21B 49/00* (2006.01)
  *E21B 17/00* (2006.01)
  *E21B 17/02* (2006.01)
  *G01V 11/00* (2006.01)

(56) References Cited

U.S. PATENT DOCUMENTS

| | | |
|---|---|---|
| 2,379,800 A | 7/1945 | Hare |
| 3,090,031 A | 5/1963 | Lord |
| 3,170,137 A | 2/1965 | Brandt |
| 3,186,222 A * | 6/1965 | Martin .................. E21B 47/122 340/853.6 |
| 3,518,608 A | 6/1970 | Papadopoulos |
| 3,713,089 A | 1/1973 | Clacomb |
| 3,805,606 A | 4/1974 | Stelzer et al. |
| 3,958,217 A | 5/1976 | Spinnler |
| 4,087,781 A | 5/1978 | Grossi et al. |
| 4,215,426 A | 7/1980 | Klatt |
| 4,220,381 A | 9/1980 | van der Graaf |
| 4,266,606 A | 5/1981 | Stone |
| 4,283,779 A | 8/1981 | Lamel |
| 4,375,310 A | 3/1983 | Robinson et al. |
| 4,387,372 A | 6/1983 | Smith et al. |
| 4,445,734 A | 5/1984 | Cunningham |
| 4,605,268 A | 8/1986 | Meador |
| 4,788,544 A | 11/1988 | Howard |
| 4,792,802 A | 12/1988 | Meadows |
| 4,914,433 A | 4/1990 | Galle |
| 6,123,561 A | 9/2000 | Turner et al. |
| 6,392,317 B1 | 5/2002 | Hall et al. |
| 6,670,880 B1 | 12/2003 | Hall et al. |
| 6,727,707 B2 | 4/2004 | Sinclair et al. |
| 6,821,147 B1 | 11/2004 | Hall et al. |
| 6,830,467 B2 | 12/2004 | Hall et al. |
| 6,913,093 B2 | 7/2005 | Hall et al. |
| 6,929,493 B2 | 8/2005 | Hall et al. |
| 6,945,802 B2 | 9/2005 | Hall et al. |
| 6,950,034 B2 | 9/2005 | Pacault et al. |
| 6,958,704 B2 | 10/2005 | Vinegar et al. |
| 6,968,611 B2 | 11/2005 | Hall et al. |
| 6,981,546 B2 | 1/2006 | Hall et al. |
| 6,982,384 B2 | 1/2006 | Hall et al. |
| 6,991,035 B2 | 1/2006 | Hall et al. |
| 6,992,554 B2 | 1/2006 | Hall et al. |
| 7,002,445 B2 | 2/2006 | Hall et al. |
| 7,017,667 B2 | 3/2006 | Hall et al. |
| 7,019,665 B2 | 3/2006 | Hall et al. |
| 7,025,130 B2 | 4/2006 | Bailey et al. |
| 7,040,003 B2 | 5/2006 | Hall |
| 7,041,908 B2 | 5/2006 | Hall et al. |
| 7,053,788 B2 | 5/2006 | Hall et al. |
| 7,064,676 B2 | 6/2006 | Hall et al. |
| 7,069,999 B2 | 7/2006 | Hall et al. |
| 7,080,998 B2 | 7/2006 | Hall et al. |
| 7,091,810 B2 | 8/2006 | Hall et al. |
| 7,093,654 B2 | 8/2006 | Hall et al. |
| 7,096,961 B2 | 8/2006 | Clark et al. |
| 7,098,767 B2 | 8/2006 | Hall et al. |
| 7,098,802 B2 | 8/2006 | Hall et al. |
| 7,114,970 B2 | 10/2006 | Head |
| 7,116,199 B2 | 10/2006 | Hall et al. |
| 7,139,218 B2 | 11/2006 | Hall et al. |
| 7,142,129 B2 | 11/2006 | Hall et al. |
| 7,156,676 B2 | 1/2007 | Reynolds, Jr. |
| 7,190,280 B2 | 3/2007 | Hall et al. |
| 7,193,526 B2 * | 3/2007 | Hall .................. E21B 47/01 166/242.6 |
| 7,193,527 B2 | 3/2007 | Hall et al. |
| 7,198,118 B2 | 4/2007 | Hall et al. |
| 7,200,070 B2 | 4/2007 | Hall et al. |
| 7,201,240 B2 | 4/2007 | Hall et al. |
| 7,207,396 B2 | 4/2007 | Hall et al. |
| 7,224,288 B2 | 5/2007 | Hall et al. |
| 7,228,902 B2 | 6/2007 | Oppelt |
| 7,243,717 B2 | 7/2007 | Hall et al. |
| 7,248,177 B2 | 7/2007 | Hall et al. |
| 7,252,160 B2 | 8/2007 | Dopf et al. |
| 7,253,745 B2 | 8/2007 | Hall et al. |
| 7,268,697 B2 | 9/2007 | Hall et al. |
| 7,275,597 B2 | 10/2007 | Hall et al. |
| 7,277,026 B2 | 10/2007 | Hall et al. |
| 7,291,303 B2 | 11/2007 | Hall et al. |
| 7,298,286 B2 | 11/2007 | Hall et al. |
| 7,298,287 B2 | 11/2007 | Hall et al. |
| 7,299,867 B2 | 11/2007 | Hall et al. |
| 7,319,410 B2 | 1/2008 | Hall et al. |
| 7,362,235 B1 | 4/2008 | Normann et al. |
| 7,400,262 B2 | 7/2008 | Chemali et al. |
| 7,453,768 B2 | 11/2008 | Hall et al. |
| 7,525,264 B2 | 4/2009 | Dodge |
| 7,535,377 B2 | 5/2009 | Hall et al. |
| 7,777,644 B2 | 8/2010 | Madhavan et al. |
| 7,806,191 B2 | 10/2010 | Braden et al. |
| 7,852,232 B2 | 12/2010 | Hall et al. |
| 8,033,329 B2 | 10/2011 | Montgomery et al. |
| 8,049,506 B2 | 11/2011 | Lazarev |
| 8,072,347 B2 | 12/2011 | Santoso et al. |
| 8,109,329 B2 | 2/2012 | Bray et al. |
| 8,115,495 B2 | 2/2012 | Harmon |
| 8,118,093 B2 | 2/2012 | Hassell et al. |
| 8,120,508 B2 | 2/2012 | Madhavan et al. |
| 8,130,118 B2 | 3/2012 | Hall et al. |
| 8,242,928 B2 | 8/2012 | Prammer |
| 8,704,677 B2 * | 4/2014 | Prammer .............. E21B 17/003 340/853.7 |
| 8,941,384 B2 * | 1/2015 | Prammer .............. E21B 17/003 324/338 |
| 9,133,707 B2 * | 9/2015 | Prammer .............. E21B 17/003 |
| 2004/0124994 A1 | 7/2004 | Oppelt |
| 2004/0150533 A1 | 8/2004 | Hall et al. |
| 2004/0217880 A1 | 11/2004 | Clark et al. |
| 2005/0001735 A1 | 1/2005 | Hall et al. |
| 2005/0067159 A1 * | 3/2005 | Hall .................. E21B 17/003 166/65.1 |
| 2005/0207279 A1 | 9/2005 | Chemali et al. |
| 2005/0212530 A1 | 9/2005 | Hall et al. |
| 2006/0050820 A1 | 3/2006 | Kawada et al. |
| 2006/0254764 A1 | 11/2006 | Zuilekom |
| 2007/0024217 A1 | 2/2007 | Dodge |
| 2007/0247328 A1 | 10/2007 | Petrovic et al. |
| 2008/0247273 A1 | 10/2008 | Chemali et al. |
| 2011/0048692 A1 * | 3/2011 | Ross .................. E21B 47/01 166/66 |
| 2012/0176138 A1 | 7/2012 | Prammer |

FOREIGN PATENT DOCUMENTS

| | | |
|---|---|---|
| WO | WO 2009/143409 | 11/2009 |
| WO | WO 2010/078197 A1 | 7/2010 |

OTHER PUBLICATIONS

Archer, J.C., "Electric Logging Experiments Develop Attachments for Use on Rotary Rigs", The Oil Weekly, Jul. 15, 1935, 5 pages.

Arps, J.J. and Arps, J.L., "The Subsurface Telemetry Problem—A Practical Solution", Journal of Petroleum Technology, May 1964, pp. 487-493.

Bourgoyne, Jr. et al., "Applied Drilling Engineering", SPE Textbook Series, vol. 2, Society of Petroleum Engineers, Richardson, TX, 1991, Chapter 1: Rotary Drilling Process, 42 pages.

(56) References Cited

OTHER PUBLICATIONS

Denison, E.B., "High Data-Rate Drilling Telemetry System", Journal of Petroleum Technology, Feb. 1979, 31(2), 155-163.
Devereux, S., "Drilling Technology in Nontechnical Language", Penn Well Corp., Tulsa, OK, 1999, Chapter 5: Rig Selection and Rig Equipment, 22 pages.
"DuPont Pyralux AP All-Polyirnide Flexible Laminate," data sheet, Mar. 2001, DuPont Electronic Materials, Research Triangle Park, NC 27709-4425, 8 pages.
Economides et al., "Petroleum Well Construction", Watters and Dunn-Norman, John Wiley & Sons, West Sussex, UK, 1998, Chapter 1: Introduction to Drilling and Well Completions, 28 pages.
"High Performance Lithium Cell—Size 1/2 AAA P/N:4037 10-25-150," data sheet, Electrochem, Clarence, NY, Jan. 2006, 1 page.
Patton, B.J. et al., "Development and Successful Testing of a ContinuousWave, Logging-While-Drilling Telemetry System," Journal of Petroleum Technology, Oct. 1977, 7 pages.
Pixton, D.S., "Very high-speed drill string communications network—Report# 41229R06", Novatek Engineering, Provo, UT, Mar. 2003, 10 pages.
Pixton, D.S., "Very high-speed drill string communications network—Report# 41229R14", Novatek Engineering, Provo, UT, Jun. 2005, 59 pages.
Pohlmann, Ken C., "Principles of Digital Audio," $6^{th}$ Ed., McGraw-Hill, New York, 2011, Chapters 7 and 8, 123 pages.
Prammer et al., "Field Testing of an Advanced LWD Imaging Resistivity Tool", Society of Petrophysicists and Well-Log Analysts 48th Annual Loggings Symposium, Jun. 3-6, 2007, Austin, TX, 1-15.
"Recommended Practice for Drill Stern Design and Operating Limits—API Recommended Practice 7G," 16th Edition, Aug. 1998, American Petroleum Institute, API Publishing Services, Washington, DC., 30 pages.
"Recommended Practice for Drill Stern Design and Operating Limits—Addendum 1," Nov. 2003, American Petroleum Institute, API Publishing Services, Washington, DC., 30 pages.
Robinson, L.H., "Exxon completes wireline drilling data telemetry system", Oil & Gas Journal, Apr. 14, 1980, 137-149.
Seaton et al., "New MWD-Gamma system finds many field applications", Oil & Gas Journal, Feb. 21, 1983, 80-84.
Shokrollahi, A., "Raptor Codes", IEEE Transactions on Information Theory, Jun. 2006, 52(6), 2551-2567.
"TK-34XT," brochure, 2006, Tuboscope, Houston, TX 77051, 2 pages.
"TK-236," brochure, 2006, Tuboscope, Houston, TX 77051, 1 page.

\* cited by examiner

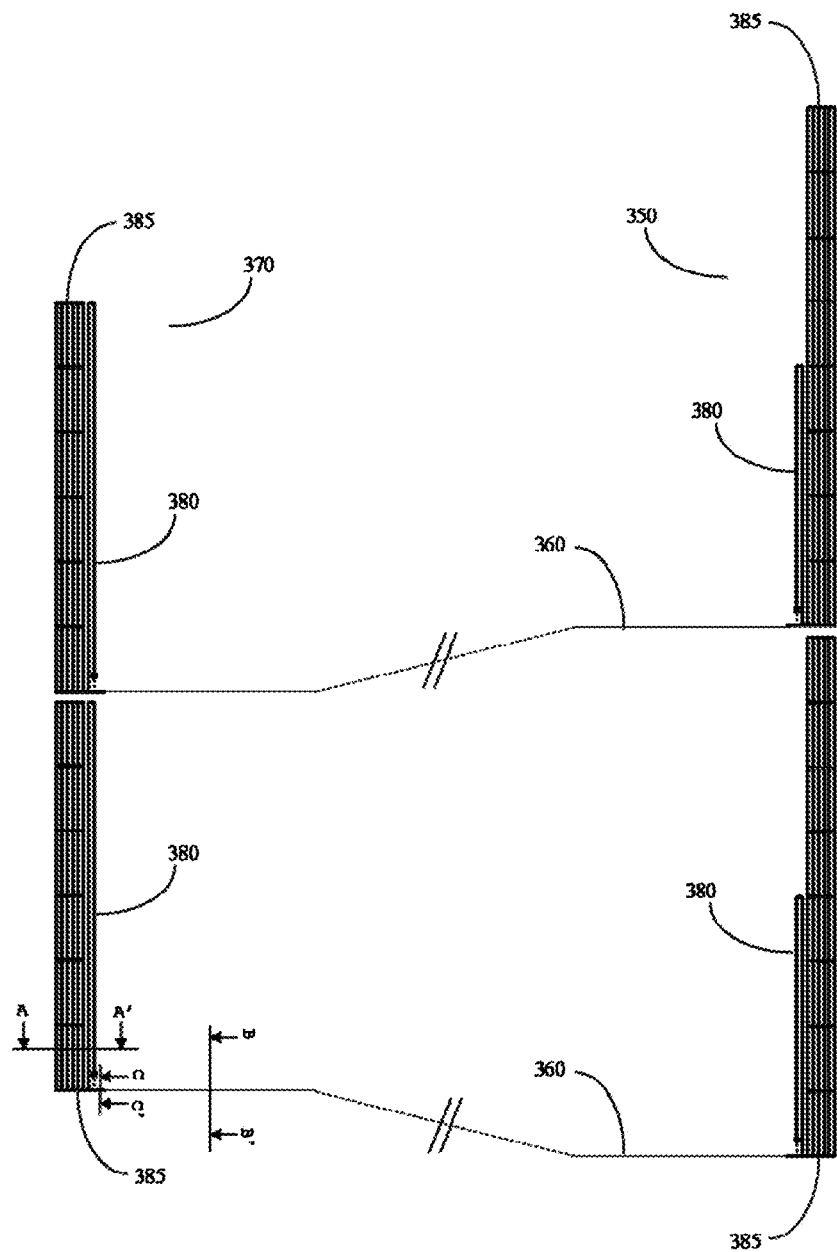
Fig. 11a (not to scale)

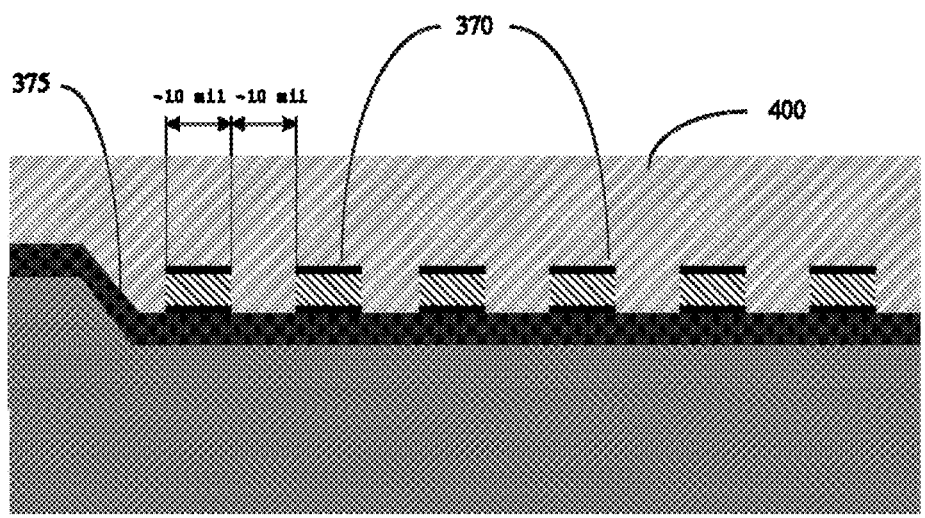
A - A'
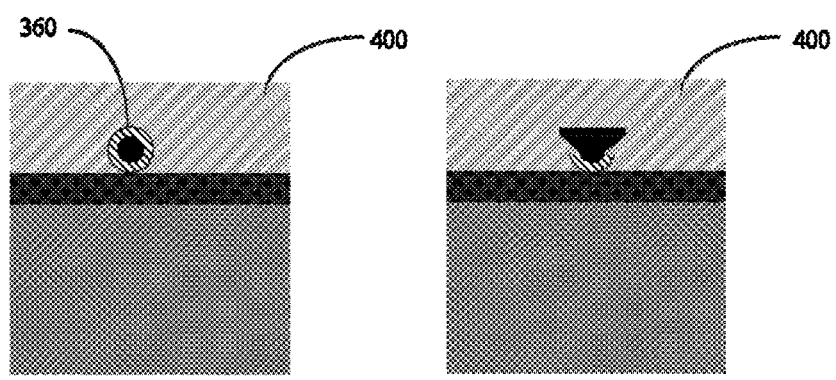
B - B'    C - C'
Fig. 11b

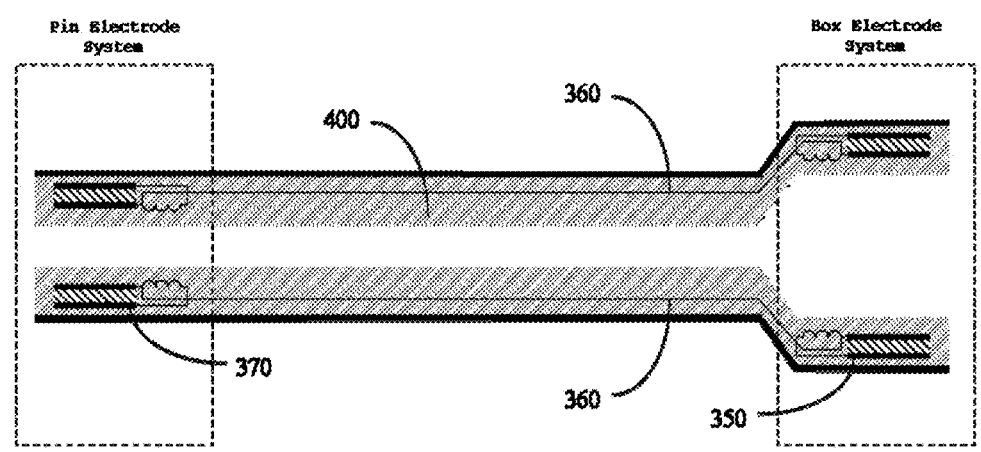
Fig. 12 (not to scale)

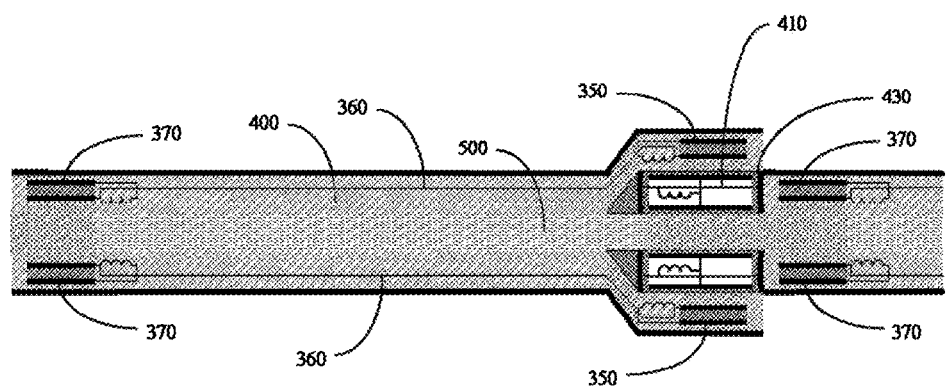
Fig. 18 (not to scale)
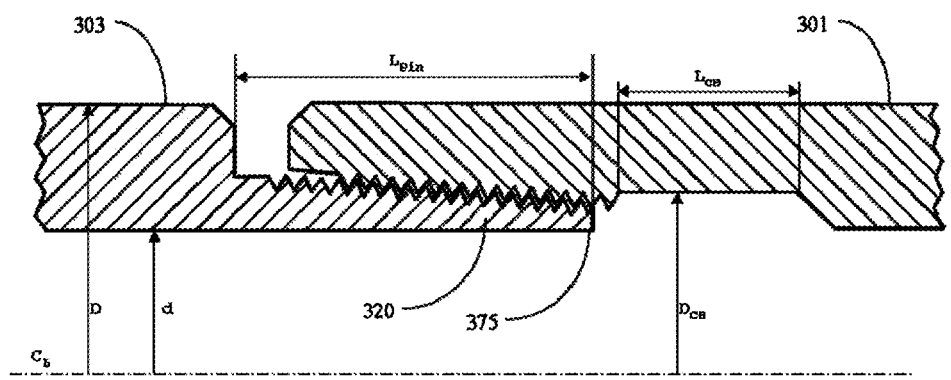
Fig. 19

RELIABLE DOWNHOLE DATA TRANSMISSION SYSTEM

CROSS-REFERENCE TO RELATED APPLICATIONS

The present application is a continuation of U.S. patent application Ser. No. 14/193,556, filed Feb. 28, 2014, now U.S. Pat. No. 9,133,707 issued Sep. 15, 2015, which is a continuation of U.S. patent application Ser. No. 13/546,059 filed Jul. 11, 2012, now U.S. Pat. No. 8,704,677 issued Apr. 22, 2014, which is a continuation of U.S. patent application Ser. No. 12/470,842, filed May 22, 2009, now U.S. Pat. No. 8,242,928 issued Aug. 14, 2012, which, in turn, claims priority under 35 U.S.C. §119(e) to U.S. Provisional Patent Application Nos. 61/128,582, filed May 23, 2008, and 61/206,550, filed Feb. 2, 2009. The contents of these applications are hereby incorporated by reference in their entireties.

TECHNICAL FIELD

The present invention relates to the field of data transmission systems, in particular to data transmission systems suitable for downhole use, such as on a drill string used in oil and gas exploration, on completion strings, or on casing strings. The present invention is especially useful for obtaining downhole data or measurements while drilling as well as sending commands from the surface to downhole drilling equipment or sensing instrumentation.

BACKGROUND

There are a number of textbooks available that describe the processes involved in drilling for oil and gas. Examples of such textbooks are "Petroleum Well Construction" by Economides, Watters and Dunn-Norman, John Wiley & Sons, West Sussex, UK, 1998; "Applied Drilling Engineering" by Bourgoyne, Jr., Chenevert, Millhelm and Young, Jr., SPE Textbook Series, Vol. 2, Society of Petroleum Engineers, Richardson, Tex., 1991; or "Drilling Technology—In Nontechnical Language" by S. Devereux, PennWell Corp., Tulsa, Okla., 1999. Reference may be made to these textbooks for an understanding of general drilling processes.

A drilling operation suitable for implementing the present invention is shown in FIG. 1. The drill rig 10 drives a drill string 20, which is composed of a large number of interconnected sections 30, called pipe joints. The bottom of the drill string is composed of heavy-weight pipe sections 40, called drill collars. In a typical drilling operation, the rig rotates the drill string and thus the bottom hole assembly (BHA) 50. The BHA 50 may contain various instrumentation packages, possibly a mud motor or a rotary-steerable tool, stabilizers, centralizers, drill collars and the drill bit 60. The drill string and all downhole components are hollow, allowing for drilling fluids to be pumped from the surface to the bit, with the drilling fluid returning to the surface in the outer annulus between the drill string and the formation for cleaning and re-circulation. The drill string 20 may contain additional sections of heavy-weight drill pipe and/or specialized equipment such as drilling jars.

The two most common drive systems are the rotary-table system and the top-drive system. The rotary-table system, shown in FIG. 1, engages the drill string through the kelly bushing 65 and the kelly 70, causing the drill string 20 to rotate while the kelly 70 is free to move up and down as the pipe is lowered into the ground or is lifted from the borehole. As the borehole deepens, pipe joints 30 are periodically added to the top of the drill string 20 by means of rotary shoulder connections that provide mechanical strength and hydraulic seals. A top-drive system does not require a kelly 70; instead, the entire drive mechanism moves up and down with the top end of the drill string 20. A top-drive system facilitates and accelerates the drilling process; however, it is also more expensive than a rotary-table system.

FIG. 2 shows a commonly used pipe joint 30 comprising a "box" tool joint 301 at the top, a long tubular pipe body 302 and a "pin" tool joint 303 at the bottom. A typical length for a pipe joint is 31 ft. Both pin 303 and box 301 are equipped with conical threads that, when joined, form a rotary connection. The two primary purposes of the connection are the transmission of mechanical forces such as torque, tension and compression between pipe joints 30 and to provide a liquid-tight metal-to-metal seal at the outer interface. The conical thread can be typically made-up by hand and is tightened using pipe tongs or motorized spinners, a process that puts the pin 303 under tension, the box 301 under compression and the metal seal interfaces 305 also under compression. This compressional load must exceed the tensional loads the seal experiences during bending and flexing in the hole to keep the metal-to-metal seal intact. The interior walls of the pipe joint 30 may be coated with a high-performance phenol-based epoxy compound. This compound is a high-quality dielectric insulator that inhibits corrosion of the metallic pipe and reduces friction losses in the fluid. The thickness of the applied dielectric film is about 10-12 mils (0.25-0.3 mm) Commercially available examples of such compounds are "TK-236" or "TK-34", both available from Tuboscope, Houston, U.S.A.

The downhole instrumentation packages collect information about the drilling process, about the formations being drilled, and about the fluids contained in those formations. In current practice, most of this data is stored in memory and later retrieved after the instrumentation has been brought back to the surface. A very small and compressed amount of information, however, is typically sent in real time to the surface using one of the currently available telemetry systems. The amount of information available in real time on a typical drilling telemetry system used to be adequate in the early times of directional drilling. A few bits of information describing the bit orientation with respect to the earth's gravitational and magnetic fields are already useful for following a pre-defined well path. Today, however, commercially viable reservoirs tend to be much more complex than those exploited in the past and the recovery rates of the oil in place must be constantly increased to make the remaining hydrocarbon reservoirs last longer. This also means that well trajectories cannot be fully pre-defined based on seismic data or data from offset wells. Instead, well trajectories are more and more determined while a hole is being drilled and are fine-tuned literally on a foot-by-foot basis. To accomplish this task, a lot more formation evaluation data must be brought to the surface and must be studied and interpreted while drilling is progressing. The interpretation results may or may not require adjustments to the well trajectory, which are communicated back to the rig site. The rig equipment in turn communicates these adjustments to the downhole equipment. An example for a downhole imaging device that generates large amounts of formation evaluation data while a hole is being drilled is described in "Field Testing of an Advanced LWD Imaging Resistivity Tool," by Prammer et al., SPWLA 48th Annual Logging Symposium, Austin, Tex., 2007. Since the drilling process is relatively slow and formation data can be compressed by the downhole electronics, a transmission rate along the drill string of about 100-1,000 bits/second (bps) is required. In addition, the command channel from the surface to the downhole instrumentation and the drilling system requires a transmission rate of approximately 1-100 bps.

Thus, it is a goal of the present invention to provide a downhole data transmission system that can uplink data from downhole to the surface at a rate of at least 100 bits/sec, but preferably also at rates of 1,000-100,000 bps, and that can downlink data from the surface at a rate of at least 10 bps, but preferably at a rate of 10-1,000 bps.

The need to transmit data from a downhole location reliably has been recognized for a very long time. See, for example, U.S. Pat. No. 2,000,716, granted to Polk in 1935. Since then, a plethora of communications systems have been proposed and implemented with varying success. The obvious approach, running a continuous electrical or optical cable between the downhole location and the surface, runs into operational problems because every time a pipe joint is added or removed from the drill string, the entire cable must be lifted from the string. To address this problem, Exxon Production Research Company developed a cable system where the cable is stored downhole and is paid out as needed. See also: Robinson, L. H.: "Exxon Completes Wireline Drilling Data Telemetry System," Oil & Gas Journal, Apr. 14, 1980, pp. 137-148. However, the operational complications using long cables lead to a segmented-cable approach. The 1935 Polk patent falls into that category. Polk uses sections of an electrically insulating liner " . . . which may be made of synthetic resin, varnished cambric, asphaltum or other suitable material." Inside the insulating liner, Polk places metal tubes, which are electrically connected to each other by metal springs. Using the metallic drill pipe as the return conductor, an electrical circuit can be established and d.c. or a.c. signal currents can flow up and down the drill pipe. Liners, however, have a range of technical and economical shortcomings First, a typical 15,000-ft. drill string would require the installation of 500 30-ft. sections of liner, which would dramatically increase the capital expense for the drill string. Second, a feature like a thin-walled tube protruding from the box section of the rotary joint is not compatible with normal rig operations, in which heavy downhole components can swing laterally against each other during make-up and break-out, crushing any fragile elements that protrude and interfere with that motion.

Shell Development Company developed an electrical telemetry system based on modified pipe joints with electrical contact rings in the mating surfaces of each tool joint. A wire inside the pipe bore connects those contacts on each end. See Denison, E. B.: "High Data Rate Drilling Telemetry System", Journal of Petroleum Technology, February 1979, pp. 155-163. Again, operational problems exist with these kinds of systems, as they tend to short out unless each connection is carefully cleaned and prepared with special, non-conductive "pipe dope". U.S. Pat. No. 6,123,561 to Turner et al. or U.S. Pat. No. 7,156,676 to Reynolds also describe transmission systems that employ electrical contacts between pipe segments. However, these systems have in common that in order to communicate along the drill string many hundreds of individual elements would have to be connected in series and all must function in order for the entire system to be operational. Often, failure mechanisms in such electromechanical systems are intermittent and manifest themselves only under the severe temperatures, pressures and mechanical stresses encountered downhole. Therefore, systems as described in or similar to the '561 or '676 patents are usable only over short distances, e.g. between components of the BHA.

Thus, it is a goal of the present invention to provide a downhole data transmission system that does not require special handling over and beyond the normal care applied to rotary joints. In particular, the system should be compatible with the pipe dope compounds typically used in the oil drilling environment, e.g. zinc-based compounds. The system should further be able to tolerate typical amounts of dirt, mud residue and other deposits that may or may not be electrically conductive in and around the rotary connection and along the length of the tubular. The system should also be able to tolerate partial short circuits against ground that are inevitable if the drilling fluid is conductive.

Frustration with the reliability of downhole electrical connections led to the search for connector-less systems. U.S. Pat. No. 2,379,800, granted to Hare in 1945, describes transformer coupling at each pipe joint as well as an embodiment using telescoping condensers to provide capacitive coupling between pipe sections. U.S. Pat. No. 4,215,426 to Lord added an amplifier and a battery in each pipe joint to the transformer-based system. U.S. Pat. No. 4,605,268 to Meador, further refines the idea of transformer coupling by specifying small toroidal coils to transmit data across a rotary connection. U.S. Pat. No. 4,788,544 to Howard uses an instrumentation package within the backbored box section of a tool joint that is held captive by the pin nose of the mated tool joint and transmits data across the rotary connection using a magnetic field and a Hall sensor. Similarly, U.S. Pat. No. 7,400,262 to Chemali et al. uses an instrument package located in the backbored box of the rotary connection. In this case, information between instrument packages is exchanged acoustically using the pipe body as transmission medium. It is easy to see that an acoustic transceiver rigidly held captive between box and pin is inefficient in terms of converting electric into acoustic energy and vice versa. However, enough acoustic energy must be produced to clearly differentiate the signal against the acoustic noise background emanating from the bit and random locations along the drill string where contact with the wall is being made. Thus, any such device would consume large amounts of electric energy for very little transmission bandwidth, i.e. data throughput. The low bandwidth would render such a system as no or little improvement over existing data transmission systems, while the high power requirements would make it uneconomical to power such a device from batteries and unfeasible to power such devices by energy harvesting techniques as described in the Chemali patent. In addition, the large number of repeaters necessary, together with their electromechanical nature and the complete absence of redundancy, would make it nearly impossible for the Chemali system to function over a useful time frame during downhole deployment.

Another data transmission system with transformer coupling is known as "IntelliPipe". See, for example, U.S. Pat. No. 6,670,880 to Hall et al., or Pixton, D.: "Very High-Speed Drill String Communications Network—Report #41229R06", Novatek Engineering, Provo, Utah, March 2003, or Pixton, D.: "Very High-Speed Drill String Communications Network—Report #41229R14", Novatek Engineering, Provo, Utah, June 2005. This system can be used only with a particular type of pipe connectors, known as double-shouldered tool joints. When pipe segments are joined, corresponding magnetic couplers embedded in the inner, secondary rotary connection shoulders make contact and form a closed magnetic circuit. Due to the necessity of special pipe and the difficult machining involved, such systems are very expensive. A typical "IntelliPipe" drill string that is 15,000 ft. long may contain 500 coaxial cables, 1,000 half-coupler elements, 1,000 connectors between magnetic couplers and coaxial cable, approximately 10-15 signal repeater sub-systems, and various interfaces.

In the context of downhole data transmission, even the apparently simple engineering problem of running an electric connection between the two ends of a pipe joint is surprisingly difficult. The "IntelliPipe" system (see the '880 Hall patent) uses a straight armored coaxial cable that is constantly kept under tension and is only anchored at the tool joints. The U.S. Pat. No. 4,788,544 Howard patent proposes a coiled cable. These solutions interfere with such basic oil field tasks as cleaning the bore of pipe joints. Drilling fluids can be aggressive chemicals, e.g. due to their high salinity, which can damage the pipe by corrosion. Any kind of crevice or discontinuity in the flow stream attracts clay and/or other solid deposits, which must be removed by wire brushes run inside the pipe. Left unattended, dirty pipe is easily pitted and corroded, which can lead to a fatal failure under load in the future. While drilling, fluid throughputs of 1,000 gal./min. are not uncommon, pumped through a bore of a few inches in diameter. These fluids typically carry 1%-20% solid contents that, due to their high speed, carry massive abrasive forces acting on every obstacle present in the flow cross section. Even high quality steel or alloyed materials can be quickly eroded in this environment.

Thus, it is a further goal of the present invention to provide a downhole data transmission system that does not interfere with the flow of drilling fluids; that maintains a smooth interior bore compatible with smooth, laminar flow; that is compatible with standard cleaning operations, and that keeps the mechanical integrity of the pipe joint intact.

A very different category of telemetry systems establishes a point-to-point connection between the downhole instrumentation and the surface using the pipe string, the drilling fluid column or the earth as transmission medium. Common to these systems is the very high signal attenuation between transmitter and receiver and consequently very low data rates, typically in the range 0.3-30 bps. A particular family of systems in this category uses pressure pulses that travel inside the pipe string through the drilling fluid ("mud"). See, for example, U.S. Pat. No. 3,713,089 to Clacomb. Teleco Oilfield Company developed the first commercially successful mud-pulse system. Also see: Seaton, P. et al.: "New MWD-Gamma System Finds Many Field Applications", Oil & Gas Journal, Feb. 21, 1983, pp. 80-84. The achievable data rate of pressure-pulse systems under realistic conditions is about 15 bps and rapidly falls with long drill strings and/or compressible fluids such as oil-based muds (OBM).

Another system in the point-to-point category transmits an extremely low-frequency electromagnetic signal of a few Hertz from a downhole location to the surface. An example of such a system is described in U.S. Pat. No. 4,087,781 to Grossi et al. The data to be communicated is modulated onto the carrier signal. Problems with these systems are the very low data rate, the one-directionality of the transmission and failure to communicate near metallic casing and/or near certain earth formations such as salt domes.

A third type of point-to-point systems transmits mechanical signals such as torque pulses through the body of the drill pipe. An example can be found in U.S. Pat. No. 3,805,606 to Stelzer et al. Of the aforementioned systems, different implementations of pressure pulse communications are currently in commercial use as well as variants of extremely low-frequency electromagnetic telemetry. However, it is believed that no system using mechanical or acoustic signaling along the pipe string is in commercial operation at this time.

To summarize, the apparent simple problem of establishing a signal path along a drill string has been found to be a very difficult engineering problem. Of all systems that divide the communications path into segments corresponding to pipe joints, only "IntelliPipe" is in limited commercial use. Of all point-to-point transmission systems, only mud pulsing and extremely low-frequency electromagnetic communications have been fully developed. In principle, the segmented approach is much more appealing because, due to frequent signal amplification and restoration, much higher data rates can be achieved compared to the point-to-point approach. The segmented approach, however, suffers from high initial and capital costs and operational problems, mostly the lack of reliability.

It is a further goal of the present invention to enable reliable high-speed data transmission on existing pipe string hardware. There are millions of feet (meters) of drill pipe in operation worldwide. Systems like "IntelliPipe" require new pipe to be machined and instrumented to exacting specifications and cannot be retrofitted onto existing drill pipe of various provenance. A goal of the invention is adaptability to used drill pipe using only machining and coating operations that are available in many pipe-reconditioning shops worldwide.

It is another goal of the present invention to allow used pipe to be re-conditioned for use with the invention. Drill pipe is kept in operation for many years by periodically cleaning and reconditioning all surfaces and by re-cutting worn out threads.

It is perhaps an underappreciated fact that any segmented system will fail, no matter how reliable the individual component may be, given enough of such components connected in series. This fundamental problem can be better understood numerically. Consider an n-element data transmission system, where each element functions fault-free with a probability p throughout a single deployment interval (e.g., between going into and pulling out of a hole). FIG. 3 depicts schematically such a serial system. Assuming that the individual probabilities (lower-case) p are independent of each other, the probability (upper-case) P of the entire system to function without failure is:

$$P(n,p)=p^n.$$

This function is plotted in FIG. 4 for n from 1 to 10,000 for probabilities p of 0.99, 0.999 and 0.9999. The vertical line shows the typical case of n=1000. Clearly, even given the rather unrealistic reliability of p=0.9999 (1 failure in 10,000 deployments) for a single element, the entire signal chain will break down approximately once in every 10 deployments. Given that a downhole failure is likely to be a lost-time failure (LTF), a 10% chance of failure is considered poor reliability.

One goal of the present invention is a data transmission system that does not fail if a single element in a many-element configuration fails or if multiple elements at different locations fail during operation. Such functionality can be achieved by providing multiple data transmission elements that under normal conditions operate in parallel as shown in FIG. 5. In case of a failure of an element, a parallel element takes over the workload of the failed elements by increasing its own workload. In mathematical notation, m elements are connected in parallel for a total of n*m elements per system. If the failure probabilities 1−p of all elements are equal and uncorrelated, the probability for the system to function without interruption is given by:

$$P(m,n,p)=[1-(1-p)^m]^{n*m}.$$

This function is shown in FIG. 6 for the singly-redundant case of m=2. Again, n ranges from 1 to 10,000 and p is 0.99, 0.999 and 0.9999. Such a system can be characterized as very reliable except for the poorest element reliability of 0.99. The next step to a doubly-redundant system with m=3 is shown in FIG. 7 and the corresponding probabilities are plotted in FIG. 8. As can be seen, such a system is in fact more reliable than its parts and other failure mechanisms, such as failures in the interfaces to the system, will determine the overall system reliability.

The implementation of the "crossovers" (see FIGS. 5 and 7), which are essential for the isolation of a failure from the rest of the system, requires careful consideration. On one hand, "tight" coupling between elements is desired to avoid signal losses as much as possible. Tight coupling schemes are electrical contacts, followed by magnetic coupling, such as used in "IntelliPipe". On the other hand, the coupling should be as weak as possible so that a failed system does not interfere with the functionality of the remaining system. These considerations lead to the conclusion that, in a rather counterintuitive way, "weak" coupling schemes can provide the path to high system redundancy and reliability.

It is thus a further goal of the present invention to achieve a high level of system reliability by implementing a serial/parallel transmission scheme in which single-point failures can be isolated and bypassed without deterioration in overall system functionality.

It is yet another goal of the present invention that the system can detect, diagnose and report all failures or problems as soon as they occur. An operator may choose to replace the affected drill string segment at the next opportunity. Such an opportunity may exist when the drill string must be removed from the hole, due to, for example, a worn-out drill bit.

It is still another goal of the present invention to provide the necessary information in an easy-to-understand format that does not require specialized knowledge about the inner workings of the system. Since the present invention employs a large number of instrumented data repeaters, it is straightforward to include diagnostic and recovery capabilities that are distributed throughout the system. These capabilities include the capability to sense a local hardware failure and to report that failure to the surface. Such a report contains the serial number of the affected pipe segment, which simplifies the replacement of that segment with one that is known to be working. A hardware failure may be sensed by a drop in received signal strength or transmission silence during a time interval in which a signal is to be expected. The recovery capabilities include the capability to take over the workload of a failed element by a working element that increases its duty cycle to compensate for the increased workload.

Another goal of the present invention is a data transmission system that can be adapted to a variety of drill pipes, drill pipe parts and various downhole and surface equipment. This should include transmission between components or parts of components that move relative to each other such as axial translation or rotation.

Yet another goal of the present invention is the provisioning of full bidirectional data transfer between terminals at the surface and downhole.

Still another goal of the present invention is the provisioning of data transmission in both directions that appears error-free between end points, such that "soft", i.e. transient, errors are detected and corrected within the system.

It is a further goal of the present invention to provision a flexible-cost data transmission system. In certain applications, such as drilling through well-known formations, only a modest amount of data is required. In other applications, such as drilling an exploratory well or steering a steerable drill bit through a complicated reservoir zone, a high amount of data is required. Another example of a highly variable user dataflow is seismic-while-drilling (SWD). In SWD, seismic microphones and the associated electronics are part of the downhole instrumentation package. At times when drilling stops, such as when a new connection is made up, a seismic wave may be launched from the surface, which is recorded downhole. These waveforms may be sent to the surface in bursts and in real time using the data transmission system. Therefore, the data transmission system should preserve its resources during times when only a small amount of data is relevant and should transmit at high speed at times when large amounts of data are available and are relevant for real time operations.

It has been a long-accepted limitation of while-drilling measurements that data can only be gathered in the BHA, where typically all sensors are located. Thus, data along the borehole is only available shortly after a particular section has been drilled, while changes in that section that occur hours or days after the section has been drilled are not detectable. Such changes may include the influx of formation fluid into the borehole, a condition that depends among other factors on formation pressure, borehole pressure and the formation of mud cake on the borehole wall. Such influx is typically detectable as local temperature aberration because the borehole fluid and the formation fluids typically have different temperatures. It is also highly desirable to measure borehole pressure along the entire wellbore in order to equalize the pressure exerted by the formation towards the borehole, without applying too much pressure outwards, a situation that could ruin future production from a reservoir. Currently, the pressure and temperature profiles are simply estimated by linearly interpolation between surface values and BHA values, or worse, are calculated from assumed gradients. The "IntelliPipe" system has introduced limited capabilities to deploy sensors along the borehole in the signal repeaters. The "IntelliPipe" signal repeaters, however, are complex electronics packages that are spaced out as far as possible 1,000-2,000 ft. intervals along the drill string. Such course sampling is undesirable for gathering data along the entire wellbore.

Thus it is another goal of the current invention to enable data gathering along the wellbore with spacings between sensor points of as little as a single pipe joint, i.e. about 10 meters.

SUMMARY

The above-mentioned and other goals and advantages of the system will become apparent from the following detailed description of the invention. As will become apparent from the following description, the invention includes a downhole signal transmission system in which electrically conductive or non-conductive fluid comprises a portion of the signal path and in which electric radiofrequency signals are coupled to the fluid through electrical insulators. In an exemplary embodiment, the frequency of the radiofrequency signals is in the range of approximately 1 MHz to approximately 1 GHz. In the exemplary embodiment, a plurality of signal repeaters are tuned to the frequency of the radiofrequency signals. A plurality of transmission lines terminated by resonance circuits are also provided whereby the terminating resonance circuits resonate on the frequency of the electric radiofrequency signals.

The downhole data transmission system of the invention includes a plurality of signal repeaters and a plurality of transmission elements arranged to be redundant such that a failure of one or more of the signal repeaters or a failure of one or more of the transmission elements does not substantially affect the operation of the data transmission system. Preferably, the invention includes the feature that a failure of any of the signal repeaters or a failure of any of the transmission elements is communicated to the surface. During operation, the signal repeaters receive and transmit radiofrequency signals and the transmission elements transport radiofrequency signals between the repeaters. To provide the desired redundancy, the number of signal repeaters used is substantially larger than the number of signal repeaters necessary to receive and transmit data, and the number of transmission elements is substantially larger than the number of transmission elements necessary to transport data.

The downhole pipe section in which the downhole data transmission system of the invention is implemented includes rotary connections and a tubular pipe section arranged to transport radiofrequency signals over transmission elements wherein the inner cross section of the pipe section is approximately circular and the transmission elements take up approximately less than 5% of the cross sectional area around the periphery of the pipe. Preferably, the pipe section is designed such that its mechanical strength is approximately equal to and, in any case, at least 95% of the mechanical strength of the pipe section without the transmission elements. In an exemplary implementation, the transmission elements are contained in the interior coating of the downhole tube.

The scope of the invention also includes a method of transmitting data downhole by transmitting electrical signals between electrodes through electrical insulators and an electrically conductive or an electrically non-conductive fluid. In an exemplary embodiment, the frequency of the electrical signals is in the range of approximately 1 MHz to approximately 1 GHz. The electrical signals are received and transmitted by a plurality of signal repeaters and the electrical signals are transported by a plurality of transmission elements such that the electrical signals cause electrical resonances in some of the transmission elements.

In an exemplary embodiment of the downhole data transmission method of the invention, the method includes weakly coupling redundant elements in a downhole data transmission system such that a failure in one or more of the redundant elements does not catastrophically affect the operation of the downhole data transmission system. In an exemplary embodiment, the approximate location of the failed element or locations of failed elements is communicated to the surface.

The methods of the invention also include a method of installing a plurality of transmission elements in a downhole pipe section wherein the inner cross section of the pipe section is approximately circular and the transmission elements take up approximately less than 5% of the cross sectional area. Also, the mechanical strength of the pipe section is approximately equal to or, in any event, at least 95% of the mechanical strength of the pipe section without the transmission elements. The transmission elements may be contained in the interior coating of the downhole pipe section. Also, the transmission elements may be contained in grooves within the wall of the inner bore of the pipe section.

The invention also includes a coupling element and associated method of transmitting radiofrequency signals in a downhole signal transmission system comprising a stationary electrode and a movable electrode wherein electric radiofrequency signals in the range of approximately 1 MHz to approximately 1 GHz. are coupled between the electrodes through electrical insulators and a fluid. In an exemplary embodiment, the coupling elements are part of a drilling jar or are part of a surface communications sub.

BRIEF DESCRIPTION OF THE DRAWINGS

FIG. 11a is a conceptual, flattened layout of the buried electrodes in each tool joint area and the transmission lines connecting them.

FIG. 11b shows conceptually the cross sections A-A', B-B' and C-C', whose locations are indicated in FIG. 11a.

FIG. 12 is a conceptual diagram of a tool joint showing buried electrodes with capacitive and inductive circuit elements forming resonant circuits and the transmission lines coupling the resonant circuits.

FIG. 18 is a conceptual diagram of a tool joint showing buried electrodes, transmission lines, repeaters, capacitive and inductive circuit elements forming resonant circuits and the general areas where electrical signal and ground coupling between adjacent elements occurs.

FIG. 19 is a cross section through an API-type rotary connection modified to accept data transmission elements.

DETAILED DESCRIPTION OF ILLUSTRATIVE EMBODIMENTS

A detailed description of illustrative embodiments of the present invention will now be described with reference to FIGS. 9-72. Although this description provides a detailed example of possible implementations of the present invention, it should be noted that these details are intended to be exemplary and in no way delimit the scope of the invention.

Figure 9:
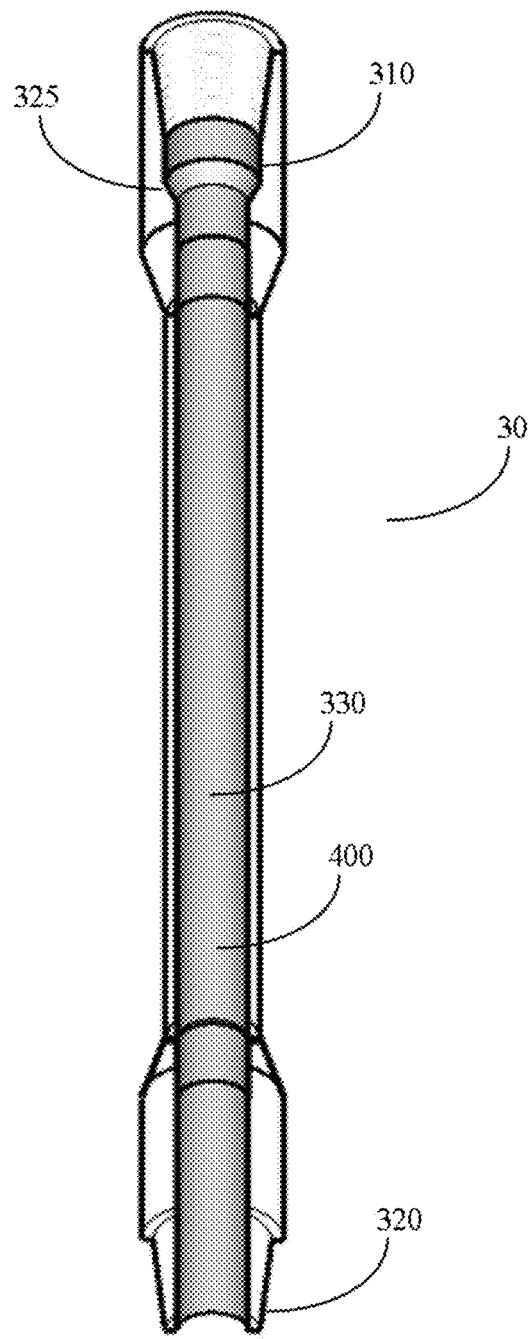
FIG. 9 is a cut-open perspective view of a pipe joint prepared for accepting data transmission elements and fitted with interior pipe coating suitable for data transmission in accordance with the invention.
Figure 72:
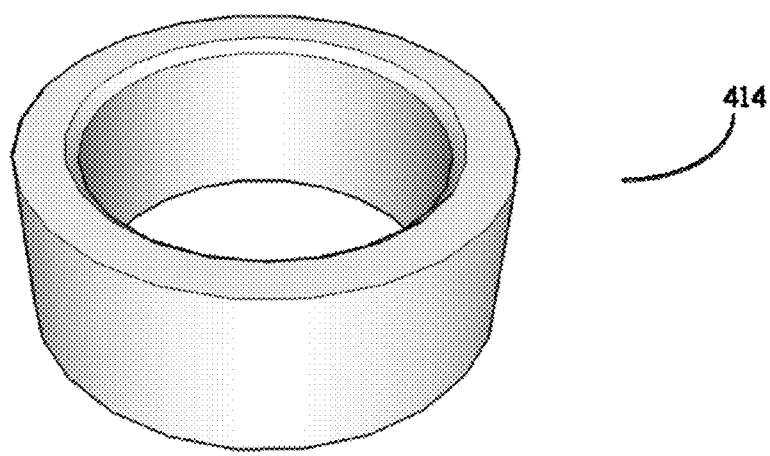
FIG. 72 is a perspective view of a passive insert for a double-shoulder rotary connection.

The data transmission system described in the present invention in connection with FIGS. 9-72 is intended for integration into existing or new drill string components, bottom-hole assemblies (BHAs), or other downhole equipment to provide fast, bi-directional communication between surface computer equipment and downhole instrumentation. In addition, the data transmission system is intended to provide for versatile data-gathering and data-processing capabilities along an entire drill string or a downhole tubular for assessing drilling conditions and for evaluating the formation in the general vicinity of the wellbore.

The following discussion mostly focuses on the integration of the data transmission system into the pipe joints, as these are the most numerous components in a downhole component string. Other elements that may be connected in series with the pipe joints from time to time and that also may contain data transmission elements are: pup joints, which are short sections of pipe joints, drill collars and heavyweight pipe, jars, kellys, valve subs, saver subs, crossover subs, sensor subs, interface subs, communication subs, instrument subs, subs in general and checkout equipment. Most of these components are deployed downhole, while others, such as the kelly, communication subs and checkout boxes remain on the surface.

Figure 1:
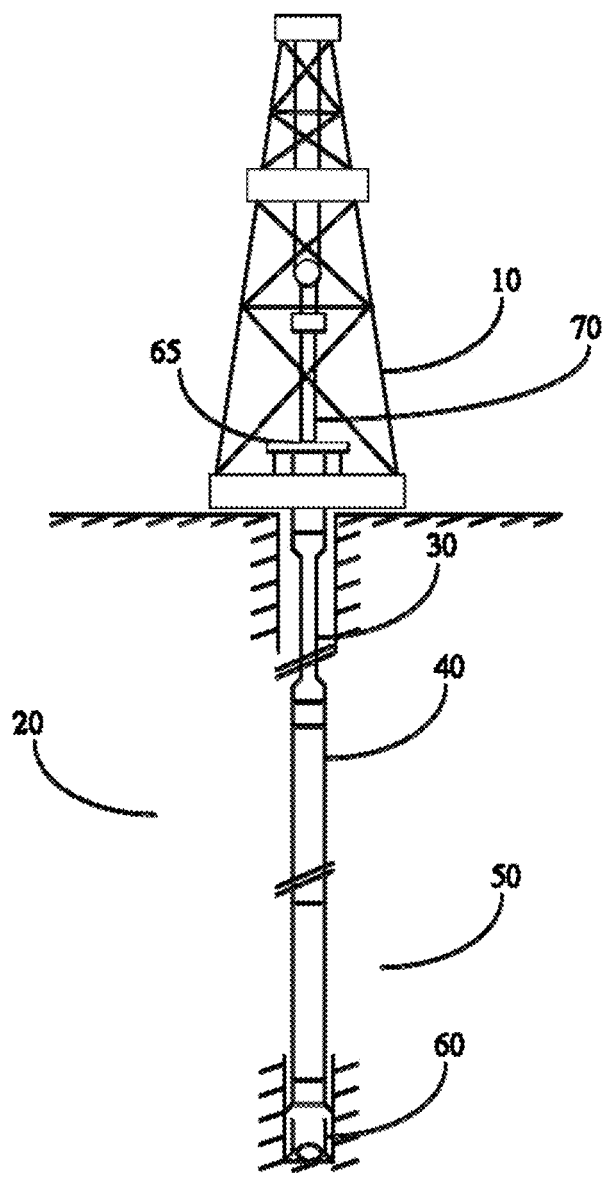
FIG. 1 is a schematic representation of a conventional drilling environment showing various downhole components.
Figure 2:
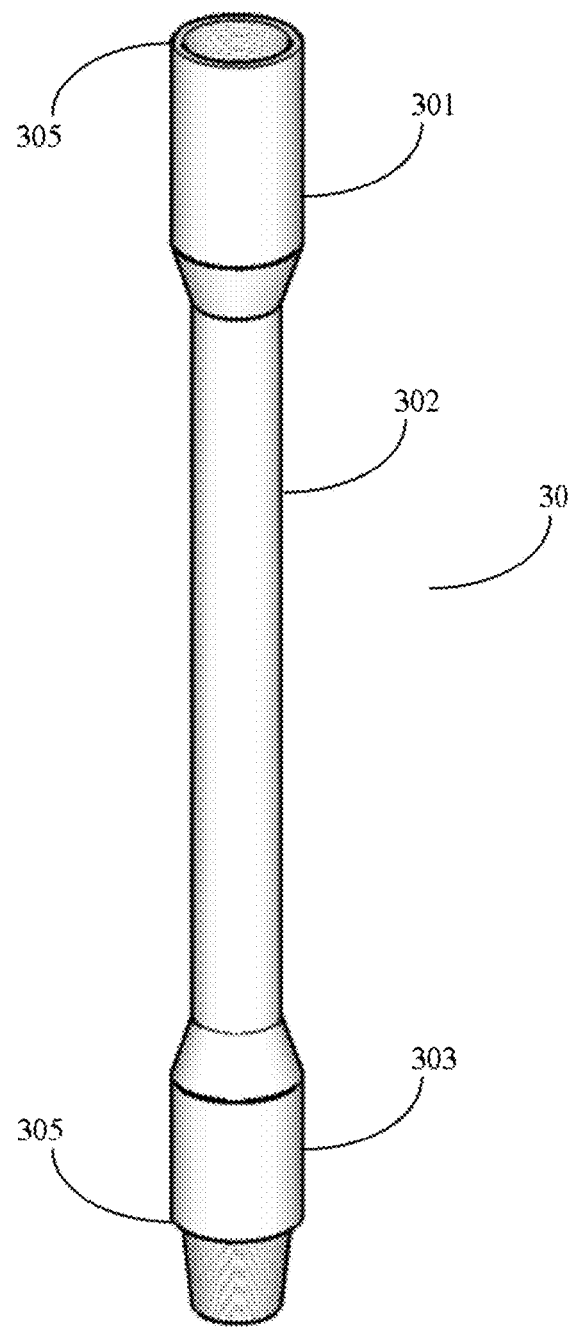
FIG. 2 is a perspective view of a conventional pipe joint with rotary connections.
Figure 3:
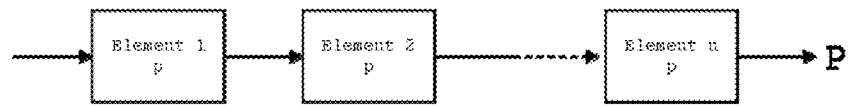
FIG. 3 is a conceptual illustration of a chain of transmission elements connected in series.
Figure 4:
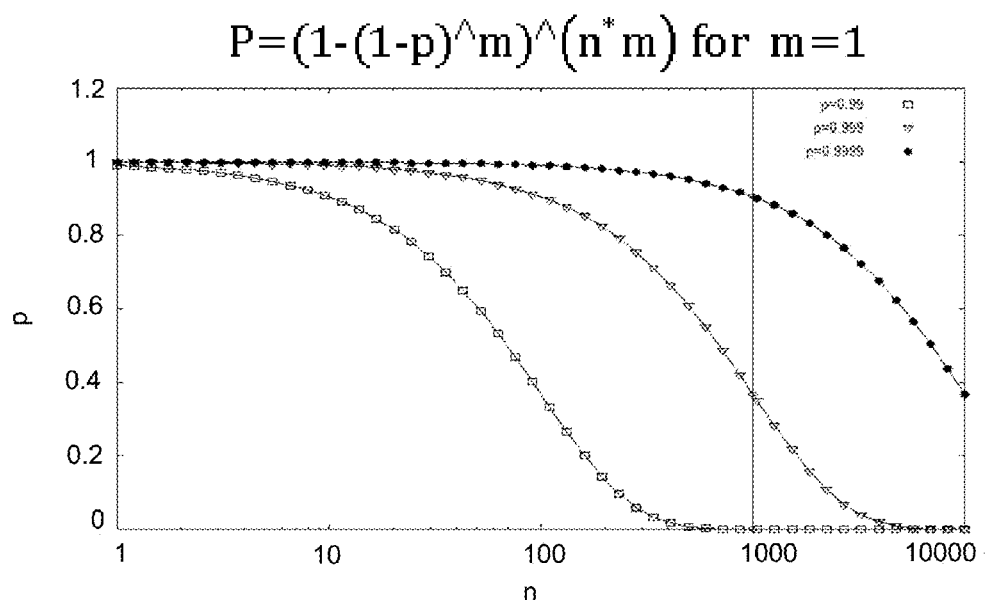
FIG. 4 is a plot of the system reliability function $P=p^n$ for a chain of n transmission elements connected in series according to FIG. 3 with individual element reliabilities of $p=0.99$, $p=0.999$ and $p=0.9999$.
Figure 5:
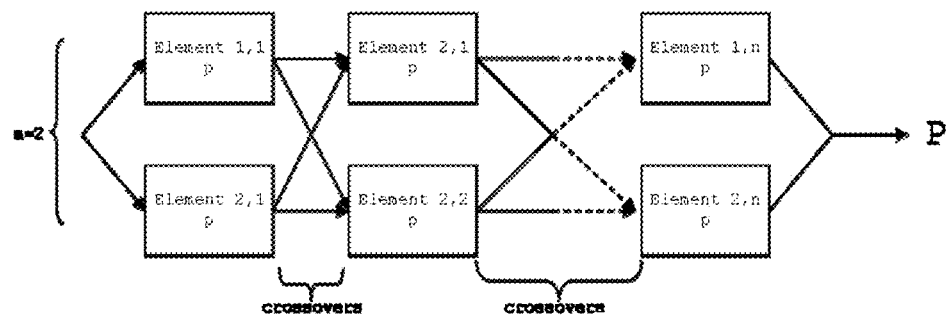
FIG. 5 is an illustration of a chain of transmission elements connected in parallel and in series for the case of two transmission paths in parallel with periodic crossovers between elements.
Figure 6:
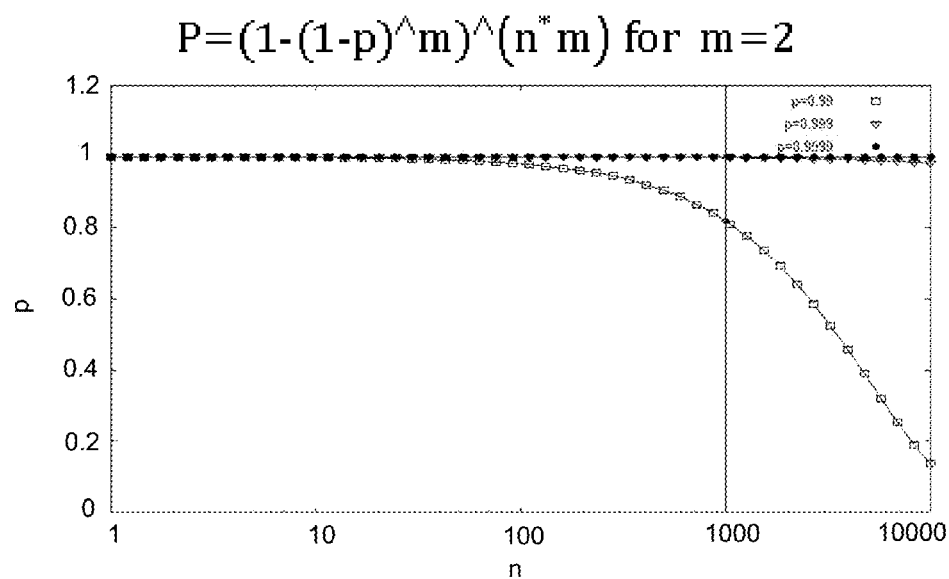
FIG. 6 is a plot of the system reliability function $P=(1-(1-p)^m)^{n*m}$ for a system according to FIG. 5 where there are in total 2n elements with individual element reliabilities of $p=0.99$, $p=0.999$ and $p=0.9999$.
Figure 7:
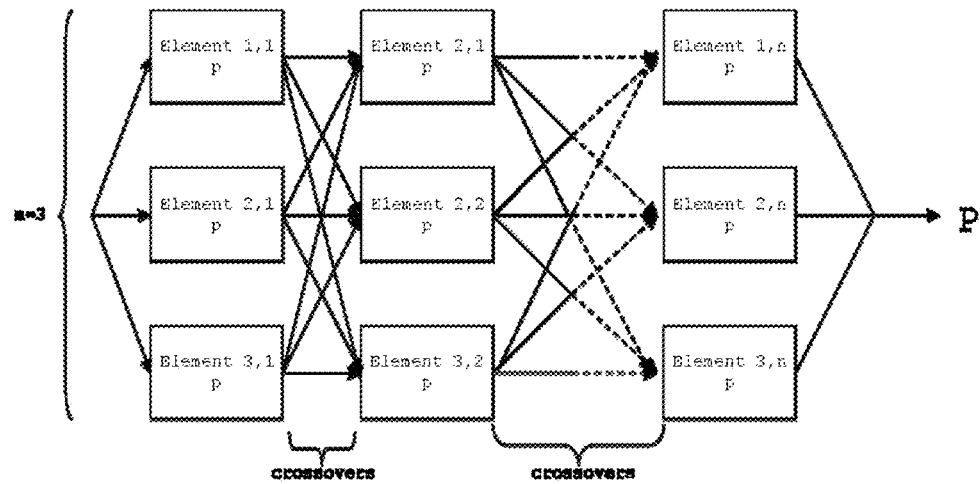
FIG. 7 is an illustration of a chain of transmission elements connected in parallel and in series for the case of three transmission paths in parallel with periodic crossovers between elements.
Figure 8:
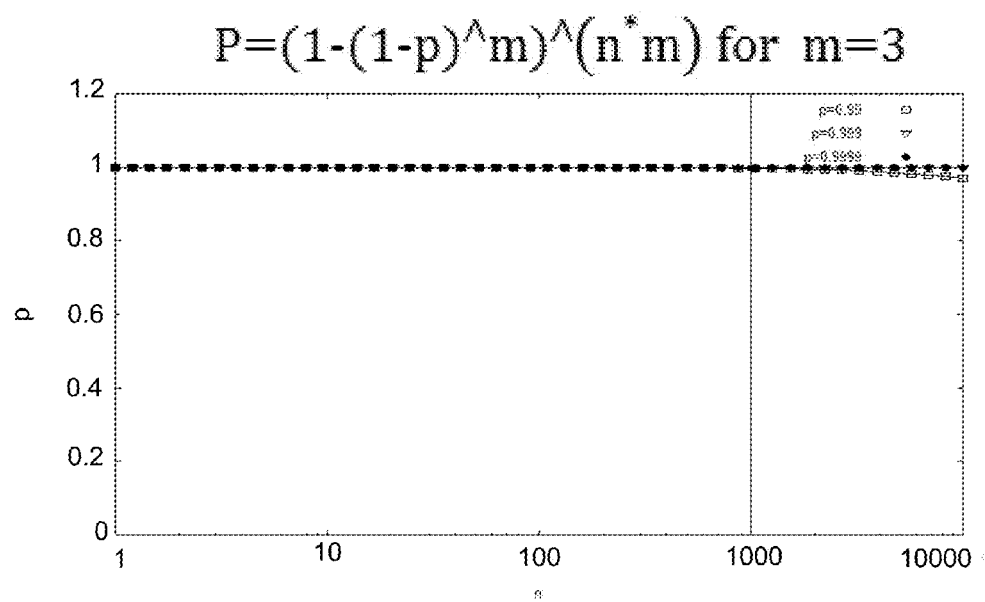
FIG. 8 is a plot of the system reliability function $P=(1-(1-p)^m)^{n*m}$ for a system according to FIG. 7 where there are in total 3n elements with individual element reliabilities of $p=0.99$, $p=0.999$ and $p=0.9999$.

FIG. 9 shows a conventional pipe joint 30 of the type shown in FIG. 1 in cut-open view with partially installed data transmission system components in accordance with the invention. The box end of the rotary connection has been back-bored according to "Specification for Rotary Drill Stem Elements—API Specification 7," $40^{th}$ Edition, November 2001, American Petroleum Institute. The resulting inner cavity 310 is intended to house an electronics package (the "repeater housing") that will be described later. The pin 320 of the rotary connection has been trimmed to the length dimension necessary to capture and hold firm such an electronics package between the pin 320 and the back wall 325 of the box when the rotary connection is fully tightened. The flow channels 330 of high-end premium pipe joints are typically coated with high-performance epoxy-resin powder coat systems 400. Before the coats 400 are applied, the pipe joint 30 is thermally cleansed of any residues and sandblasted using aluminum-oxide powder. In addition to these standard procedures and in preparation of accepting the data transmission system, the sandblasted joint has to be deburred by grinding/removing residual aluminum-oxide particles and any protruding surface imperfections. Not visible in FIG. 9 is a system of electrodes and transmission lines that are buried inside the dielectric corrosion-inhibiting coating system. The burial is achieved by first coating the sandblasted, debarred and smoothed bare-metal interior surface with a liquid epoxy primer such as "TK-8007" available through Tuboscope, Houston, then applying the electrode systems and finally applying a dielectric overcoat such as "TK-236", also available through Tuboscope, Houston. Alternatively, a first coat of the overcoat may be applied to the primer as raw powder. On this first coat, the electrodes are applied, over which a second coat of overcoat powder is applied. Typical thicknesses for the primer are 2 mils (~0.05 mm) and for the overcoat 10 mils (~0.25 mm) The primer and the electrodes are applied at lower temperatures, while the overcoat powder is applied as dry powder to the heated pipe, where the powder melts into a gel and then cures at about 200° C. for about 30 minutes. During the curing process, the epoxy gel flows around, into and under the electrodes and, after reaching its glass-transition temperature, hardens through cross-linking to a solid material of glass-like hardness. During the powder application and during the curing process, the pipe joint is preferably rotated around its long axis to create enough centrifugal force such that the gel flows freely inside the bore achieving uniform thickness without accumulating in low spots due to gravity. Such rotation also applies centrifugal forces to the embedded electrode systems causing them to further sink into the soft gel while entrained gas bubbles are released through the gel's surface. After the curing process, the electrode systems and the transmission lines are integral and inseparable components of the interior pipe coating system without having electrical contact to other components. Therefore, the corrosion-inhibiting properties of the coating system remain intact while the fragile electrode systems are fully protected from the harsh downhole environment.

Figure 10:
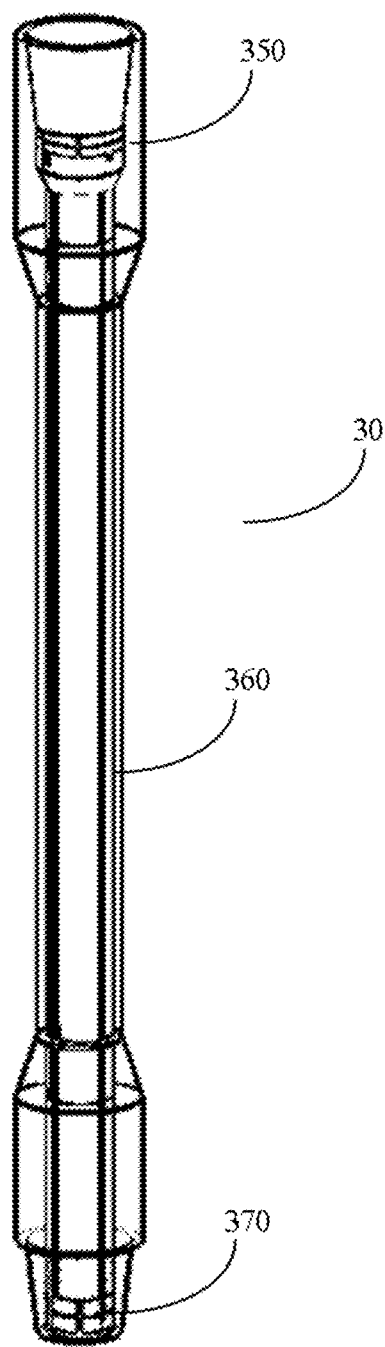
FIG. 10 is an "x-ray" perspective view of a pipe joint showing various data transmission elements buried under the interior pipe coating.

FIG. 10 is the see-through view of the pipe joint 30 shown in FIG. 9. Visible are the buried ring-shaped box electrode system 350, the buried transmission lines 360, and the buried ring-shaped pin electrode system 370. Each electrode system includes individual electrodes, which may be manufactured from double-sided copper-cladded polyimide film. Such films are available under the trade name "Pyralux"

from DuPont Electronic Materials, Research Triangle Park, N.C. 27709. Suitable DuPont products are AP 8555 or AP 9151, which employ as dielectric a 5-mil (0.127 mm) thick polyimide sheet sandwiched between two copper layers. The copper layers are preferably electrochemically deposited (suffix "-E" to the DuPont product number). Alternatively, sheets of polyimide may be obtained from DuPont and coated using well-known spattering techniques with thin metals layers such as copper, silver, gold, or aluminum. The transmission lines may be simply realized by using standard fine-gauge coated magnet wire, such as AWG #36, for one conductor and utilizing the pipe's metal body for the return path. Each electrode system may be divided into arbitrarily many individual electrodes, wherein each electrode in the box has a counterpart electrode in the pin. Such primary and counterpart electrodes are connected by a transmission line, i.e. by one or more wires, to each other. No portion of the electrode systems or transmission lines is intended to make electrical contact to the pipe body, although such an electrical contact would not necessarily interfere with the proper operation of the data transmission system. Instead, the operating frequency or frequencies are chosen to be high enough such that the capacitances between the electrodes and the pipe body are sufficient to complete an electric a.c. circuit between the box electrodes and the pin electrodes. It has been found that dividing each electrode ring into two or three electrodes is sufficient to achieve a high degree of redundancy and robustness. Preferably, a single wire is used to connect each pair of corresponding pin and box electrodes in such a way that the wire may break or may short to ground, thereby disabling one pin/box pair, but without substantially affecting the remaining one or two pin/box electrode pairs.

FIG. 11a is a flattened conceptual layout of an example electrode system. The patterns shown are preferably photolithographically etched into the top and bottom metal layers ("plates") attached to the polyimide sheet. Both line thickness and line separation are about 10 mils (~0.25 mm) After etching, the exposed polyimide is vaporized, e.g. by a focused high-power laser beam, leaving a finger-like electrode structure as shown in cross-section A-A', FIG. 11b. Also shown in FIG. 11b is the shallow trench 375 created by deburring/honing the pipe end in which the electrode structure is deposited. The depth of these trenches 375 is only about 5 mils (~0.13 mm) and preferably does not exceed 10 mils (~0.25 mm) During the curing process, the epoxy gel 400 is free to flow around, into and under the electrode structures 370, thus completely encapsulating them. Note that FIGS. 11(a)-(b) are simplified by showing the metal surface as absolutely smooth. In reality, the irregularities in the pipe's surface are of the same or of larger magnitude than the thickness of the electrode system. Therefore, the individual "fingers" are not parallel but rather follow the pipe metal's surface contours. What matters only is that the distance between the top and bottom metal layers, which is determined by the polyimide thickness, remains constant.

FIG. 11a shows as an example two segments per electrode system: Each segment is a resonant circuit comprised of a capacitive-type portion intended to electrically couple to the environment and an inductive-type portion with little capacitive coupling. The inductor is realized by a length of conductor 380 attached to the capacitor 385 on the upper plate and terminated through a through-hole ("via") to the lower plate. As shown, different capacitances 385 are compensated for by selecting different lengths for the inductors 380. It has been found advantageous to tune the resonant tank circuit slightly lower than the intended operating frequency due to the inductive load presented by the attached transmission line. For an operating frequency of 27 MHz, the tuning frequency would be around 26-26.5 MHz. Pairs of pin/box electrode systems are connected by fine-gauge wires 360. A cross section B-B' is given in FIG. 11b. The wire 360 may be round or rectangular in cross section and is fine enough to be completely encapsulated during the coating process. Preferably, the wire is pre-coated with insulating material, although this is not an absolute requirement. The wires are attached to the electrode's upper plate through soldering or brazing in a wire channel formed by etching away the lower plate and vaporizing the polyimide dielectric in this section (see FIG. 11b, section cut C-C').

Figure 64:
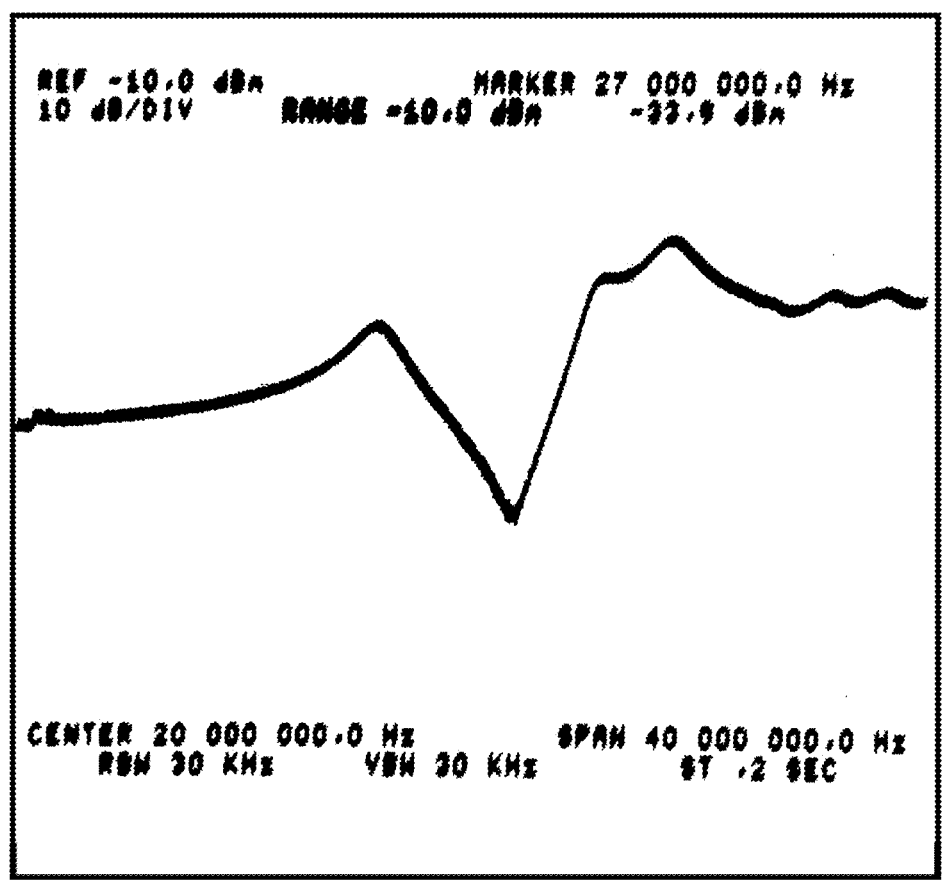
FIG. 64 is a screenshot from a network analyzer CRT showing the electrical characteristics of a prototype electrode system.

FIG. 64 provides a screenshot from the CRT of a network analyzer HP3585A showing the electrical characteristics of a prototype electrode system embedded in pipe coating. The horizontal axis is the frequency between 0 and 40 MHz, the vertical axis represents the signal reflected from the electrode in an impedance bridge. The vertical axis is logarithmic ranging from −10 dBm at the top to −110 dBm at the bottom. The frequency marker is set at 27 MHz where a flat "shoulder" with a width of about 2 MHz indicates the proper parallel resonance condition where the electrode system acts as a tank circuit with a Q of about 10. This frequency region is suitable for data transmission. To the right of the operating range exists a peak indicating a resonance caused by the electrode system's capacitive behavior resonating with the inductance of the attached wire, i.e. the transmission line. To the left of the operating range exists a deep valley indicating a series resonance condition caused by the electrode's system inductive behavior resonating with the capacitance of the electrode to the pipe metal. The particular frequencies of the two latter resonances are ill-defined; however, they are guaranteed by design to occur outside the useful 2-MHz operating window.

FIG. 12 further explains the electrical characteristics of the buried electrode systems. As explained before, the electrodes and transmission lines are completely coated with a dielectric 400, leaving no intentional contact to the pipe body. For clarity, the electrodes are pictured as lumped-element L-C parallel resonant circuits 350 and 370. The dielectric material is important in providing displacement current paths both from the "upper" or "hot" plates to the environment and from the "lower" or "cold" plates to the pipe body. The connecting wires 360, the dielectric and the pipe metal form low-quality transmission lines with relatively high characteristic impedances of around 80 ohms. The exact parameters of the lines are not essential, since only weak coupling between the resonant circuits in the box and in the pin is desired. Sufficient coupling is achieved when electric resonance at one end induces resonance at the other end, while avoiding excessive detuning due to strong coupling. A parasitic resonance occurs when the electrode resonates with capacitance of the lower plate against the pipe metal. This resonance strongly short-circuits all signals and occurs below the tuning resonance of the electrodes. Therefore, the operating frequency at which the system achieves high impedance against the pipe body is at or above the electrode's self resonance frequency. The Q of this resonance is around 10, which is rather low, but desirable for several reasons. Operating at or around 27 MHz with a Q of 10 creates usable bandwidth of about 2 MHz, large enough to accommodate a 1-MHz wide signal plus frequency variations due to downhole conditions. Such changes, for example, are the decrease in electric permittivity of the polyimide dielectric due to temperature, the increase in capacitance due to compression under pressure and variable electric loading due to dielectric and conductive properties of the drilling fluids.

Figure 13A:
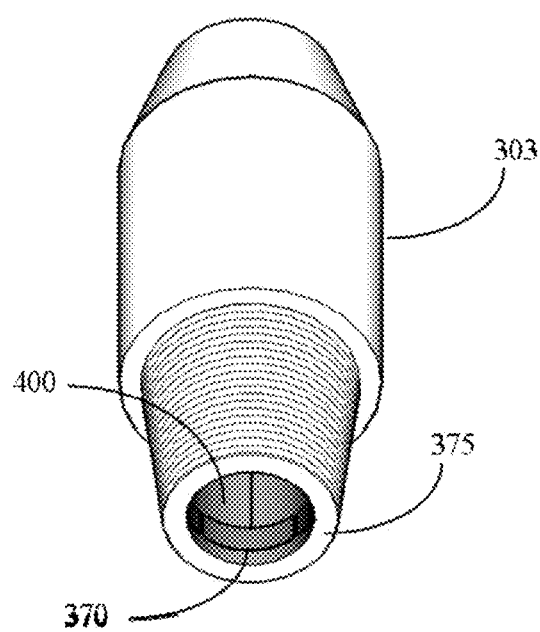
FIG. 13a is a conceptual perspective view of the pin tool joint with transmission elements installed where, for clarity, the buried electrode system has been drawn as if the coating is transparent.
Figure 13B:
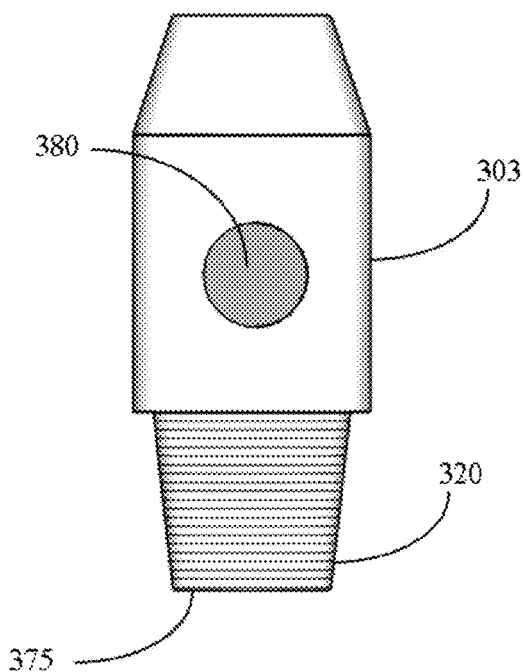
FIG. 13b is another perspective view of the pin tool joint showing the location of the embossed tool joint identification (ID) in the tong area.

FIG. 13a is a conceptual, perspective view of the pin end 303 of a rotary connection with data transmission elements installed. For clarity, the installed electrode system 370 is shown as if the epoxy coating 400 is transparent. As can be seen, the pin electrode system 370 is set back from the pin face 375 by approximately ¼" (~6 mm) to protect the electrode 370 in case the coating becomes damaged near the pin face 375. FIG. 13b is a top view of the pin end showing the pin 320 and the pin thread and the general location within the tong area where a unique pipe joint identification (ID) number or alphanumerical string 380 is embossed. This ID 380 is used to visually reference a particular rotary connection and is also stored electronically within the pipe joint and also offline (see discussion below).

Figure 14A:
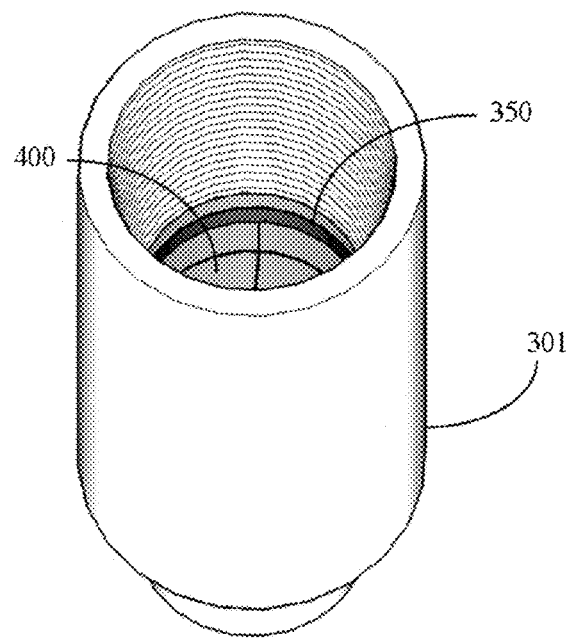
FIG. 14a is a conceptual perspective view of the box tool joint with certain transmission elements installed where, for clarity, the buried electrode system has been drawn as if the coating system is transparent.
Figure 14B:
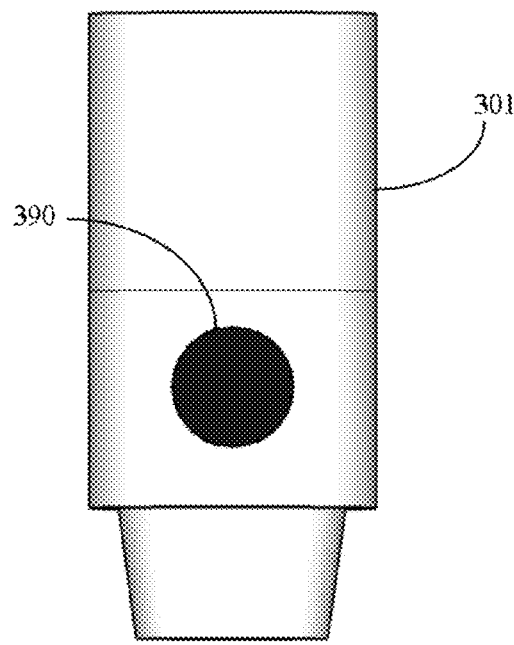
FIG. 14b is another perspective view of the box tool joint showing the location of the optional sensor insert.

FIG. 14a is a similar conceptual, perspective view of the box end 301. For clarity, the data transmission elements "repeater housing" (a.k.a. "twin repeaters") and "taper ring" have been omitted (shown as not installed). The epoxy coating 400 is drawn as if it is transparent. The box electrode system 350 is mounted on the interior box wall in a location determined by the dimensions of the repeater housing (further explained below). FIG. 14b is a top view of the box end 301 showing the general location within the tong area where an optional sensor insert 390 can be installed. The sensor insert 390 houses one or more environmental sensors and communicates with the data transmission system inside the pipe joint.

Figure 15:
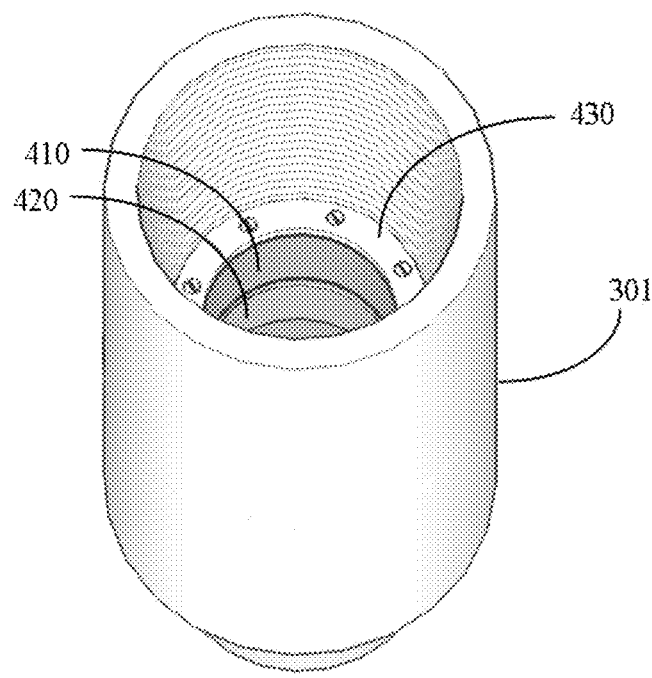
FIG. 15 is a perspective view of the box tool joint with transmission elements installed, including the repeater housing and the so-called taper ring.

FIG. 15 is a perspective view of the box end 301 with all data transmission elements installed. Partially visible is the "repeater housing" 410 (or "twin repeaters") and the "taper ring" 420 below. These elements are tightly fitted into the backbored space within the box end 301. The exposed face of the repeater housing is the contact ring 430, which will make mechanical and electrical contact with the pin face of the next pipe joint once the rotary connection is tightened. Most of the repeater housing's and the taper ring's surfaces are coated with epoxy pipe coating 400, with the exception of the contact ring 430, which remains bare metal because of the mechanical friction and desired electrical contact at this interface.

Figure 16:
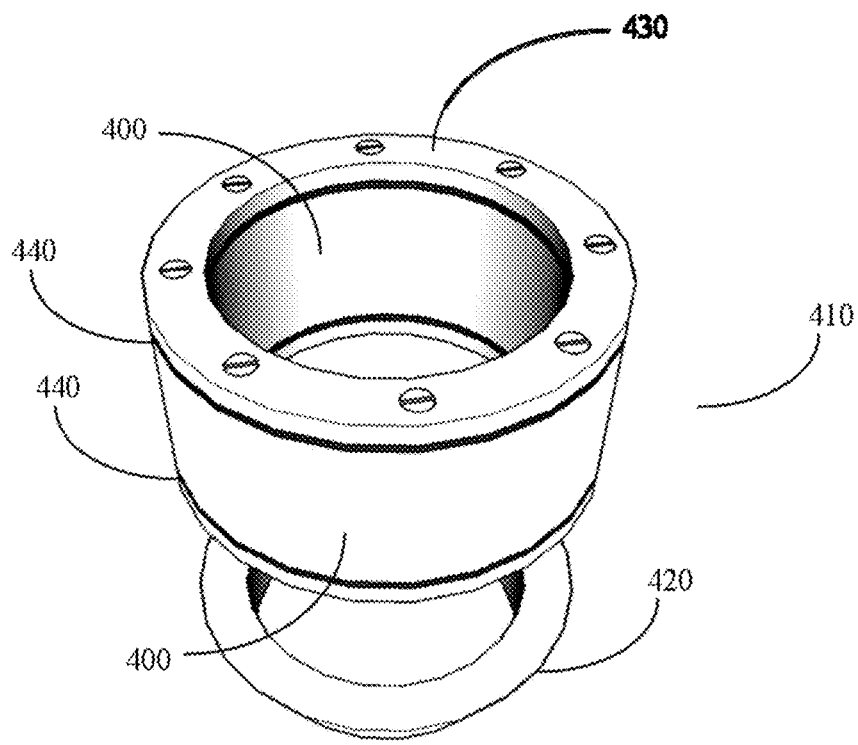
FIG. 16 is a perspective view of the API-style repeater housing and the API-style taper ring.

FIG. 16 is a perspective view of the repeater housing 410 and the taper ring 420. The repeater housing 410 has the shape of a short length of pipe, while the taper ring 420 conforms to the conical shape of the end of the box 301. The repeater housing mainly consists of a contact ring 430 at the exposed end or two contact rings 430 at each end, separated by elastomeric seals 440 (such as "Viton Extreme" fluoroelastomer, made by DuPont, Wilmington, Del.) from the repeater pressure housing itself. The repeater housing 410 is a short section of steel tubing with typical dimensions of O.D. 4.2 inches, I.D. 3 inches and length 1.75 inches. The yield strength of the steel is preferably 120,000 psi or higher.

Figure 17:
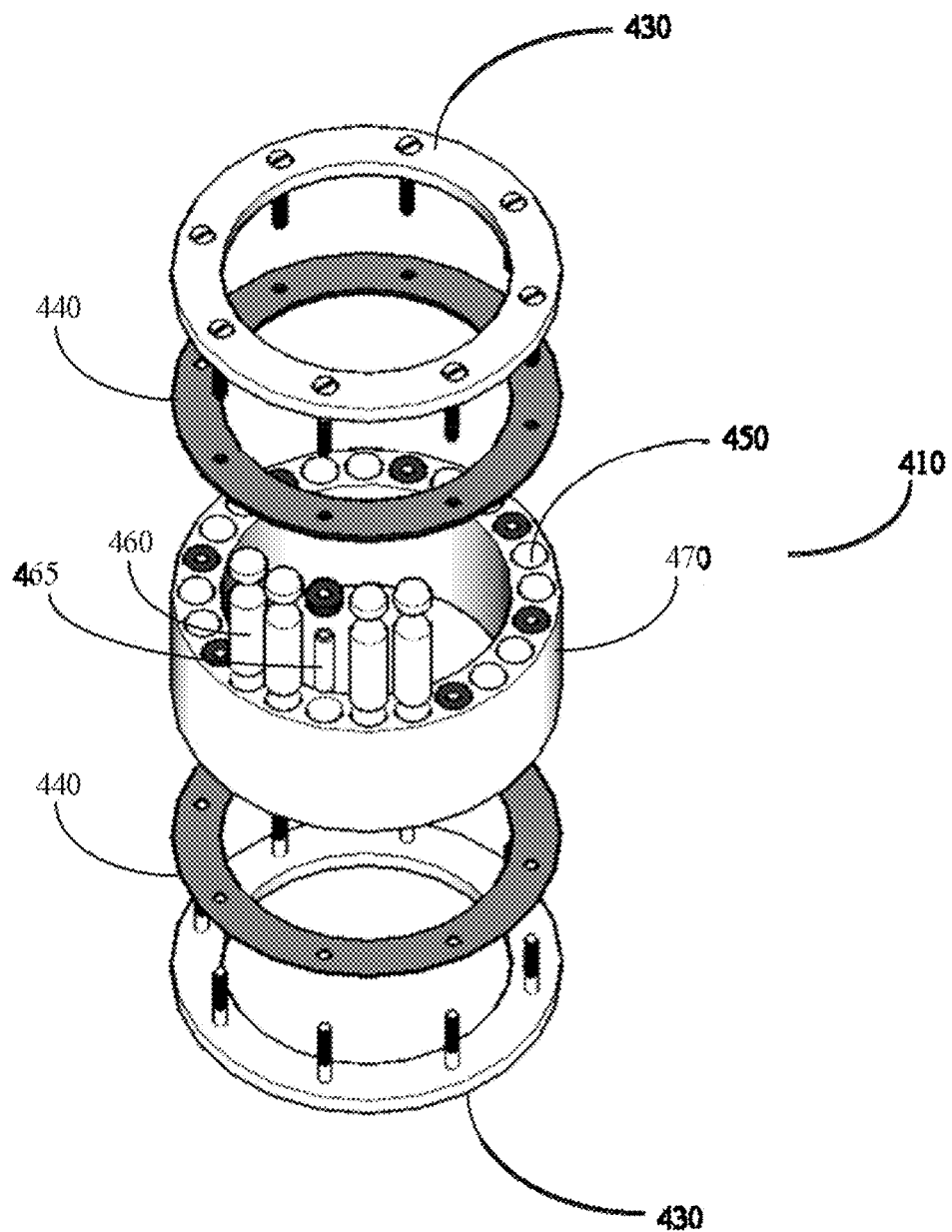
FIG. 17 is an exploded view of the API-style repeater housing showing mechanical and electronic components of individual repeaters.

FIG. 17 shows the repeater housing 410 in exploded view. The repeater pressure housing has revolver-style chambers 450 that hold the electronic components of the repeaters. The chambers 450 are dimensioned to accommodate commercially available high-temperature lithium batteries. A suitable primary-cell lithium battery is part no. 4037, size ½ AAA lithium cell 10-25-150, available from Electrochem, Clarence, N.Y. The dimensions of this cell are 9.5 mm diameter and 25.4 mm (1 inch) in length. At room temperature, this cell delivers a nominal charge of 0.5 ampere-hours at 2 mA discharge current and has a voltage of about 3.5 V. The repeater electronics is housed in cartridges 460 with dimensions identical to that of the Electrochem #4037 battery. Although one repeater housing can hold enough cartridges for as many as four repeaters, in practice only 2-3 repeaters are used. For clarity, FIG. 17 only shows the four cartridges that typically make up a single repeater with the remainder of the chambers 450 shown as empty. In the example shown, one cartridge is occupied by the battery, another cartridge holds a capacitor for short-term energy storage and two cartridges hold the electronics. A ferrule 465 electrically connects the repeater electronics to the contact rings 430.

Repeaters can be powered by a single battery or by more than one battery. Collar joint repeaters may be powered by two batteries in parallel, a configuration made necessary by the longer high-temperature exposure of these repeaters, resulting in increased self-discharge rates of the lithium cells. After installation, repeater electronics and batteries are encapsulated in a suitable material such as STYCAST, made by Emerson & Cuming, Billerica, Mass., and sealed off by the contact plate 430 and epoxy sealant. Since there are many more chambers 450 than required for a complete repeater, multiple repeaters can be accommodated and/or backup batteries may be included in spare chambers. Since the repeater housing 410 isolates the electronics and battery from the downhole pressure, its collapse pressure must exceed the maximum downhole pressure. Considering the cavities as isolated tubes, a diameter-to-thickness (D/t) ratio of (10 mm cavity diameter)/(1.5 mm minimum wall thickness) is chosen. These values determine a maximally allowable I.D. of about 3.15 inches. The collapse pressure Pc is given by Pc=2 Ym $(((D/t)-1)/(D/t)^2)$~30,000 psi, where the material yield strength Ym is taken to be 120,000 psi. All chambers 450 are sealed by individual seals and by Viton gasket rings that also serve as electrical insulation against the contact rings 430. Electrically, the repeater pressure housing 470 is a single, insulated electrode and the contact rings 430 form a second, namely a ground, electrode. The repeater works by sensing radiofrequency voltages between these two electrodes, processing the modulated information, and sending out in response packet messages modulated onto a radiofrequency carrier and applied between housing and ground.

FIG. 18 illustrates the electrical characteristics of the system as installed in a pipe joint. The "hot" plates of the pin electrodes 370 couple electrically (as opposed to magnetically) through the dielectric coating 400 to the drilling fluid 500 and from there to the insulated inner surface of repeater housing 410. The electric circuit is completed through the ground connection from the repeater's contact ring 430 to the pin face 375 (not shown) and further through capacitive ground coupling to the "cold" plates of the pin electrodes 370. Similarly, the insulated outer surface of the repeater housing 410 couples electrically to the "hot" side of the box electrode system 350, which communicates through the transmission line(s) 360 with the pin electrode system 370 on the far side of the same pipe joint. The return ground connection is provided through the contact ring 430, the pin/box threads and capacitive ground coupling to the "cold" plate. The pin electrode 370 in turn couples to yet another repeater (not shown), completing the communication path between adjacent repeaters. Due to symmetry, each repeater communicates with its two closest neighbors. Under favorable transmission conditions such as highly dielectric non-conductive drilling fluid, signals can travel even between repeaters that are more than one pipe joint separated from each other. All electrode systems influenced by a transmitting repeater are in resonance. All repeaters contained in the repeater housing couple to all electrode segments, thereby providing full redundancy. Also important is the fact that all couplings are weak in the sense that neither a short circuit nor an open circuit within one segment can cause the remaining segments to malfunction. However, such a failure is evident through a reduction in repeater-to-repeater signal level. In the case of two electrode segments per electrode system, the loss of one segment causes a drop of −6 dB in received signal strength, sufficient to trigger a warning reporting condition.

It has been found experimentally that the arrangement shown provides on average received signal strength (RSS) of about −60 dB below the transmitter level, using oil as signal transmission medium at an operating frequency of 27 MHz. The RSS drops by 10 dB for the case of air as the medium and increases by about 25 dB for the case of fresh (i.e., poorly conductive water). As salinity and temperature of the water increases, its conductivity, together with unavoidable leakage currents to the pipe metal, decreases the RSS. In the limit of salt-saturated brine, the received signal is about −75 dB below the transmitter level. In the worst-case of salt-saturated brine and a partial electrode failure, the signal level through the remaining segment is about −80 dB below transmitter level. Therefore, at a nominal transmitter power of 10 dBm (0.7 V), the worst-case received signal is about −70 dBm or 70 microvolts.

Figure 65:
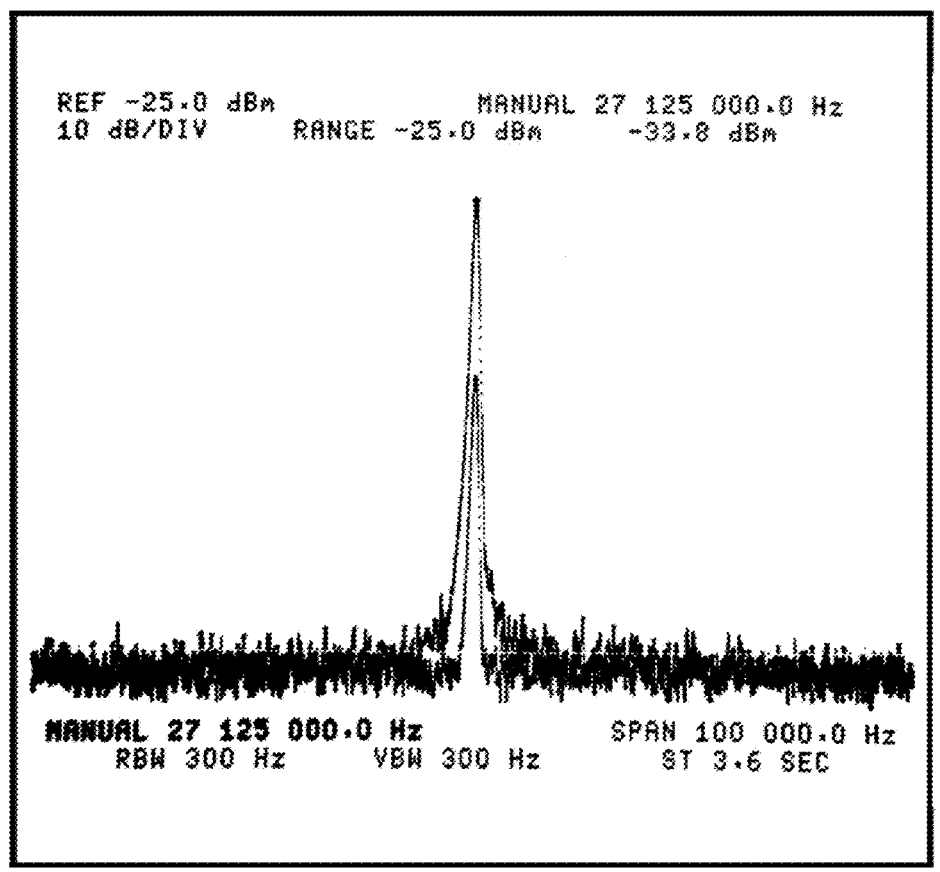
FIG. 65 is a screenshot from a spectrum analyzer CRT showing the radiofrequency carrier signal received through a prototype of the data transmission system in the cases of water and or air as drilling fluid.

FIG. 65 is a screen shot from the CRT of an HP 3585A spectrum analyzer showing received signals through a prototype of the data transmission system. The horizontal axis is frequency with a span of 100 kHz and centered on 27.125 MHz. The vertical axis is received signal amplitude in dBm with −25 dBm at the top of the range and −125 dBm at the bottom. A radiofrequency signal with a frequency of 27.125 MHz is injected with a level of 0 dBm (0.2236 V) at the approximate location of repeater and the detected signal at the approximate location of the next repeater is shown on the screen. The stronger signal (upper trace) corresponds to the case of water as dielectric medium within the bore; the weaker signal (lower trace) corresponds to an empty, air-filled bore. The approximate ratio of signal strengths is about 32 dB or a factor of 40, which compares well to the expected ratio of dielectric constants between fresh water (~50) and air (~1) at 27 MHz.

FIG. 19 further details the modifications required to convert a standard API rotary connection to data transmission capability. The box end 301 has been enlarged radially and also in depth in accordance with FIG. 16 and Table 16, pp. 24-25, in: "Specification for Rotary Drill Stem Elements—API Specification 7," 40$^{th}$ Edition, November 2001, American Petroleum Institute, API Publishing Services, Washington, D.C. This specification was designed as stress-relief measure for the box portion of a rotary tool joint. As a side effect, adequate space for the repeater housing 410 is created, provided that the tolerances on pin length and box depth are held tighter than required by the API specification. Preferably, the machining operation is performed on new tool joints before the tool joints are welded to the tubulars. However, the backboring operation may also be performed on complete pipe joints, both new or previously used. For tool joints of typical dimensions, the space available between the pin face 375 and the back of the box after backboring is about 2 inches ($L_{CB}$). The I.D. of a backbored box is approximately 4.2 inches ($D_{CB}$), while the flow channel has a typical diameter of 3 inches, leaving a wall thickness available for the signal repeater housings of approximately 0.6 inches (15 mm) The notation in FIG. 19 corresponds to the notation used in API Spec 7. It is important for the function of the data transmission system that the length of the pin (parameter "$L_{Pin}$") is well defined and subject to much tighter tolerances than defined by the API Spec 7. Therefore, machining the pin section 303 includes checking for proper pin length and, if necessary, cutting to the proper length and re-surfacing the pin 320.

Figure 20:
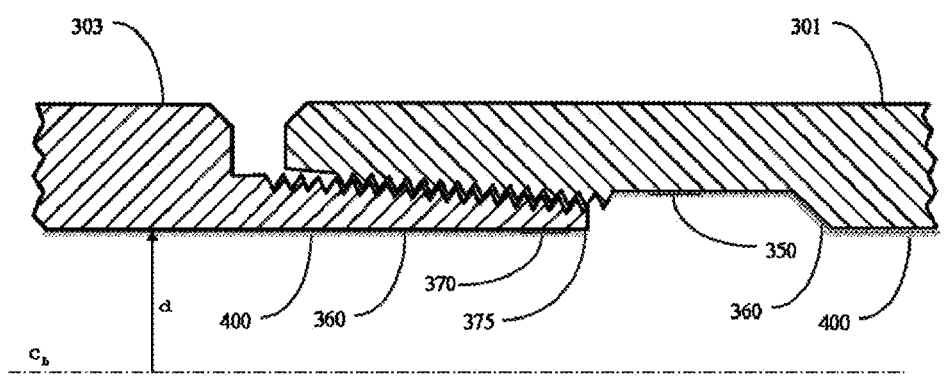
FIG. 20 is a cross section through a modified API-type rotary connection in a partially made-up state with electrodes and transmission lines installed and coated with an epoxy system.

FIG. 20 shows a modified rotary connection with data transmission elements 350, 360 and 370 installed and the epoxy coating 400 applied. The coating 400 not only serves as corrosion inhibitor, but also as protection for the electrodes 350 and 370 and transmission line elements 360. The coating 400 also serves as electrical insulator between the electrodes 350 and 370 and the pipe metal as well as between the electrodes 350, 370 and the drilling fluid. Typically, the coating 400 will not achieve 100% coverage, which is not necessary for the functioning of the data transmission system. It is important, however, that the signal loss due to shunt currents flowing from the signal path to ground is limited. From electrical modeling it has been found that a shunt current corresponding to a 1-mm wide gap, exposing bare metal over the entire circumference in the pin/box interface to a fluid with 50 S/m conductivity is acceptable. Note that the pin face 375 is not epoxy covered. This surface sees rough handling on the rig floor and would not retain the coating. Instead, this metal surface serves as ground connection to the repeater housing 410 once the rotary connection is fully tightened.

Figure 21A:
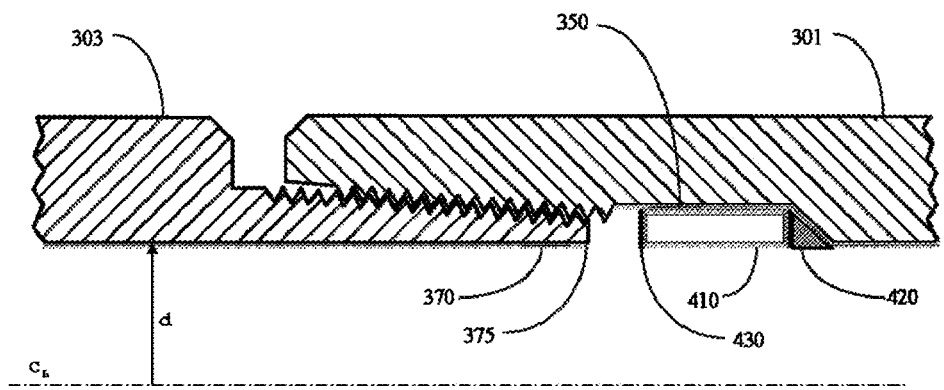
FIG. 21a is a cross section through a modified API-type rotary connection with the data transmission system installed.

FIG. 21a shows the components of FIG. 20 with the signal repeaters installed in the box. The repeater housing 410 occupies the straight part of the box cavity, while the taper ring 420 fills the space at the back wall that tapers from the larger cavity (diameter "$D_{CB}$") to the smaller I.D. of the box tool joint (diameter "d"). The inner diameters of both the repeater housing 410 and the taper ring 420 are epoxy-coated. The surface facing the pin, i.e., the flat face of the contact plate 430, remains bare metal. A snap ring (not shown) may be used to secure the repeater housing 410 in the box. The repeaters remain in a very-low-power state as long as the connection is not made up. In this state, the repeaters periodically power up for a short amount of time, determine the capacitance of the insulated housing against ground and re-enter the very-low-power state if that capacitance is below a threshold, indicating that the contact plate 430 of the repeater housing 410 is not in contact with a ground connection.

Figure 21B:
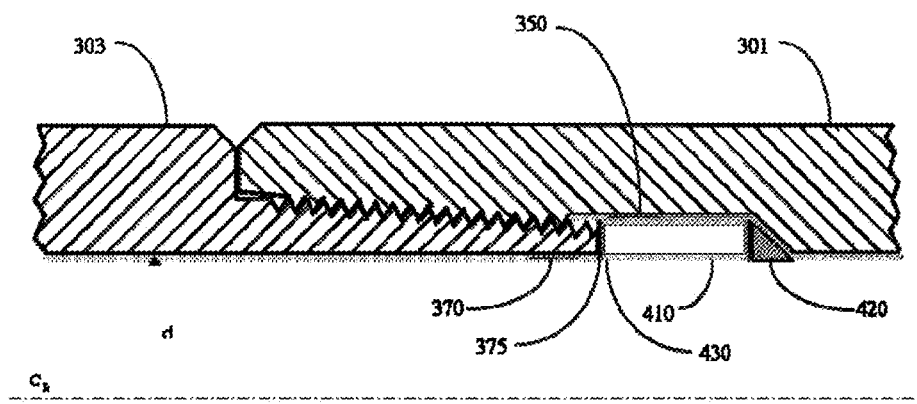
FIG. 21b is a cross section through a modified API-type rotary connection with the data transmission system installed in a fully made-up state.

FIG. 21b is the rotary connection as in FIG. 21a, but in the made-up (tightened) state. The pin length had been dimensioned such that the pin face 375 contacts the repeater housing 410 while the connection is made up and exerts compressional force on the repeater housing 410 and the taper ring 420, keeping both components captive. This stopping action also prevents the connection from being overtorqued. In order to aid this operation, the taper ring 420 can be configured as a spring element and may be made from a suitable material such as beryllium-copper. Since the taper ring 420 is not essential for electrical connections, it may also be made from an elastomeric material. A secondary function of the taper ring 420 is to protect the transmission lines from mechanical damage, particularly at the points where the transmission wire 360 has to cross from the enlarged portion of the box into the tapered area and from the tapered area into the bore. The taper ring 420 is designed to cover both sensitive areas such as these areas are no longer exposed to drilling fluids and erosion does not take place as a result.

As soon as the electrical contact between the contact plate 430 and the pin face 375 is established, the capacitive load against ground as seen by the repeaters increases to its operating value. In response, the repeaters exit their dormant state and enter another low-power state in which the repeater's receivers are activated from time to time and listen to transmission signals from active repeaters. Galvanic contact between the contact plate 430 and the pin nose 320 is not required. As long as these two surfaces are in close proximity with capacitive coupling of a few 100 pF, the capacitive load against ground is within its nominal operating range.

Figure 22A:
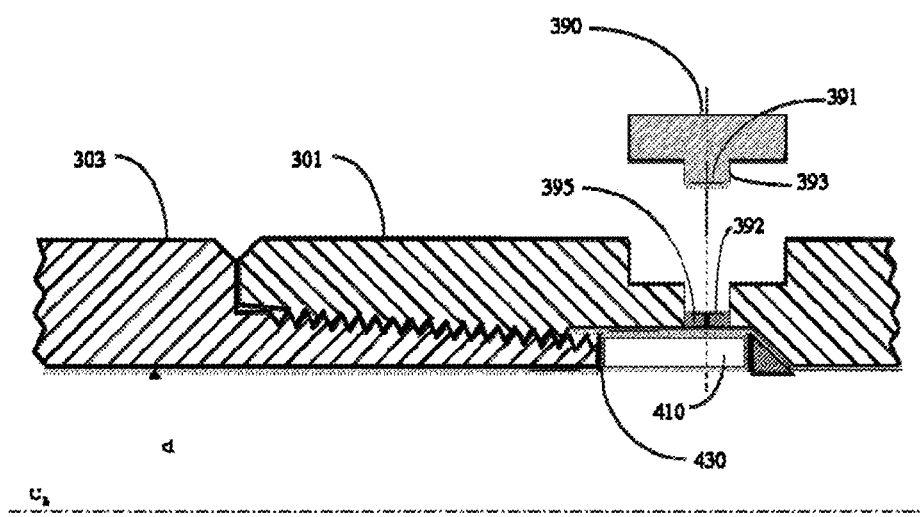
FIG. 22a is a cross section through a modified API-type rotary connection with the data transmission system installed and showing the approximate locations and dimensions of sensor elements.
Figure 22B:
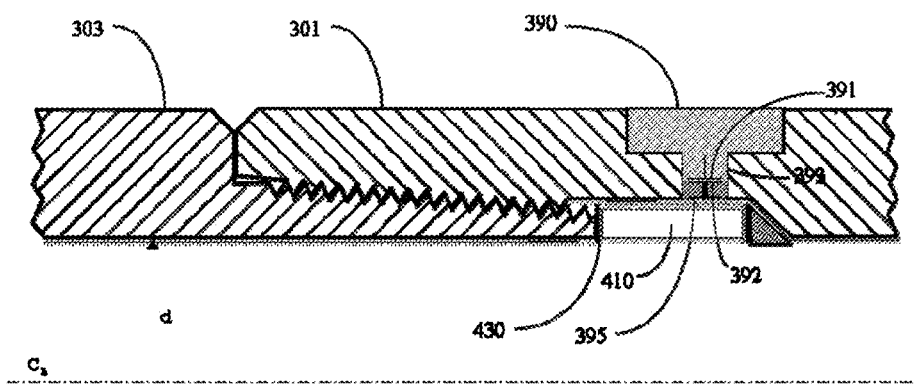
FIG. 22b is a cross section through an API-type rotary connection with the data transmission system installed and sensor elements installed.

FIGS. 22*a* and 22*b* show the same rotary connection as FIGS. 21*a* and 21*b* with the optional sensor insert 390 included. The two main parts are the sensor insert 390 proper and a plug 395 that seals the pipe interior from the recess machined into the box section 301 to house the sensor insert 390. The plug 395 is made from a high-performance composite material such as polyetheretherketone ("PEEK") or from a ceramic and is permanently mounted in the box, while the sensor insert 390 is removable. Such PEEK plugs can be custom made by Green, Tweed of Houston, Tex. The sensor insert 390 is a fully sealed, self-contained package that screws into a form-fit machined recess in the tong section of the box end 301. The sensor insert 390 senses environmental conditions in the outer borehole annulus or in the formation and communicates via capacitive coupling using radiofrequency signals with the repeaters located inside the box. This communications channel consist of a capacitive signal electrode 391 within the sensor insert 390 that couples to a relay electrode 392 within the plug 395, which in turn couples electrically to the insulated repeater housing 410. The electric circuit is completed from the sensor insert stem 393 to the pipe metal to the rotary thread and to the contact plate 430 on the repeater. Repeaters and sensors have a master-slave relationship, in which a repeater interrogates the state of the sensor using specially formatted communication packets transmitted at radio frequency (e.g., at 27 MHz) and the sensor responds with a status communications packet.

Figure 23:
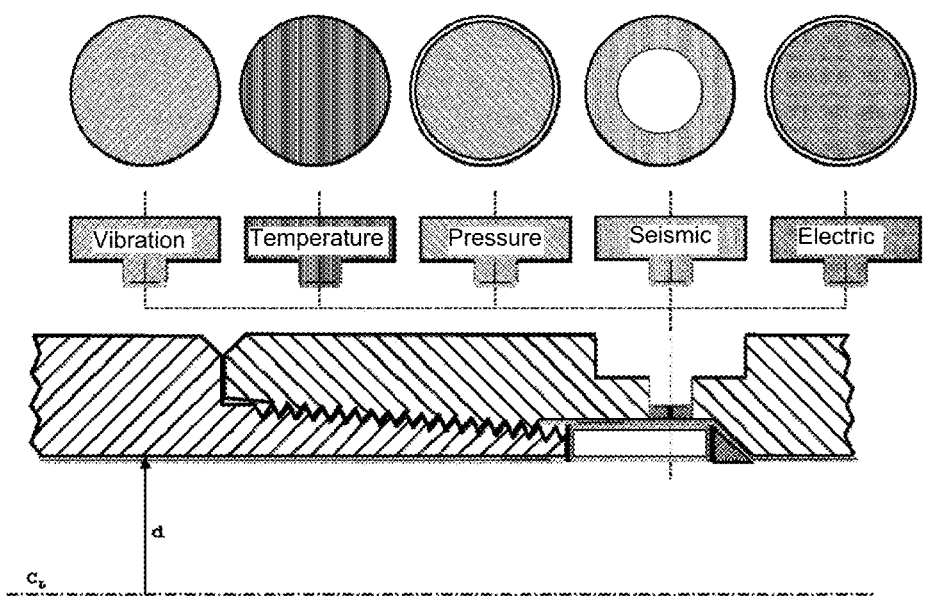
FIG. 23 is an illustration of various interchangeable sensor inserts with different sensing functions.

FIG. 23 enumerates some of the sensors that can be deployed in the sensor insert 390: Accelerometers to assess drillstring vibrations and drilling dynamics; temperature sensors to map the temperature profile along the borehole (and thereby detecting influx of connate fluids that are hotter than the circulating drill fluids); pressure sensors to map the pressure gradient along the borehole, which is beneficial in balancing borehole pressure against formation pressure; geophones to act as receivers in VSP (vertical seismic profiling) applications; electric current sensors to map the conductive environment around the borehole; and others known to those skilled in the art.

Figure 24:
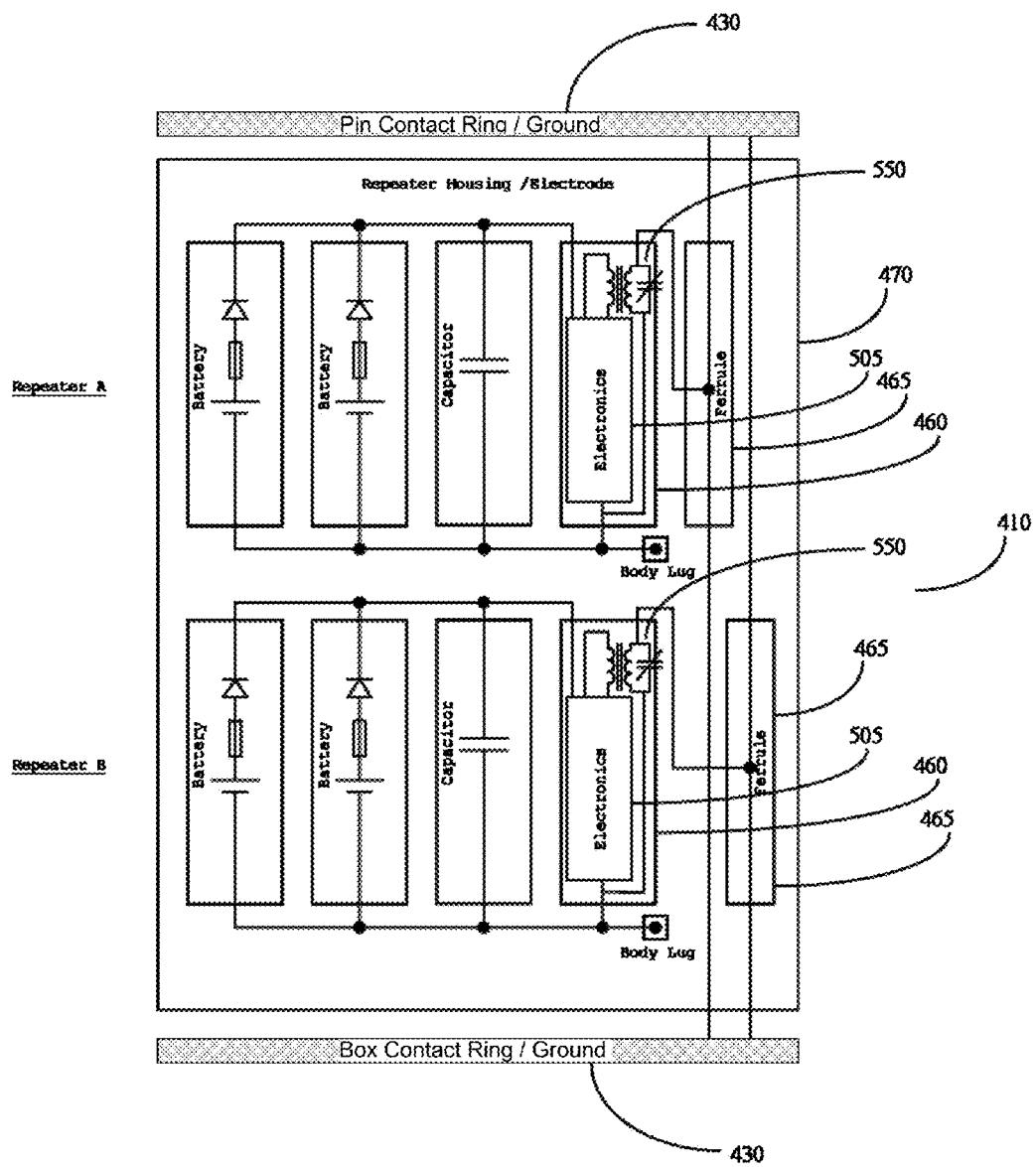
FIG. 24 is a block diagram of a twin repeater using non-rechargeable batteries.

FIG. 24 shows an electrical circuit block diagram of the various components inside the repeater housing 410. In this example, two repeaters (A and B) are utilized. As shown, each primary cell has an integrated fuse and diode, allowing cells to be shunted in parallel for redundancy and added ampere-hour capacity. Repeaters installed in drill collar joints may require two battery cells as shown in FIG. 24. The supply voltage from the cell(s) feeds the core circuit 505 contained in cartridge 460 that performs the function of a packet radio. The circuit's transmit/receive stage contains a tunable tank circuit 550, which is connected to (a) the repeater housing main body 470, and (b) to the contact rings 430 on each end of the repeater housing through ferrules 465. Each core circuit 505 in cartridge 460 has a temperature sensor, which allows for tracking the change in permittivity, and hence resonant frequency, of the electrodes systems.

A particular advantage of using two primary cells per repeater in the arrangement shown in FIG. 24 is the possibility to combine cells with different discharge characteristics. While the first cell may be a commercial cell such as the aforementioned size ½ AAA lithium cell 10-25-150 from Electrochem, the second cell can be a custom design with favorable discharge characteristics. The commercial cells, to be of universal use, must have a certain minimum current delivery capacity, typically in the milliampere range, which implies a minimum membrane cross section, which in turn puts a floor under the self-discharge current flowing at high operating temperatures. A custom cell design can be "programmed" by means of limiting the membrane cross section for very low current delivery (a few 100 microamperes), but with very favorable self-discharge characteristics. By combining such different cells, short-term, high-current demands can be met by the commercial cell, while the long-term power needs are met by the custom cell. In the extreme, the commercial cell may have long been depleted, while the repeater still functions based on the custom cell alone, albeit at a reduced duty cycle and at data rates matched to the lower power available.

Figure 25:
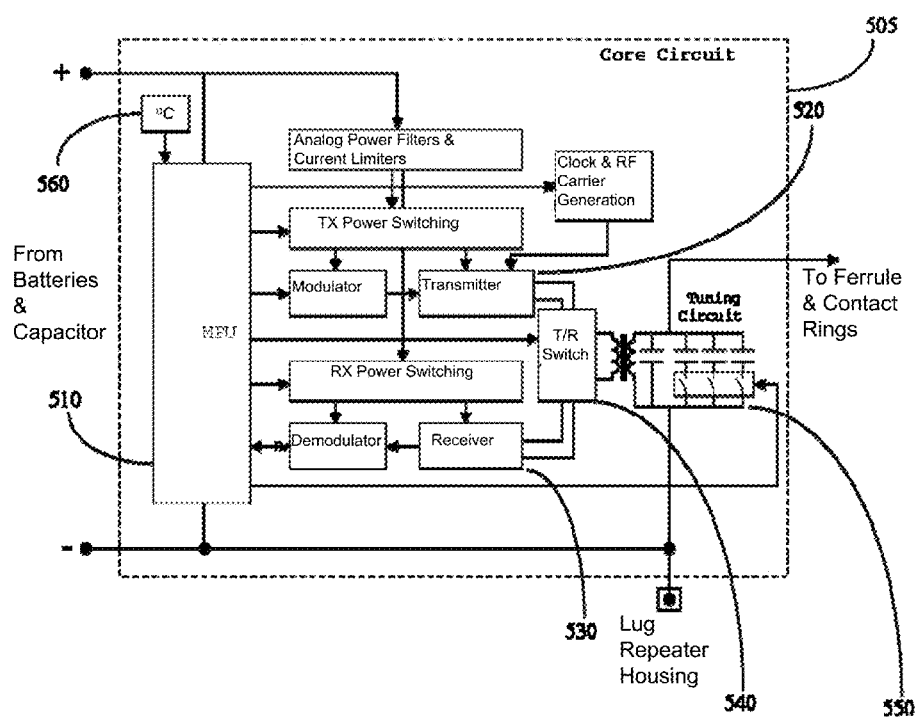
FIG. 25 is a block diagram of a repeater core circuit.

FIG. 25 is a more detailed block diagram of core circuit 505. The functions of a packet radio are realized by a microcomputer unit (MPU) 510, a transmitter section 520, a receiver section 530, a transmit/receive (T/R) switch 540 and a digitally tunable tank circuit 550. The MPU 510 controls the power supplied to all analog frontends as well as to all sensors and clock circuits. Together with its own standby capabilities, the MPU 510 can reduce the circuit's power consumption to a few microamperes during idle times. This functionality is important to achieve service times of up to and exceeding 1,000 hours. Also indicated is the temperature sensor 560 that allows the MPU 510 to track the change in dielectric permittivity exhibited by the electrodes.

The T/R switch 540 routes a transmit signal to the tank circuit 550 and the electrodes; connects the tank circuit 550 and electrodes to the receiver input; and also gates a low-amplitude transmit signal to the tank circuit 550 while receiving the reflected signal. A periodical frequency sweep across the range of permitted operating frequencies allows the MPU 510 to determine the real and imaginary loads at the electrode. The variable load conditions are compensated by switching in and out additional tuning capacitors contained in the tank circuit 550, allowing the MPU 510 to keep the resonance frequency and therefore the optimum operating frequency in a narrow range.

The T/R switch 540 implements its functions under control of the MPU 510. First, during a signal transmission interval, the T/R switch 540 connects the transmitter section 520 to the tank circuit 550, but protects the sensitive receive section 530 from the outgoing large-amplitude signal. During signal reception, the T/R switch 540 connects the receive section 530 to the tank circuit 550, and enabling signal reception by disconnecting the transmit section 520 from the from the tank circuit 550. Lastly, during idle periods, the T/R switch 540 completely disconnects the tank circuit 550 from all other circuitry, presenting only a high-impedance load to the outside. The MPU 510 also commands the T/R switch 540 to disconnect from the outside world in the events of low battery power or a detected hardware or software fault. In such a case the MPU 510 proceeds to shut itself down. Without power from the battery and/or a specific "transmit" or "receive" command from the MPU 510, the T/R switch 540 by default isolates the internal circuitry from the outside world. These features of the T/R circuitry 540 enable multiple repeaters to operate in parallel using the same electrodes. It also allows repeaters to continue to operate in case one or more of the parallel repeaters has ceased to operate normally.

The ability to re-tune the antenna tank circuit digitally and to adopt the operating frequency to the operating conditions is particularly advantageous if the data transmission system is deployed in variable and a priori unknown drilling fluid systems. It has been found experimentally that a system tuned to 27 MHz for non-conductive, dielectric drilling fluids such as air, foam, oil or very fresh water will operate best in a frequency range around 20 MHz when operated in conductive drilling fluids such as brine. The reason is that the fluid increases the ground capacitances of the pin and box electrodes, as well as the ground capacitance of the repeater housing 410. The aforementioned frequency sweep detects the electrical environment created by the drilling fluid and allows the repeater MPUs 510 to switch to the operating frequency appropriate for the drilling fluid. It has been found that the MPUs 510 need only to distinguish between two operating bands: one for conductive fluids (~20 MHz) and one for dielectric fluids (~27 MHz), which makes certain that all repeaters agree on the same frequency band.

Figure 54:
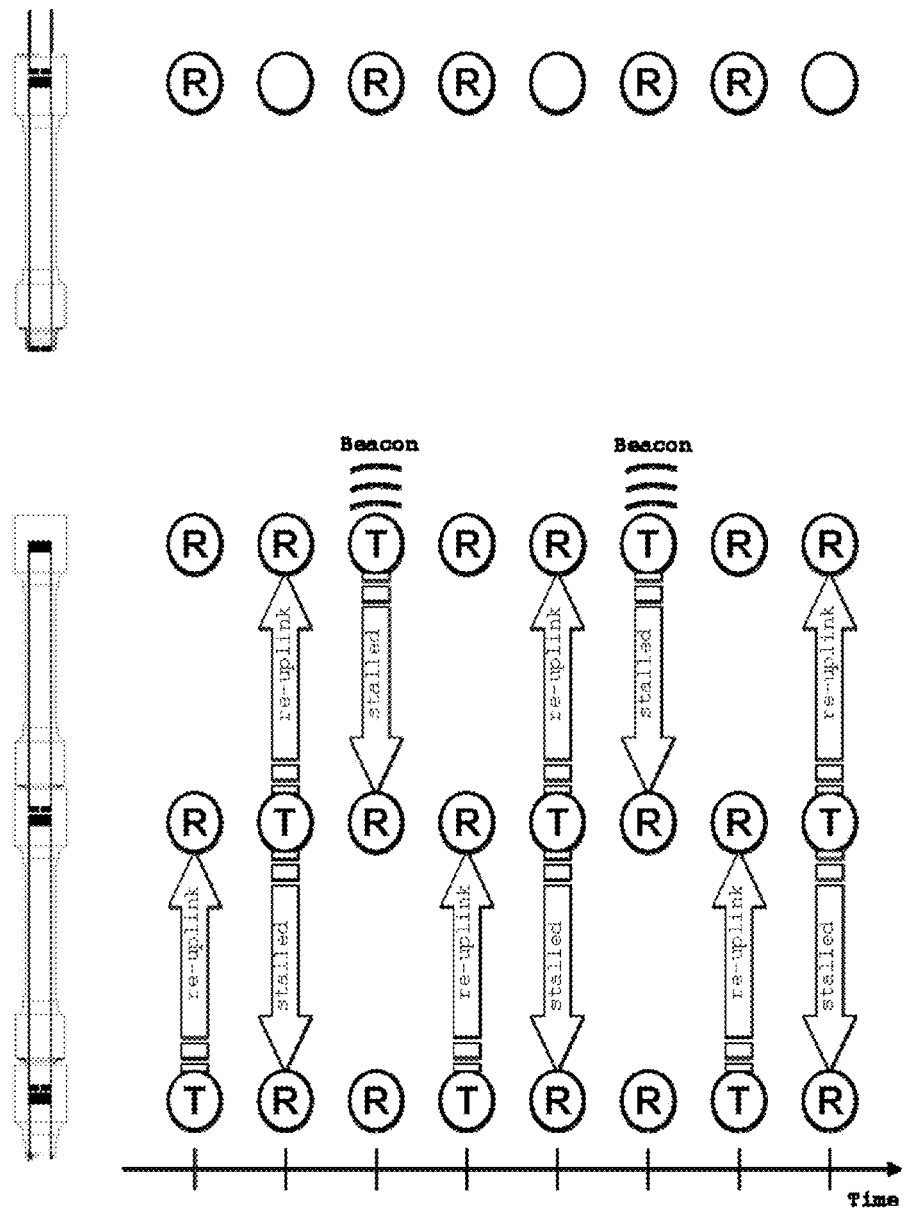
FIG. 54 shows a portion of the transmission system in the process of adding another pipe joint.

A special case may exist when new pipe is being added to a drill string in the borehole. The situation is illustrated in FIG. 54. The pipe string in the borehole is typically filled with borehole fluid, while the new pipe joint may be empty. The repeaters in the new pipe are listening in time periods "R" for the arrival of "beacon" signals that would allow them to synchronize to the existing repeater network. Since it is not possible for the "orphaned" repeaters to know the established operating frequency band a priori, they listen for beacon signals alternatingly on both bands by digitally adding capacitance to the antenna tank circuit to switch from around 27 MHz down to around 20 MHz. The frequency of the first beacon signal detected locks in the operating frequency band to use. Therefore, as the network builds up by adding more repeaters, all repeaters automatically communicate on the same frequency.

Figure 26:
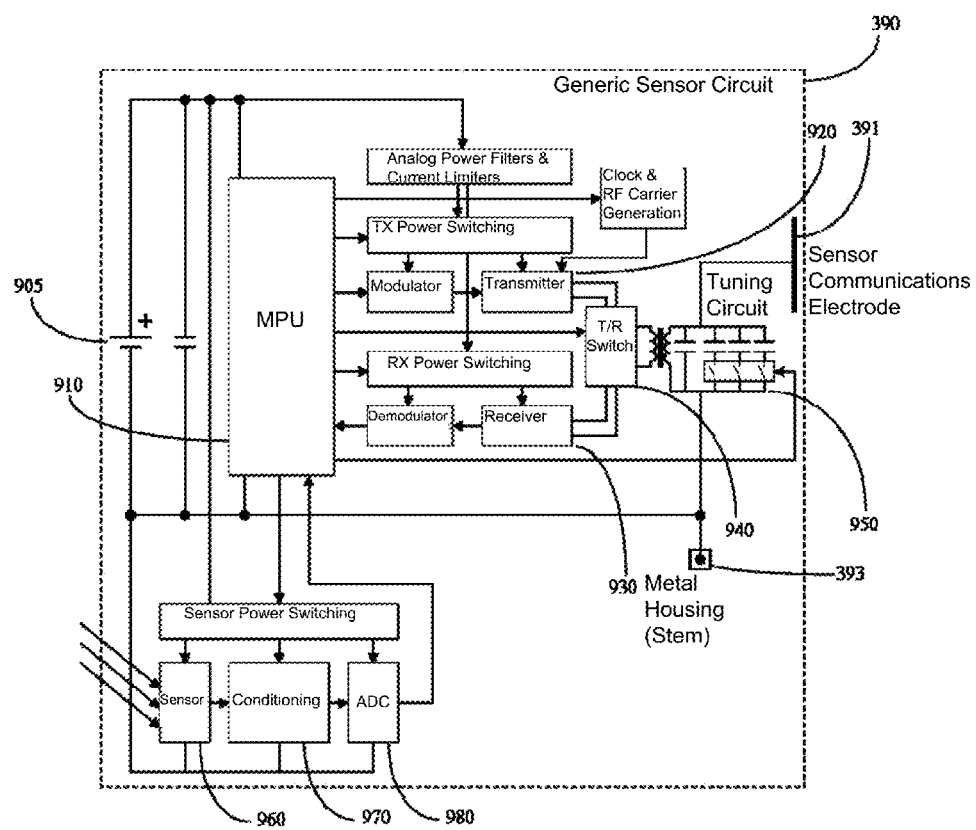
FIG. 26 is a block diagram of a sensor insert circuit.

FIG. 26 is a block diagram of the optional sensor insert 390. It contains its own battery 950, processing unit (MPU) 910 and packet radio stages 920-950. Input data from the environment are conditioned, digitized and processed within the circuit using sensing, conditioning, and A/D conversion elements 960, 970, and 980, respectively. The circuit communicates with the associated repeaters by means of capacitive coupling. This local communication may use the same carrier frequency as the telemetry service, in which case time multiplexing is employed, or may be allocated a separate frequency in a frequency-multiplexing manner.

FIGS. 66-69 show an implementation that is suitable for double-shouldered rotary connections. As opposed to the single-shouldered, API-standardized design discussed up to this point, in double-shouldered connections, the back wall of the box is flat and makes contact with the pin face 375 when the connection is fully made up. Thus, a secondary shoulder is formed that takes up some of the mechanical load and that prevents over-torquing the connection. According to the present invention, standard API connections may also be modified as shown in FIGS. 66-69, thus improving the mechanical characteristics of the connection and creating the "look-and-feel" of a double-shouldered connection.

Figure 66:
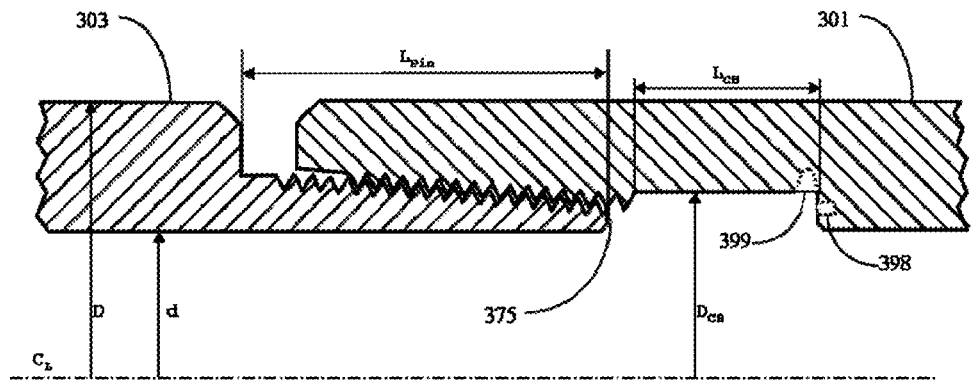
FIG. 66 is a cross section through a double-shoulder rotary connection modified to accept data transmission elements.

FIG. 66 shows cross-sections through the box and the pin after the box has been back bored to create a cavity suitable for a signal repeater housing. The new box backwall is flat and the length of the cavity equals the height of a double-shoulder repeater (1.5 to 2 inches [38 to 50 mm]) A key seat 398 and/or a stress-relieve feature 399 may be milled into the box.

Figure 67:
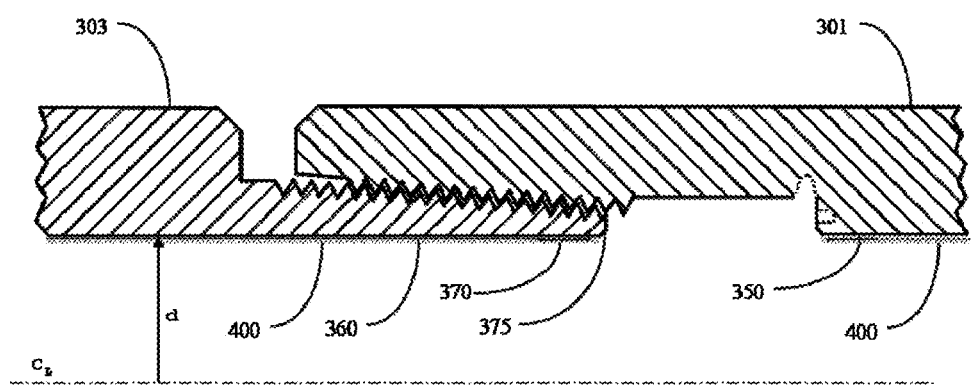
FIG. 67 is a cross section through a modified double-shoulder rotary connection in a partially made-up state with electrodes and transmission lines installed and coated with an epoxy pipe coating system

FIG. 67 shows the box and pin cross sections after the transmission elements box electrodes 350, transmission lines 360 and pin electrodes 370 have been installed and embedded in coating 400.

Figure 68:
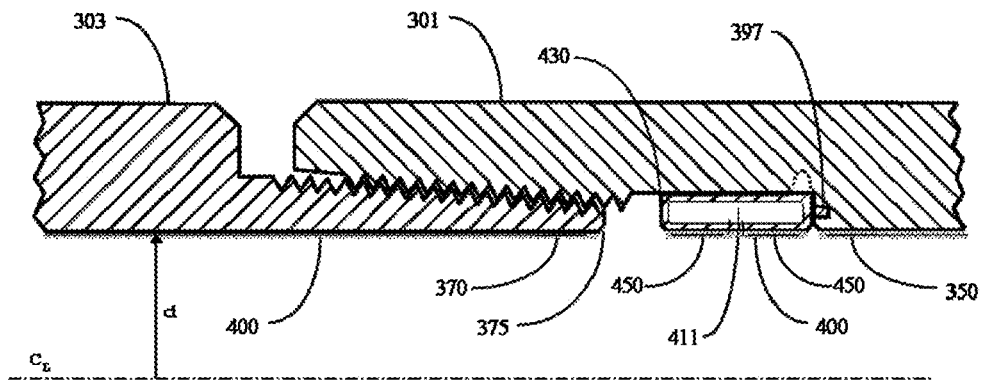
FIG. 68 is a cross section through a modified double-shoulder rotary connection with the data transmission system installed.

FIG. 68 shows the box and pin cross sections after the double-shoulder repeater housing 411 has been installed. A pin 397 on the repeater housing 411 engages with the key seat 398 in the box back wall, locking the repeater in place and preventing its rotation within the box cavity. The double-shoulder repeater 411 shares the same general construction principle with API-type repeater 410; however, the repeater housing body and the contact rings 430 of repeater housing 411 are electrically connected to each other. Signal transmission and reception occurs through coated surface electrodes 450 that communicate with the pin electrodes 370 and the box electrodes 350, respectively, through the borehole fluid. The construction of the repeater electrodes 450 is generally the same as that for pin and box electrodes; e.g. the repeater electrodes are similarly embedded in epoxy coating 400.

Figure 69:
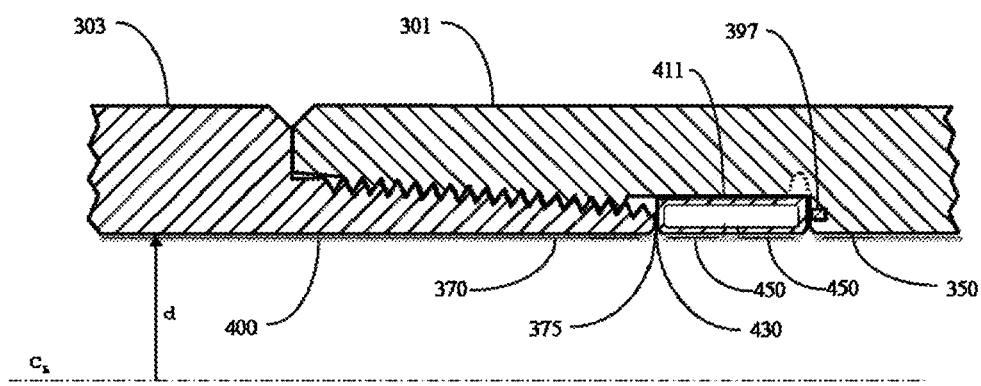
FIG. 69 is a cross section through a modified double-shoulder rotary connection with the data transmission system installed in a fully made-up state.

FIG. 69 shows the cross section in the fully made-up position. The pin face 375 contacts the repeater and exerts a compressional force on the repeater that is transmitted to the box backwall. The pin face 375 also electrically grounds the contact ring 430 and the repeater housing 411 itself. Thus, the electrodes 450 become electrically "hot" and can act as radiofrequency transmitters and/or radiofrequency receivers.

Figure 70:
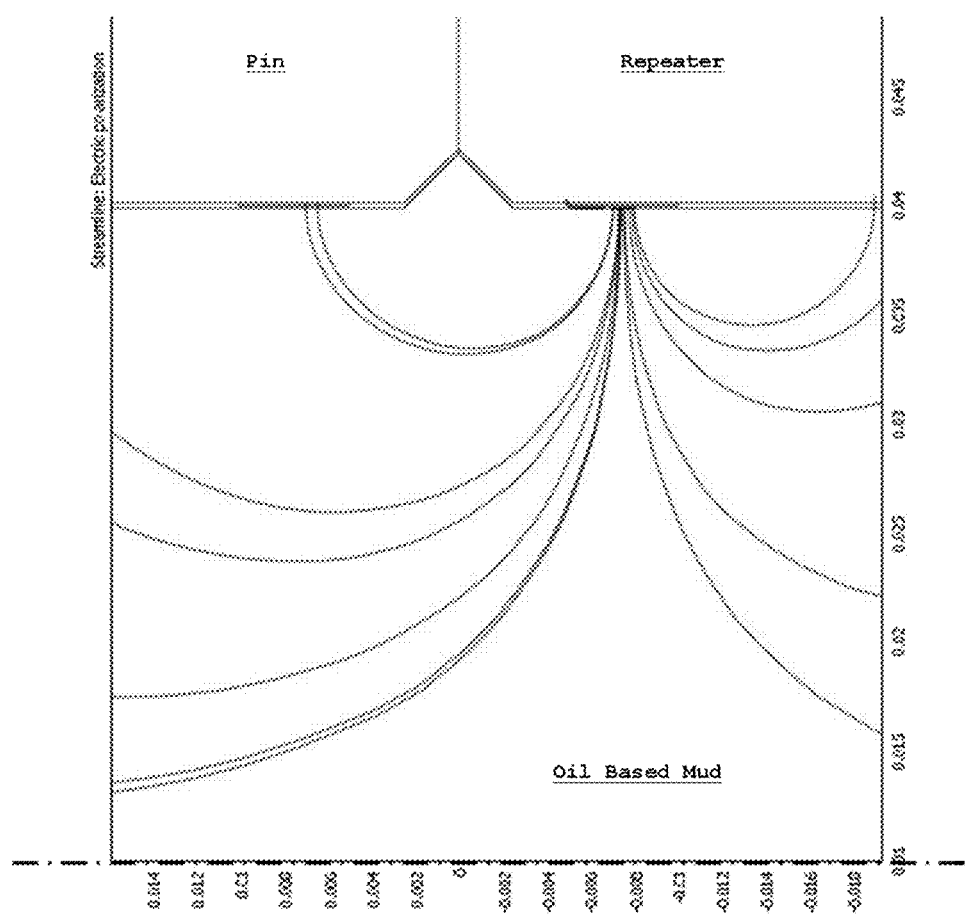
FIG. 70 is a computed plot showing displacement current lines within a double-shoulder rotary connection with the data transmission system installed.

FIG. 70 is a numerical simulation result generated by COMSOL (COMSOL Multiphysics, version 3.5a, COMSOL Inc. Burlington, Mass. 01803). The plot shows the geometry inside the fully made-up rotary connection with the pin in contact with the repeater housing 411. The streamline plot has been generated for the case of a dielectric drilling fluid such as oil-based mud. Shown are the field lines of the electric polarization, or equivalently, the field lines of the displacement current. In this example about 1% of the displacement current emanating from the transmitting electrode, which in this case is a repeater electrode, arrives at the destination electrode, which in this case is the pin electrode 370.

The repeater electrodes 450 may cover the entire inner annular circumference) (360°. In this case, the antennas of the repeater electrodes 450 couple azimuthally uniformly into the box electrodes 350 and the pin electrodes 370 and the particular azimuthal orientation of box electrodes 350, pin electrodes 370 and repeater 411 and therefore of repeater electrodes 450 is of no particular consequence. In this case the key 397 and the key seat 398 are optional.

Figure 71:
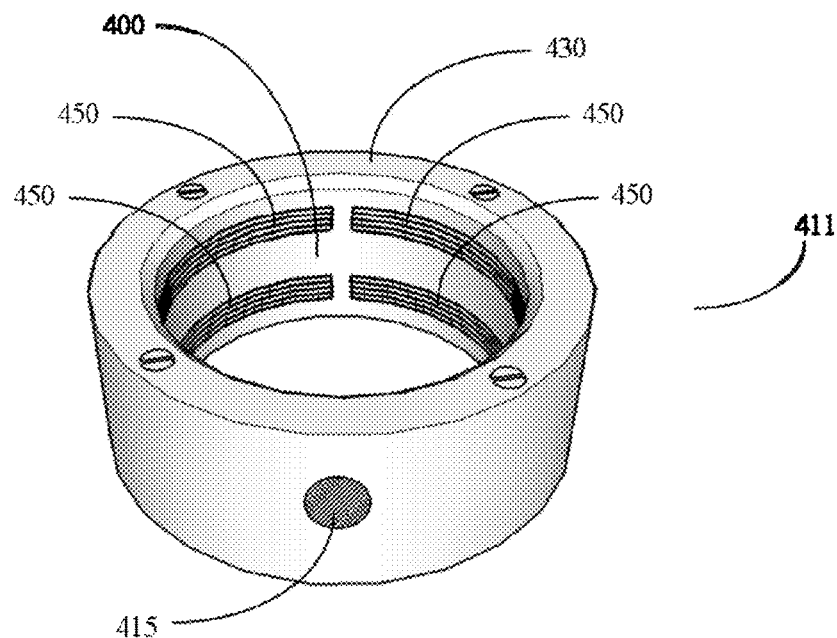
FIG. 71 is a perspective view of a repeater housing for a double-shoulder rotary connection.

The repeater electrodes 450 may also be split into two or more circumferential segments as shown for the case of two segments per electrode in FIG. 71. The number of segments should equal the number of segments in the box and pin electrodes 370 (see FIG. 11a). In the case of two segments per any such electrode, the repeater electrodes 450 should be rotated by 90° with respect to the pin electrode segments 370 and/or with respect to the box electrode segments 350. In order to achieve correct alignment, both pin and box electrodes must be mounted in fixed relationships with respect to the pin and box thread forms, respectively, such that in the fully made-up state corresponding pin and box electrode segments either face each other or are rotated with respect to each other by a fixed 90° angle. The angular orientation of the repeater electrodes 450 is fixed by the positions of the pin 397 and the key seat 398.

In the case of azimuthally segmented antennas 450 as shown in FIG. 71, each segment is electrically connected to its own repeater within the repeater housing 411. The electrical connection is realized by routing a strand of each electrode 450 to the inside of the repeater housing 411 and connecting the "hot" side of the electrode to the T/R switch 540 or 940 and the tuning circuit 550 and 950. Due to the fixed, relative azimuthal orientations of the electrode segments, each repeater weakly couples to all electrode segments within the pin and the box. Any single failure of a pin segment, a box segment, a repeater electrode segment or a repeater can be tolerated and does not lead to a failure of the system itself.

Also shown in FIG. 71 is a "dielectric window" 415 located in the side wall of repeater housing 411. This window is realized by embedding a capacitive plate electrode inside a PEEK plug in analogy to the construction shown in FIGS. 22a and 22b. The window 415 is the mirror image to the plug 395 installed in the connection box. Both plugs or "windows" 395 and 415 act in series to allow the repeater electronics to communicate via radiofrequency with the optional sensor insert 390.

It is desirable to maintain the mechanical strength of a double-shouldered rotary connection even when no data communication functions are needed. In this case it is economical to replace the repeater housing 411 by a passive insert 414, shown in FIG. 72. The passive insert 414 has the same outside dimensions as a repeater housing 411 and the two parts are interchangeable. As the name suggests, the passive insert does not contain electronics nor does it carry electrodes.

The conversion process to telemetry-enabled pipe for double-shouldered rotary connections as illustrated in FIGS. 66-69 is also applicable to standard API-type pipe. In this case, the conversion has the added benefit of improving the mechanical strength of the rotary connection. In order to maintain the strength improvement, either a repeater housing 411 or a passive insert 414 must be installed before the connection is made up.

Figure 27:
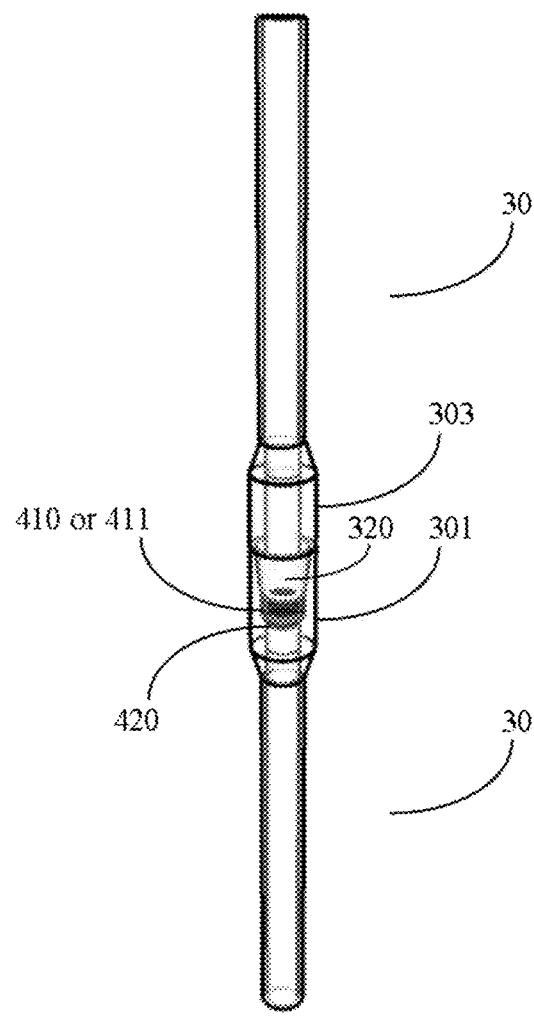
FIG. 27 is an x-ray perspective view of a made-up rotary connection showing transmission elements captured between the tool joint pin and the back wall of the tool joint box.

FIG. 27 shows two connected pipe joints 30 in semi-transparent view to highlight the data transmission system elements contained in the rotary connection. The make-up process of the rotary joint electrically couples the ground ("cold") components of all electrodes and transmission lines through the pipe metal. The repeaters 410 or 411 are grounded through contact with the pin 320 of the adjacent tool joint. In connected pipe joints, the pin electrodes 370 and the repeater housings 410 or 411 are in close proximity, i.e. within a few centimeters, and are coupled through displacement currents (in dielectric fluids such as air, foam, very fresh water, oil, or water-in-oil emulsions) or through a combination of dielectric and galvanic currents in conductive fluids such as water, brine, or oil-in-water emulsions.

Figure 28:
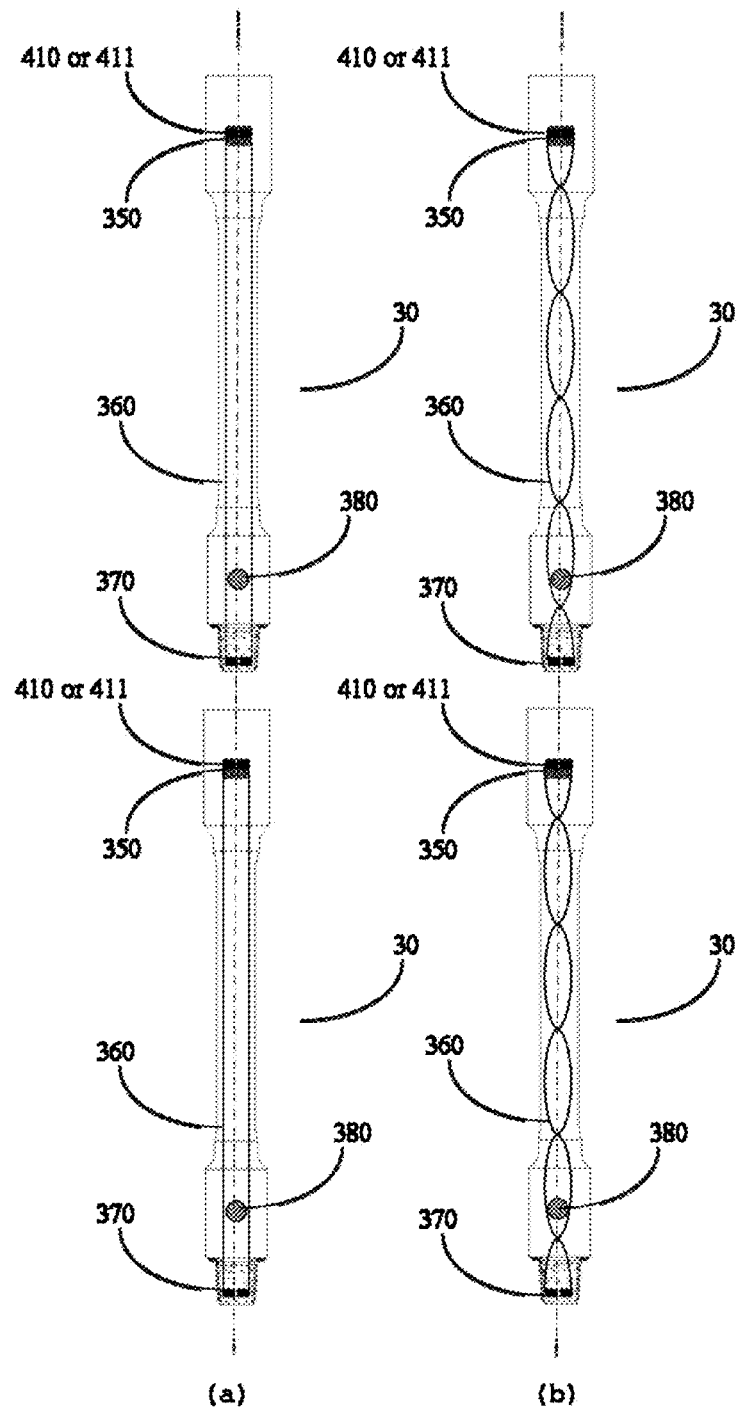
FIG. 28 is a conceptual exploded see-through view of stacked pipe joints with data transmission elements installed showing the cases of (a) straight transmission lines, and (b) twisted transmission lines.

FIGS. 28a and 28b show schematically an exploded view of two pipe joint stacks with data transmission elements installed, but without sensor inserts. In FIG. 28a the transmission lines 360, i.e. the installed wires, are mostly straight connections, while in FIG. 28b the transmission lines 360 form corkscrew-shaped spirals on the interior borewall. Preferably, an entire assembly consisting of pin and box electrode systems and connecting wires is pre-assembled, tested and installed as a single unit in a pipe joint. Since pipe joints can be of different lengths, the straight-wire version requires each assembly to be custom-made for a particular joint, whereas in the spiral-wire assembly length variations can compensated for by simply adjusting the pitch of the spiral. For clarity, the following figures show only the straight-wire version, but it should be understood that the spiraled version is equally applicable.

Figure 29:
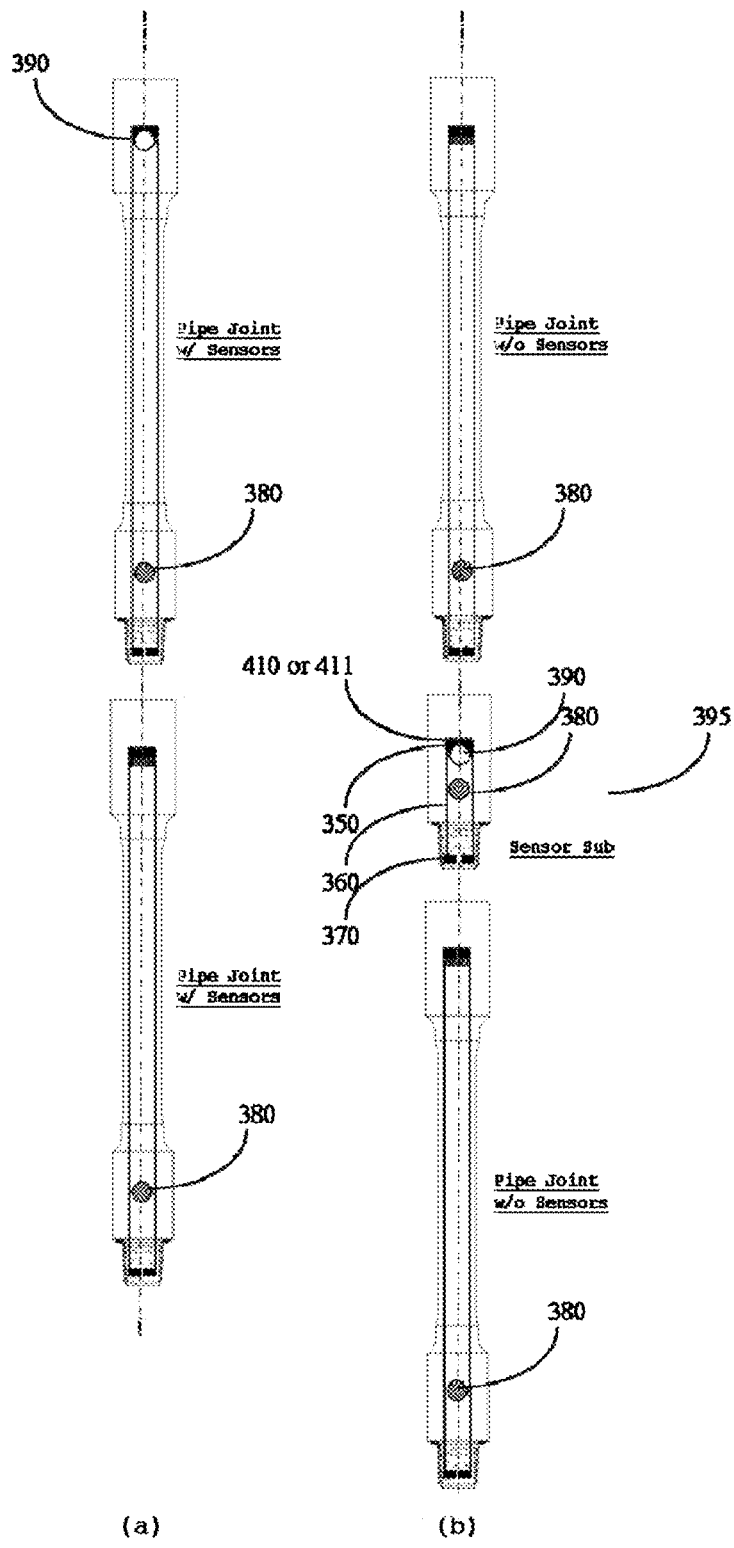
FIG. 29 is a conceptual exploded see-through view of stacked pipe joints with data transmission elements and sensor elements installed for the cases of (a) sensors installed as sensor inserts in pipe joints and (b) sensor installed in dedicated sensor subs.

FIGS. 29a and 29b show schematically an exploded view of two pipe joint stacks with data transmission elements as well as sensors installed. In FIG. 29a, the sensor inserts 390 are housed in the boxes of standard-length pipe joints as described above, while in FIG. 29b the sensor inserts 390 are housed in special sensor subs 395, which are essentially short pipe joints, complete with rotary connections and installed data transmission elements 350, 360, 370, 380 and 410/411. The advantage of FIG. 29a is a constant-length drill string with or without sensors; while the advantage of FIG. 29b is the unchanged torque/compression/tension load limit of the box sections. The sensor sub connection boxes have thicker walls compared to pipe joint boxes to compensate for the loss in strength due to the insert recess and the dielectric window.

Figure 30:
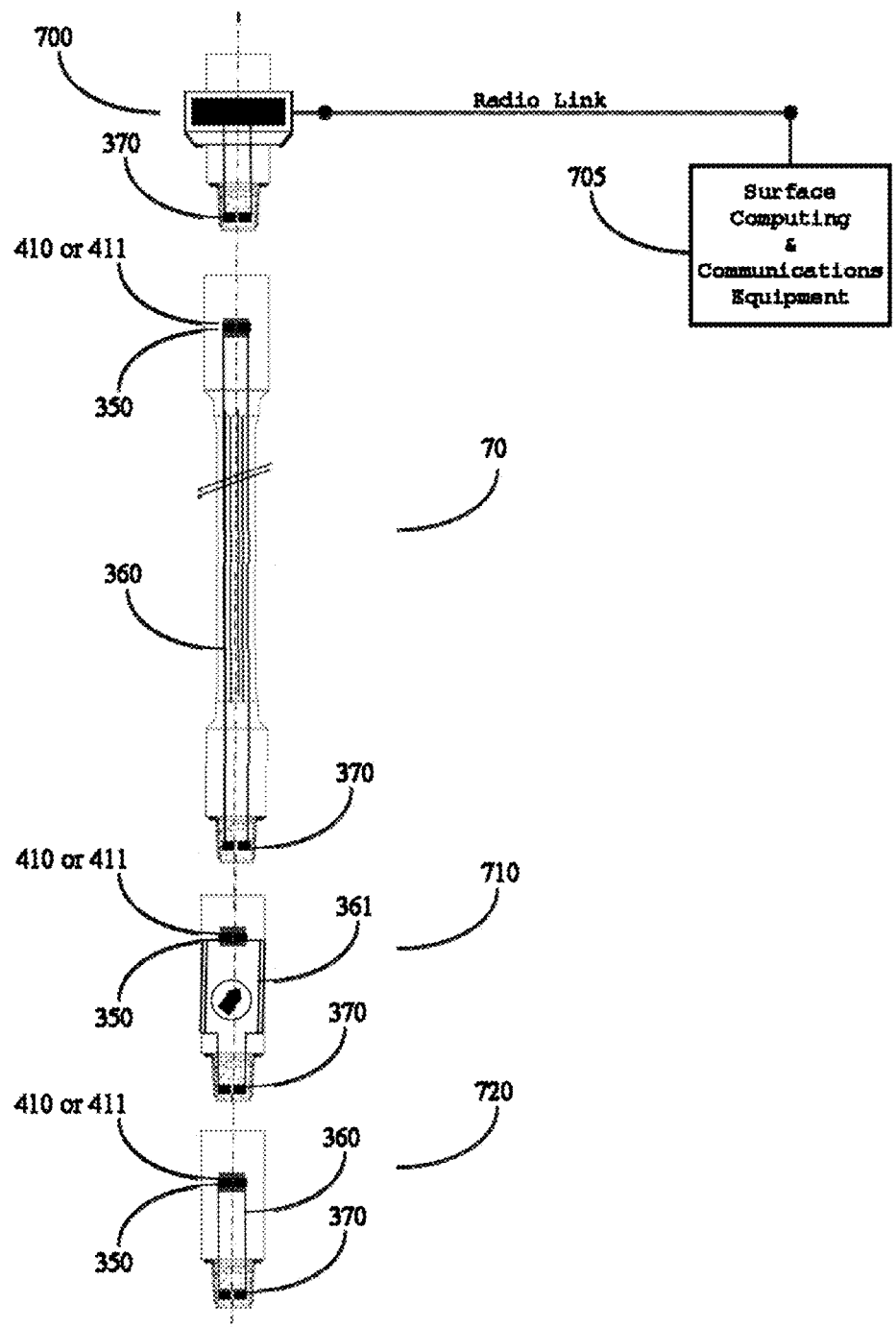
FIG. 30 is a conceptual exploded see-through view of stacked surface elements of a kelly-type drill string with data transmission elements installed.

FIG. 30 shows some detail of the transmission system at the surface. In particular, an example of a table drive system using a kelly 70 is diagrammed. The components, shown in exploded, see-through view, from top to bottom are the communications sub 700, the kelly 70, a lower kelly valve 710 (shown as an example how valves are instrumented) and a kelly saver sub 720. The communications sub 700 translates the signals traveling on the data transmission system to signals compatible with existing surface equipment. Since the communications sub is part of a rotating drill string, the communications sub 700 is preferentially battery-powered and exchanges signals with the surface equipment 705 via a radio link. Rig safety considerations, however, may demand wired-only communications, in which case the inner portion of the communications sub 700 rotates with the drill string and the outer portion is fixed with respect to the rig, allowing a cable to be run between the outer portion and rig equipment. Signal transfer between rotating and non-rotating parts is accomplished by a set of electrodes forming opposing plates of a capacitor in analogy to the components used in the drilling jar (see below). Above the communications sub 700 may be another valve or the swivel. The communications sub 700 interfaces to the rest of the transmission system via a set of pin electrodes 370. The kelly 70 is instrumented with the same transmission system components as a pipe joint, namely a repeater housing 410 or 411, box electrodes 350, transmission lines 360 and pin electrodes 370. Below the kelly 70 is shown an optional kelly valve 720, used to retain the mud level column within the kelly 70 during make-up or break-out of rotary connection below. The valve housing contains repeaters 410 or 411, box electrodes 350 and pin electrodes 370. Instead of internal transmission lines, sections of miniature coaxial cables or simply individual wires 361 are routed from the box electrodes to the outside of the valve body and transition back into the valve body below the actual valve to connect with the pin electrodes 370. The kelly saver sub 720 is an inexpensive, short piece of equipment used as wear item for frequent make-and-brake operations. It contains another set of repeaters 410 or 411, box electrodes 350 and pin electrodes 370, the latter connected by short transmission lines 360.

Figure 31:
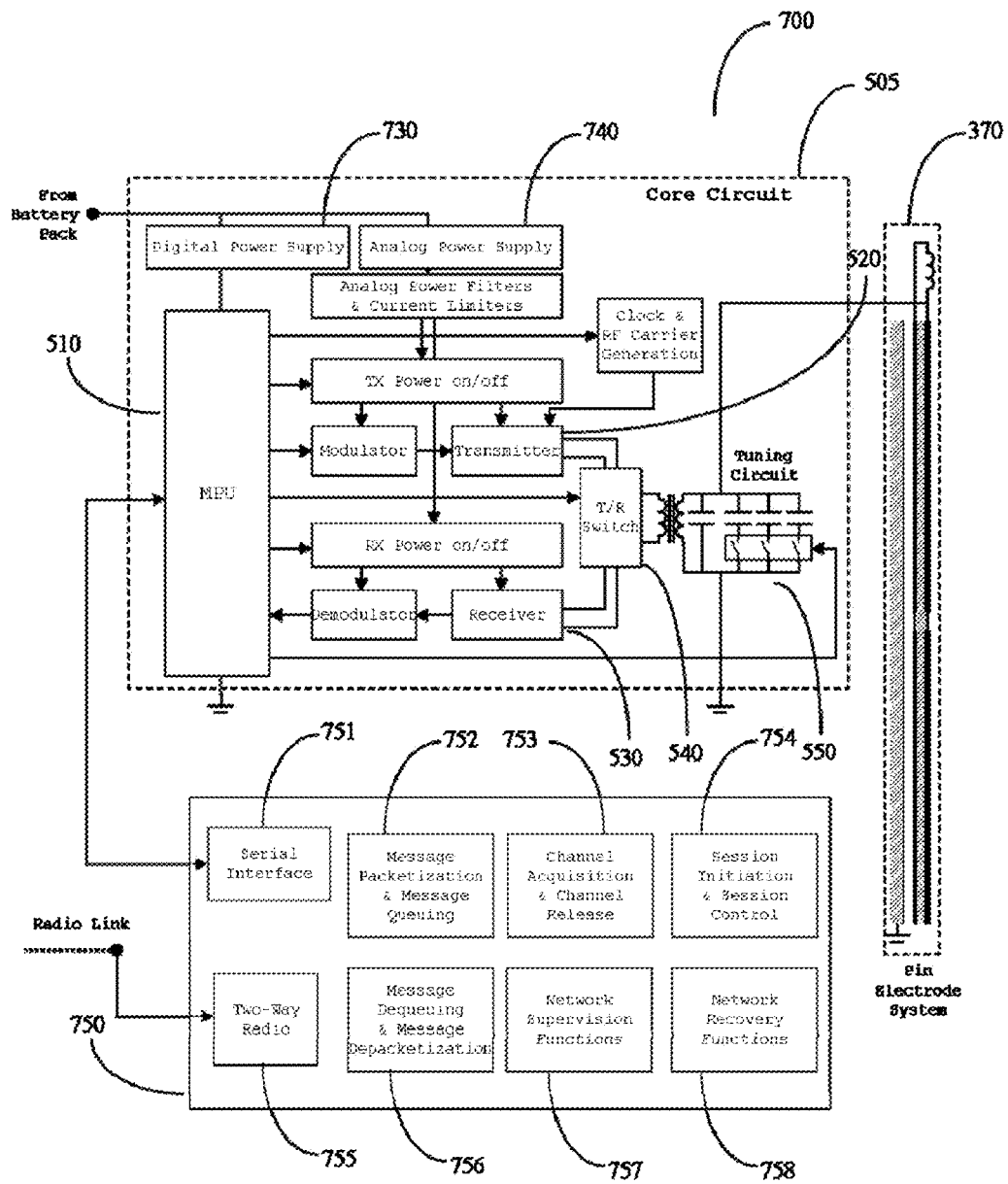
FIG. 31 is a conceptual circuit block diagram of a surface communications sub.

FIG. 31 is a schematic circuit block diagram of the communications sub 700. The circuit employs the same base packet radio core circuit as the repeaters, including MPU 510, transmitter circuitry 520, receiver circuitry 530, T/R switch 540, and tuning circuit 550. The communications sub 700 is powered by digital power supply 730 and analog power supply 740. The communications sub 700 is further augmented by additional processing and communication functions in communications block 750, including a serial interface 751, message packetization and message queuing block 752, channel acquisition and channel release block 753, session initiation and session control block 754 for communicating with the communications sub 700 via the MPU 510, as well as a two-way radio 755, message dequeuing and message packetization block 756, network supervision block 757, and network recover block 758 that together enable communications with the outside world. These additional functions handle the high-level end-to-end protocols including network supervision functions and connectivity to the outside world such as a rig data network via wireless links (as shown) or wired connections. Networking tasks performed in communications block 750 include, for example, the handling of user data, which arrives in variable length messages and its breakdown into fixed-length data packets; the allocation and the release of communication channels (channels will be discussed below); the supervision of communication sessions plus a variety of general supervision and network maintenance functions. In this context, a "communication session" denotes the activities between the time a continuous communication path between the downhole sub and the surface sub has been established and the time when this path is broken, for instance, when new pipe is added or a pipe joint is removed from the string. It is one of the tasks of the communications subs 700 to gracefully recover from a broken-path condition and to quickly re-establish communication as soon as the physical link has been re-established. The communications link to the rest of the surface equipment is preferentially implemented as a wireless radio link.

Figure 32:
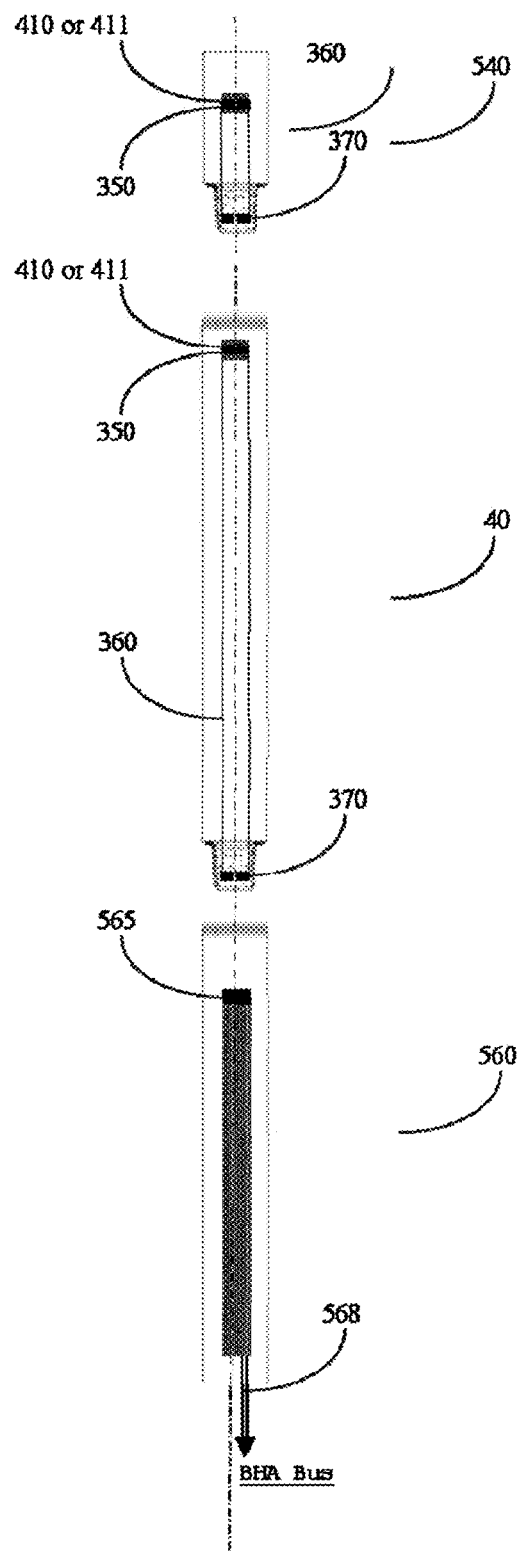
FIG. 32 is a conceptual exploded see-through view of stacked BHA elements with data transmission elements installed.

FIG. 32 shows more detail of the data transmission system at the bottom-hole assembly (BHA). A crossover sub 540 translates between the different thread forms used for pipe joints and for drill collars, respectively. The crossover sub 540 and the drill collars 40 are equipped for data transmission in similar fashion as the pipe joints. The interface sub 560 is a piece of instrumentation housed in a drill collar 40 including signal-receiving and signal-transmitting ring electrode 565 that translates the signals and protocols used by the data transmission system to and from the signals and protocols used on the BHA instrumentation bus 568. The implementation of this bus is service-company specific, but typically is a variant of MIL-STD-1553. Therefore, the interface electronics is partially generic and partially specific to the equipment provided by the MWD/LWD/directional drilling service company.

Figure 33:
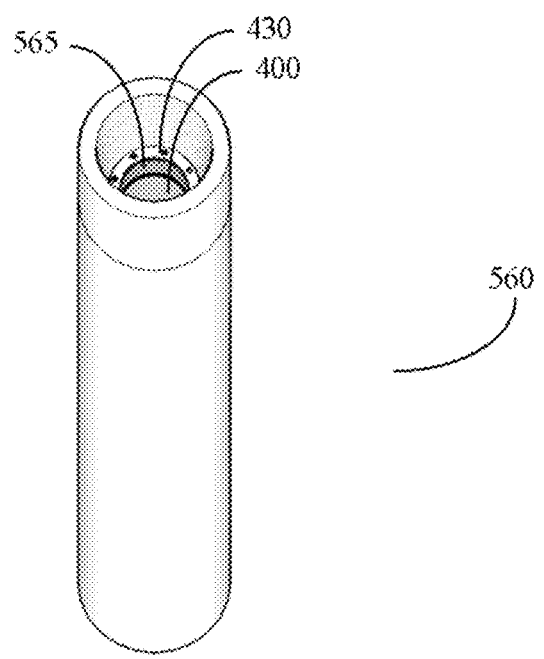
FIG. 33 is a perspective view of a downhole interface sub.

FIG. 33 is a simplified perspective view of a downhole interface sub 560, seen from the top. Inside the box end of the rotary connection, the contact ring 430 is visible as well as the signal-receiving and signal-transmitting ring electrode 565, which has electrical characteristics similar to that of a repeater housing and is coating with epoxy coating 400. Therefore, the top end of a downhole interface sub can transmit data to and receive data from the pin ends of collar joints and and/or crossover subs 540.

Figure 34:
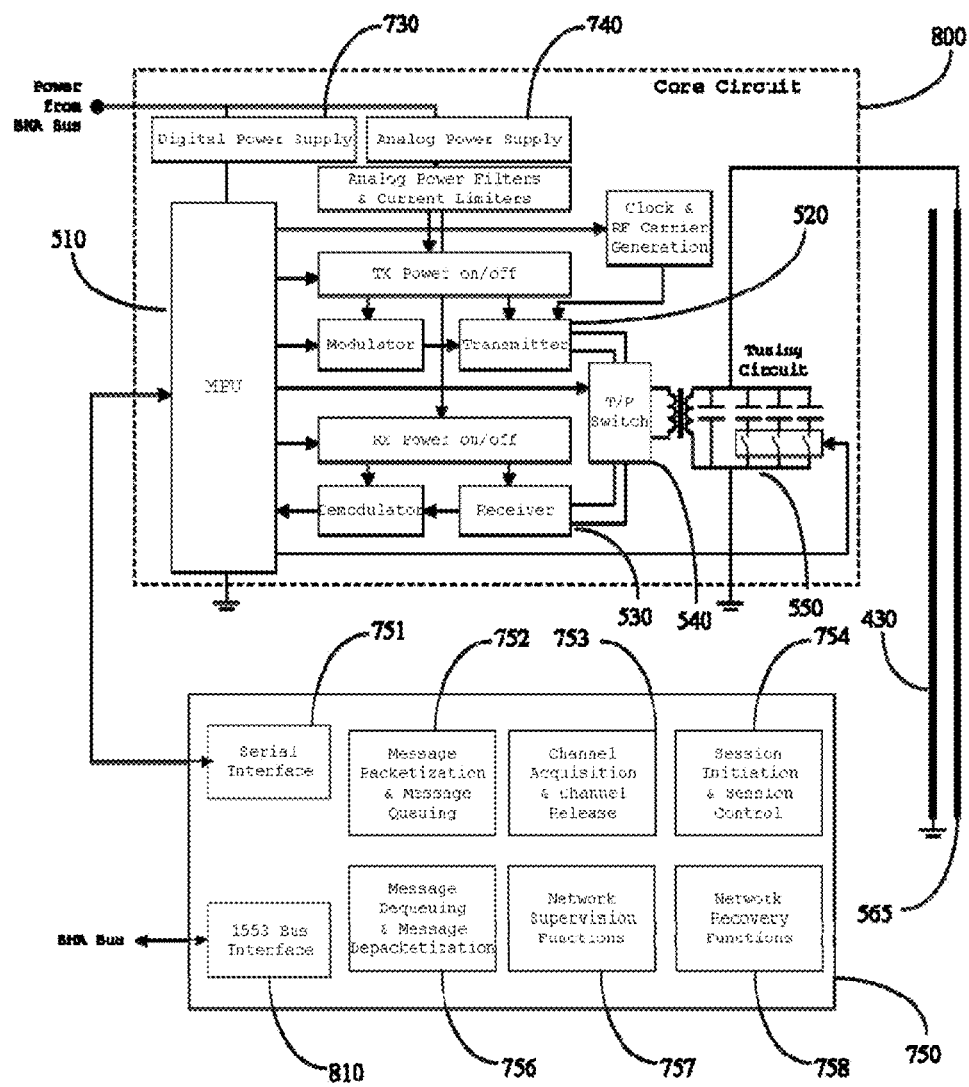
FIG. 34 is a conceptual circuit block diagram of a downhole interface sub.

FIG. 34 is a schematic circuit block diagram of the electronics inside a downhole interface sub 560. A core circuit 800 similar to the repeater circuit is employed to handle the radio packet functions and low-level communication functions, augmented by additional circuitry 750 responsible for high-level end-to-end communications, network supervision functions and communication with the BHA instrumentation bus. The communications circuitry 750 is very similar to that in FIG. 31 except that the two-way radio 755 is replaced by the interface 810 to the BHA bus (pictured as an example MIL-STD-1553 bus), which is specific to each LWD/MWD vendor.

Figure 35:
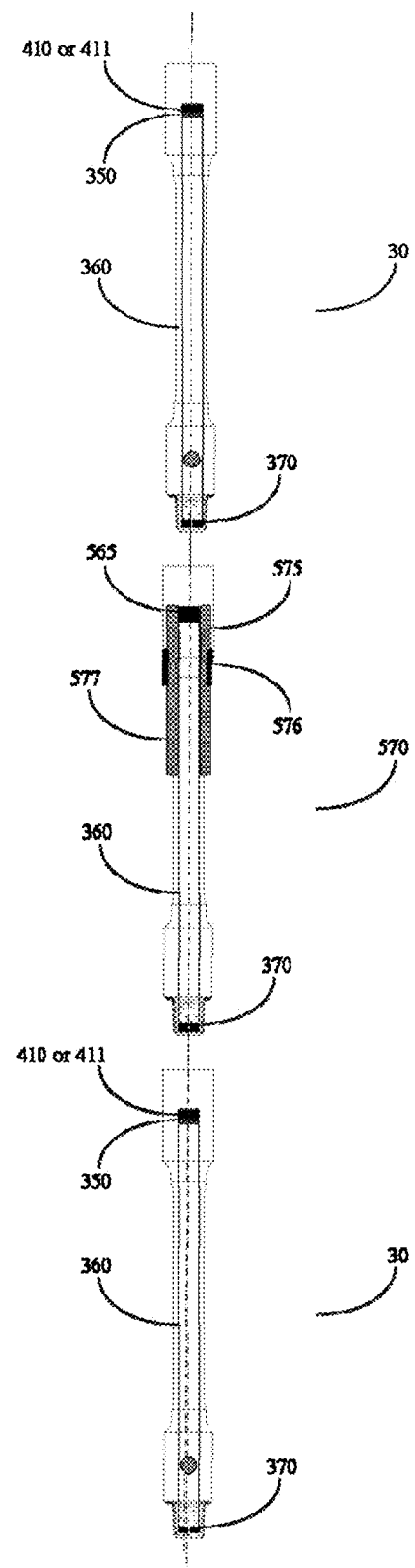
FIG. 35 is a conceptual exploded see-through view of an in-string instrument sub with stacked pipe joints above and below the instrument sub.

FIG. 35 is a schematic see-through view of an in-line instrument sub 570 compatible with the data transmission system that can be deployed at various locations within a drill string. Such subs 570 may be used for gathering data along the drill string similar to the sensor inserts 390, with the additional functionality of being able, by virtue of being powered by battery packs with substantial capacities, to transmit high-power stimuli, e.g. electric or acoustic signals that can be received along the drill string by sensor inserts, sensor subs or other instrument subs. In addition, such stimuli may travel between neighboring boreholes. In one possible implementation, as shown in FIG. 35, the electronics resides in pockets 575 that are accessible from the outside. The transceivers are located under windows 576 suitable to pass signals specific to the sensors to and from the borehole. Feed-throughs connect the instrumentation pockets with the data transmission system located on the inside. The data transmission system consists of transmission lines 360 as previously described, terminating in a pin electrode 370, and a box ring electrode 565 that is connected to the electronics package 577 in the in-line instrument sub 570.

Figure 36:
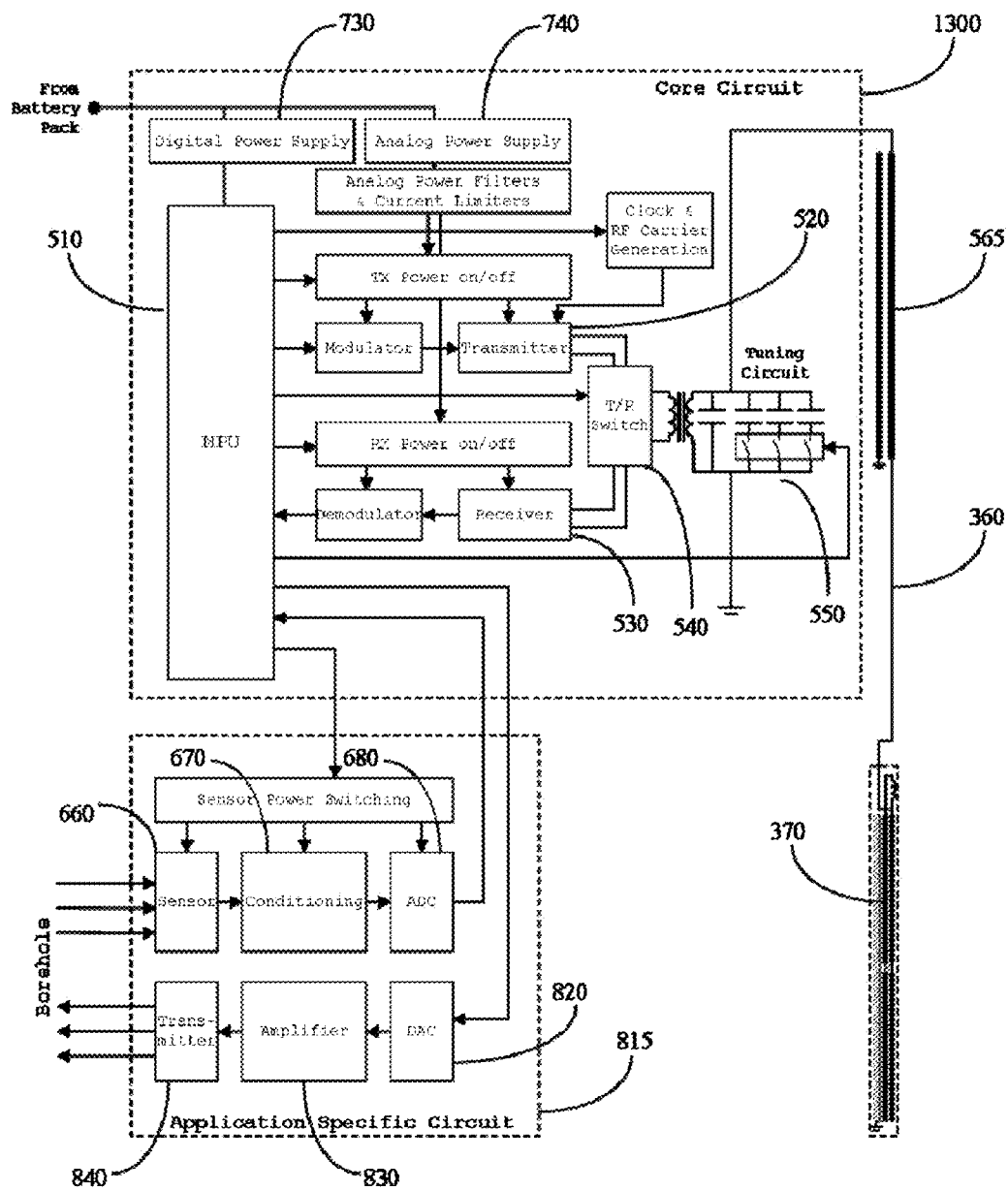
FIG. 36 is a conceptual circuit block diagram of an instrument sub.

FIG. 36 is a schematic block diagram of the electronics inside an instrument sub 570. The core circuit 1300 handles the low-level communication functions and the packet-radio functionality. The application-specific circuitry 815 manages the transceivers by generating stimuli signals using DAC 820, amplifier 830, and transmitter 840 and processing received signals from external sources using sensor 660, conditioning circuit 670, and ADC 680 to provide data to MPU 510 for processing.

Figure 37:
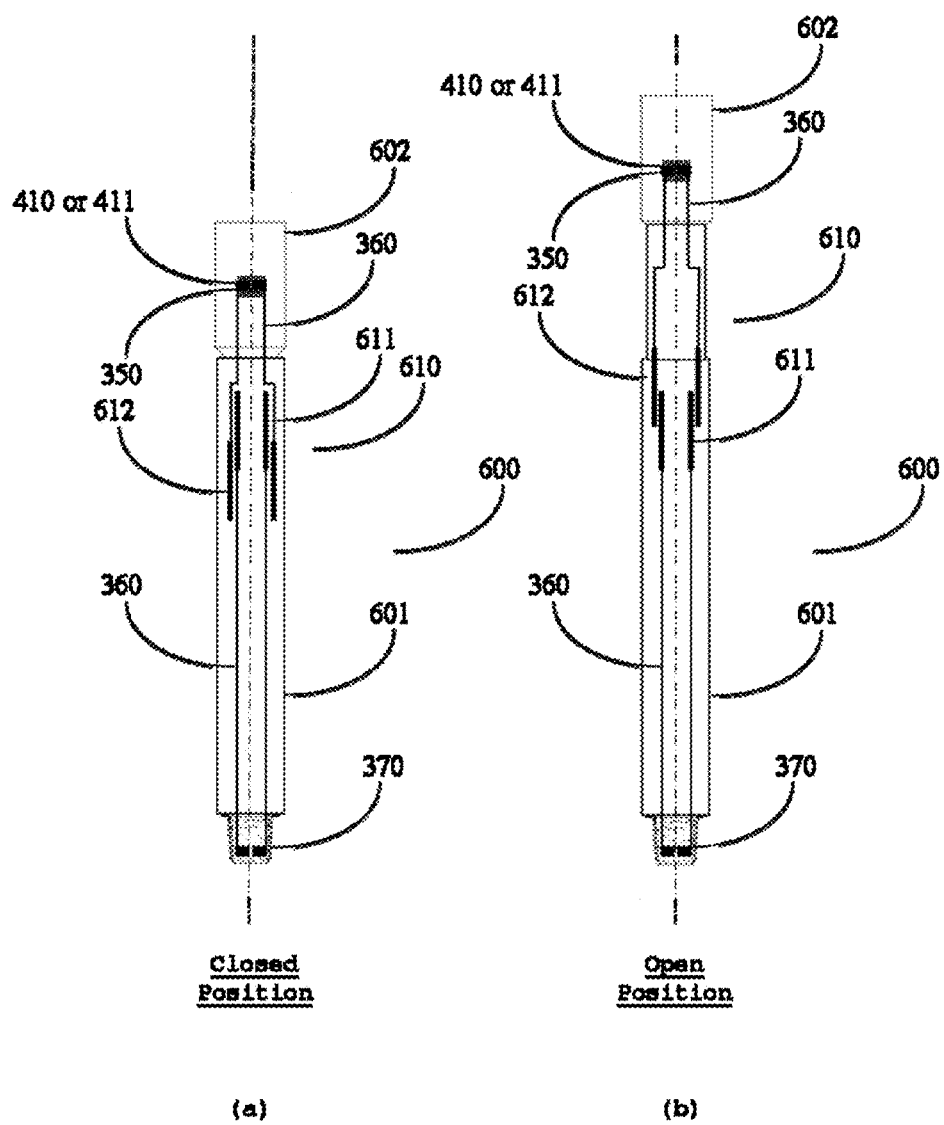
FIG. 37 (a)-(b) are conceptual see-through views of a drilling jar with data transmission elements installed in the closed (a) and open (b) positions.
Figure 38:
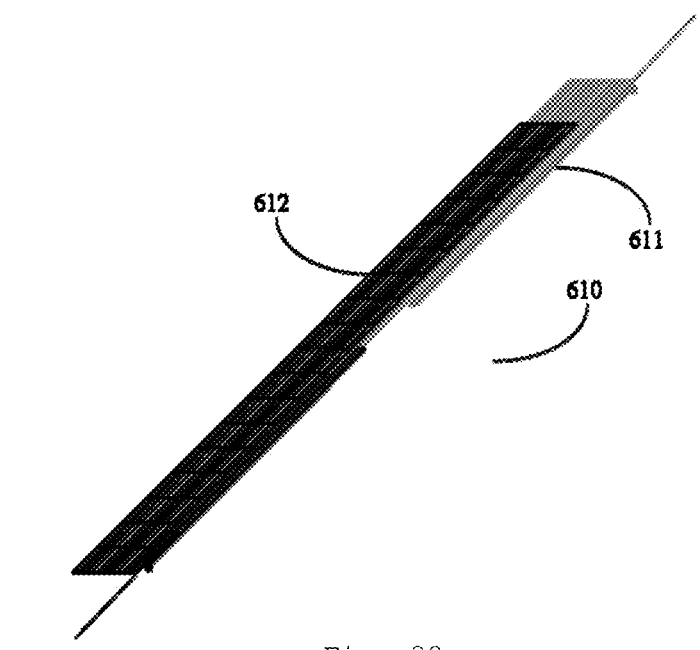
FIG. 38 is a conceptual perspective view of the movable and stationary coupling electrodes within an instrumented drilling jar.
Figure 39:
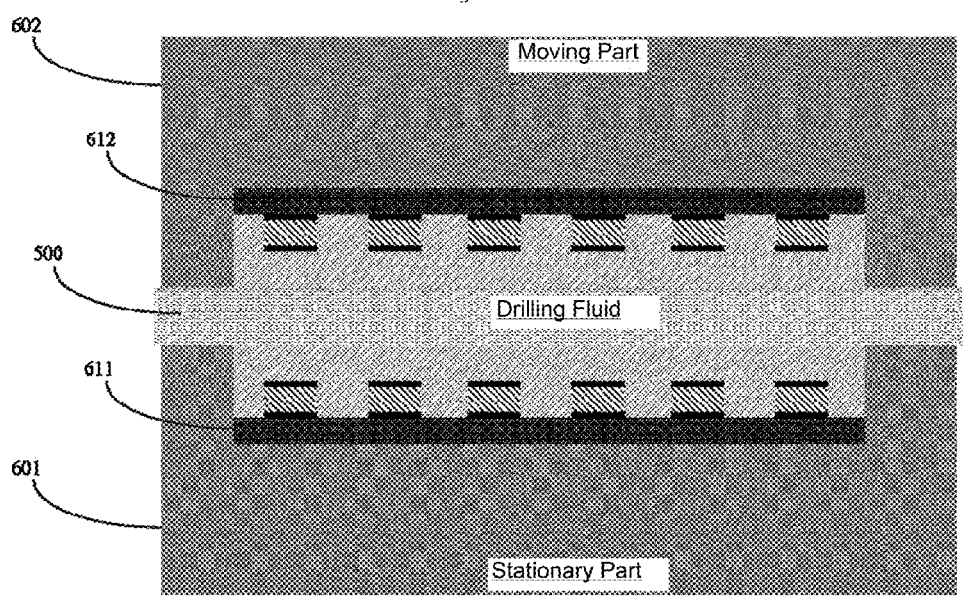
FIG. 39 is a conceptual cross section through the movable and stationary coupling electrodes within an instrumented drilling jar.

FIGS. 37a and 37b show the data transmission system in a drilling jar 600. A jar 600 is often included in a BHA to aid in unlodging a stuck drill string and/or stuck drill bit. The jar 600 is deployed in its closed position (FIG. 37a). A stuck drill string stores large amounts of torsional and/or tensional energy, which is suddenly released when the jar is triggered and opens (FIG. 37b). Then an internal hammer strikes an internal anvil-like surface, and shock waves travel through the drill string. The signal transmission over this moving interface is accomplished through semi-planar electrode systems 610 mounted on both the stationary 601 and the moving parts 602 of the jar 600. As shown in FIG. 38, the layout of these electrodes 611 and 612 is very similar to the circular electrodes in FIG. 11a. The main difference is that the ring electrodes of FIG. 11a are laid out circumferentially, conforming to the connection's I.D., while the electrodes 611 and 612 of FIG. 38 are laid out axially, conforming to the jar's I.D. Resonant tank circuits are formed through the capacitance between the "hot" and the "cold" plates 611 and 612 and the integrated inductors. Since the stationary and moving "hot" plates 611 and 612 face each other through the drilling fluid 500 (see FIG. 39), the resonance tank circuits are weakly electrically coupled. If the electrode's lengths equal the travel distance, e.g. 12 inches, and the electrode overlap equals ½ of the travel distance, e.g. 6 inches, the coupling factor is the same for both the "open" and the "closed" position. In this case, the signal strength passing through the jar is unaffected by the jar's open/closed status. As shown in FIG. 39, the electrode systems are located in shallow protective grooves.

It is straightforward to generalize the scheme of moving electrodes to rotational motion between moving parts and to a combination of rotational and translational motions between such parts. Such design elements are useful for implementing brushless couplings below the swivel joint within the surface assembly, where a portion of the data transmission system rotates with the drill string and another portion, which may be connected to the rig network over a communications cable, does not. Such wire-based network implementations are useful in rig environments that do not allow the use of radiofrequency signals for safety reasons.

Figure 40:
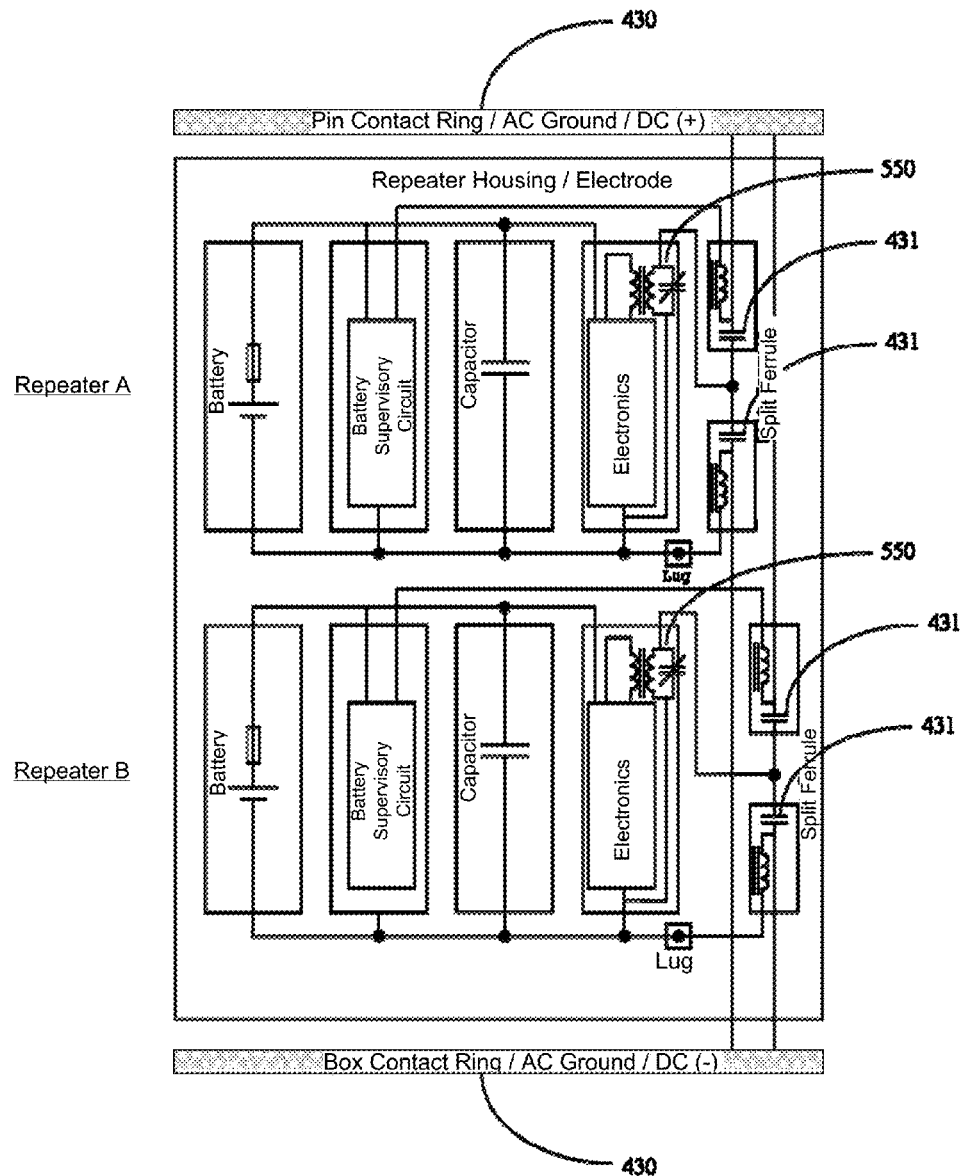
FIG. 40 is a block diagram of a twin repeater using rechargeable batteries.
Figure 41:
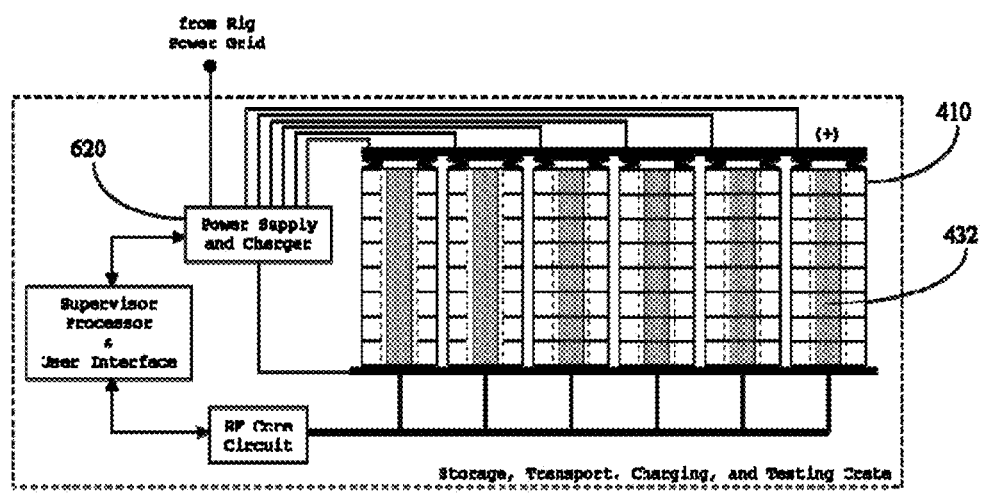
FIG. 41 is a conceptual view of a set of repeaters in their storage, transport, charging, and testing container.

FIG. 40 shows a variation of the repeater circuit of FIG. 24 employing rechargeable batteries. The obvious advantage of such an arrangement is that the batteries can be fully sealed within the repeater housing 410 and repeaters can be used many times over. The necessary outside connections are provided through the contact rings 430 at each end of the repeater housing 410. As shown in FIG. 40, the contact rings 430 are electrically connected through blocking capacitors 431, which allow the passage of radiofrequency signals, but block the flow of d.c. current. Applying a d.c. voltage between contact rings 430 causes the electronics to power up and the battery supervisory circuit to charge the rechargeable battery cell(s). As shown in FIG. 41, many repeater housings 410 may be stacked together for charging purposes in a box, which is also used for storage and transport. Each stack of repeaters, which are serially connected to the charging station 620, also interfaces to a cylindrical antenna 432 that allows for operation, testing and programming of all repeaters during charging and/or in transit.

Figure 42:
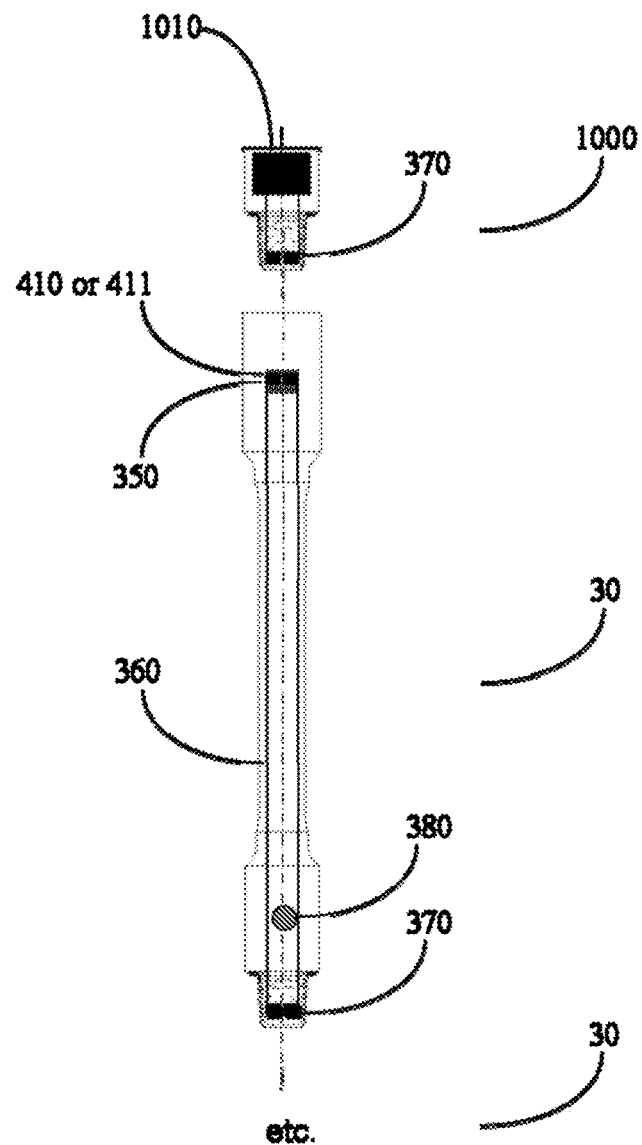
FIG. 42 is a conceptual exploded see-through view of surface test equipment and a string of pipe joints under test.

FIG. 42 is a schematical, exploded see-through of the top of a pipe string, represented by the topmost pipe joint 30—possibly suspended in the slips—and disconnected from the surface communications sub. If necessary, the checkout box 1000 as shown in FIG. 42 can be used to operate the network without having the surface communications sub connected. The checkout box 1000 wirelessly communicates with the removable portions of the communications system, i.e. the repeaters 410 or 411. The checkout box 1000 emulates the functions of a surface communications sub and can be operated from a local operator display and keyboard 1010. A radio link for remote operation is also provided. This checkout box is useful, for instance, if a "soft" failure in a repeater has occurred and the affected pipe joint 30 needs to be replaced. The ID 380 of the affected pipe joint is electronically retrieved by wireless communication with the repeaters 410 or 411 inside the box and is displayed on the local operator display 1010. As previously discussed, the pipe joint ID 380 is embossed on the rotary connection per API guidelines, which allows the pipe joint to be identified and removed from the string. The checkout box 1000 has a slightly elongated pin that already contacts the repeater housing and hence activates the repeaters if the connection is only made up by hand.

Figure 43:
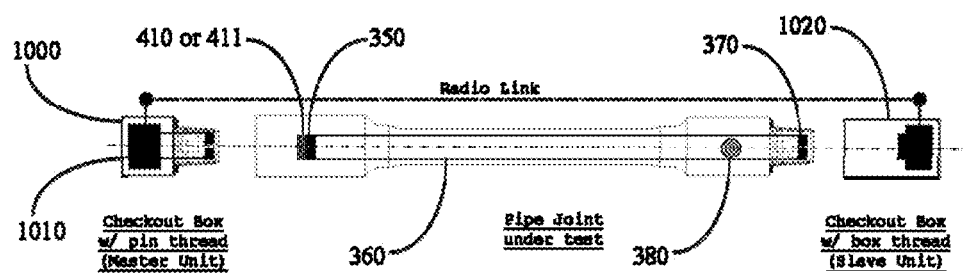
FIG. 43 is another conceptual exploded see-through view of surface test equipment and a single pipe joint under test.

FIG. 43 shows the general checkout procedure for a single pipe joint that may be horizontally racked up. The "master" checkout box 1000 operates in concert with the "slave" checkout box 1020 that is screwed onto the pin end of the pipe joint. These two boxes 1000 and 1020 communicate over a radio link and can exercise all standard repeater functions as well maintenance functions such as inquiries of usage history and temperature profile history. The boxes 1000 and 1020 have an elongated pin and a thicker contact plate, respectively, to allow proper ground contact through only hand-tightened connections.

A very fast way of checking out the functionality of repeaters, of downloading their internal memory, and for programming the internal memory is a fully wireless connection. This mode is simplified if the data transmission system operates in the radiofrequency range of 27 MHz. A narrow-band communication link tuned to a particular channel in the CB band at around 27 MHz can be established by a portable radio-type transmission system and nearby located repeaters. In particular, an entire rack of pipe joints with data transmission system elements installed may be interrogated very efficiently using the packet-radio capabilities of the repeaters. In this situation, the peer-to-peer communication protocol is replaced with a master-slave protocol, where the portable 27-MHz master system acts as master interrogating one repeater at a time. Since the master system has a record of all pipe joint IDs, interrogating all repeaters within radiofrequency range should yield a complete roll-call of stored pipe joint IDs. An incomplete roll-call points to a data transmission system defect in the pipe joints embossed with those IDs.

Figure 44:
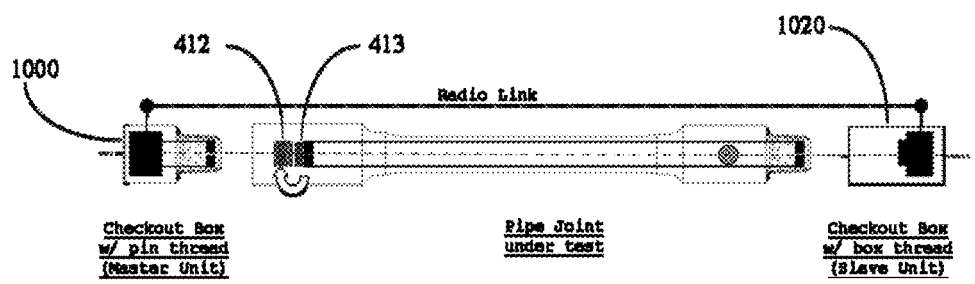
FIG. 44 is another conceptual exploded see-through view of surface test equipment, a single pipe joint under test, and repeaters exchanging data.

FIG. 44 illustrates the principle of synchronizing repeaters. The task is to transfer pipe maintenance data and pipe history data from depleted repeaters to be removed from a pipe joint to fresh repeaters to be installed in the pipe joint. The new repeater housing 412 is stacked on top of the old repeater housing 413, allowing all repeaters to exchange radiofrequency signals through over-the-air coupling. Under direction of the master checkout box 1000, the old repeaters download stored maintenance data to the new repeaters. Such data comprises pipe joint ID, manufacturing records, service records, usage records, temperature and pressure profiles (the latter requiring a pressure sensor insert), etc. After the download is complete, the old repeater housing 413 is removed and recycled and the new repeater housing 412 is installed.

By using a combination of synchronizing repeaters, fast repeater interrogation using a wireless connection, and/or temporarily storing pipe information in data bases that may be remotely located, a permanent, continuous and traceable data record for each pipe joint can be established. Such data records are desirable to trace the history of each pipe joint in order to maintain proper service schedules, predict remaining service lifetime or to assist in the analysis of failures. In the past such systems could not be made to work because the necessary electronics located within a pipe joint would not survive the rigors of downhole use and thermal pipe cleaning over the long run. The problem is solved by storing the pipe manufacturing, usage history and maintenance records in a combination of generations of replaceable repeaters and off-line storage. Repeaters can be easily removed while, for example a pipe joint is thermally cleansed at temperatures electronic components cannot easily withstand.

Figure 45:
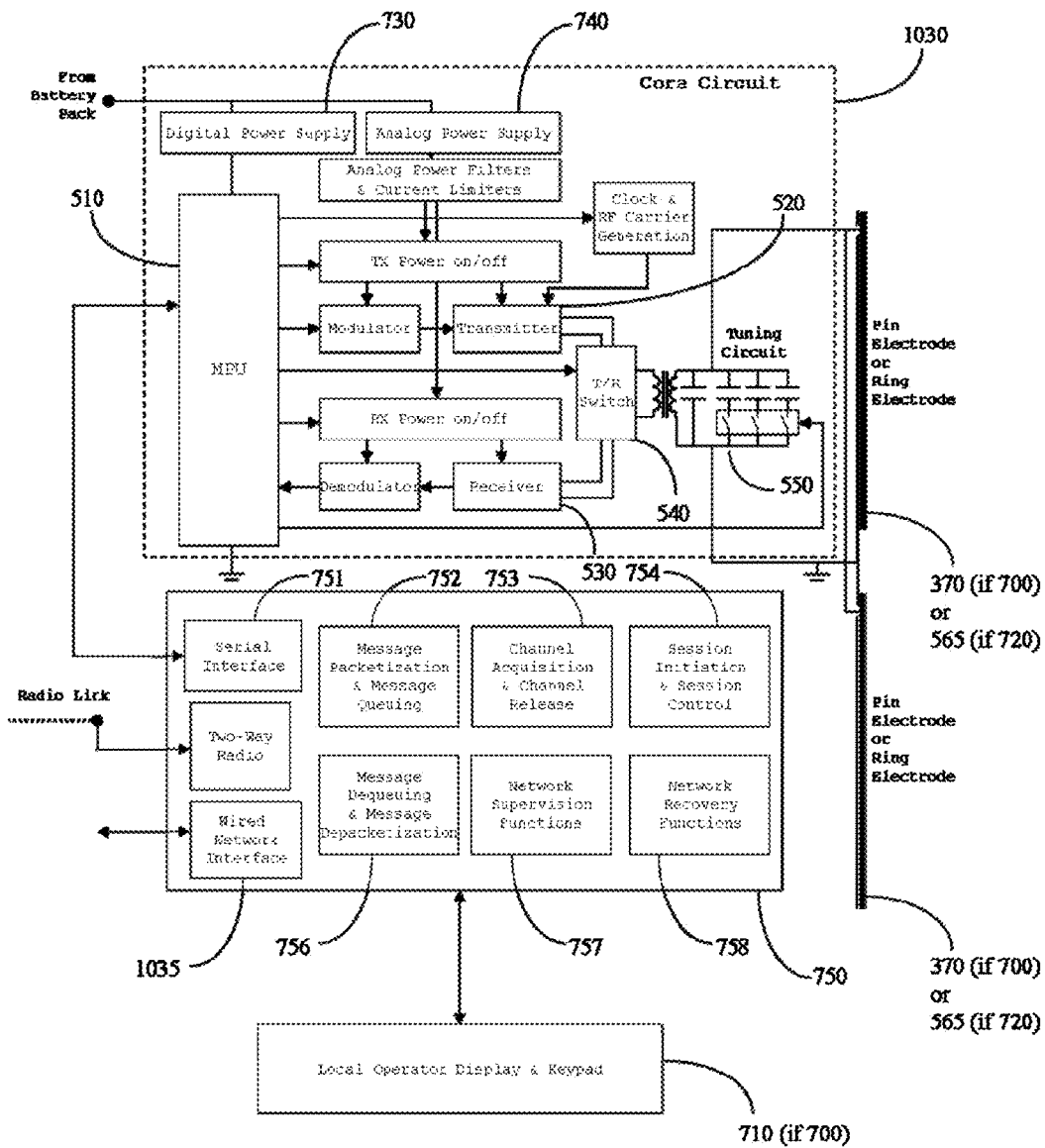
FIG. 45 is a conceptual circuit block diagram of a surface test equipment circuit.

FIG. 45 shows the general electrical block diagram of a checkout box 1000 or 1020. Again, a version of the core circuit 1030 is employed as basic building block, together with circuitry 750 implementing all higher-level networking functions as well as the user and external communication interfaces, including wired network interface 1035. The "master" box 1000 has pin electrodes 370 and a local display/keyboard interface 1010; the "slave" box 1020 has a ring electrode 565 and no local interface.

Figure 46:
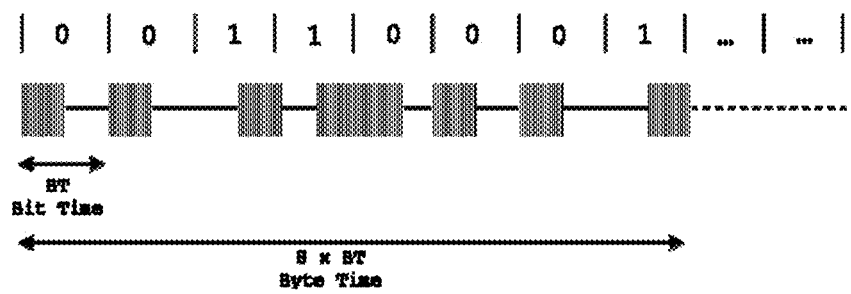
FIG. 46 shows modulation of the radiofrequency by on/off keying (OOK) and Manchester modulation.

FIG. 46 shows an example of a simple modulation pattern used to transmit data between repeaters, i.e. between pipe joints. The example modulation is on-off keying (OOK), combined with Manchester modulation. A logical "0" is represented by approximately ½ of the bit time BT with the radiofrequency carrier turned on, followed by ½ of the bit time without transmission. A logical "1" is represented by ½ BT "off", followed by ½ "on". Therefore, one bit is transmitted in one BT and a byte in 8 BT's. The bit time BT can be as short as about 1 microsecond or can made arbitrarily long, with a practical limit of about 1 millisecond. Measurements have shown that the data transmission system, when tuned to 27 MHz, has a bandwidth of about 2 MHz and therefore can easily support bit times as short as about 1 microsecond. More elaborate modulation techniques such as QAM (quadrature amplitude modulation) can be employed to transmit more information during the same time frames. OOK, however, results in particularly simple receiver analog front ends that can be implemented using power-saving techniques and simple envelope detection. The modulation scheme is also robust in the sense that it does not require communicating repeaters to operate on precisely the same frequencies. This feature is useful since although each repeater course-tunes its tank circuitry to bring the resonance frequency into the allowed operating range, timing drifts, aging effects and temperature variations introduce repeater-to-repeater differences in operating frequencies.

Figure 47:
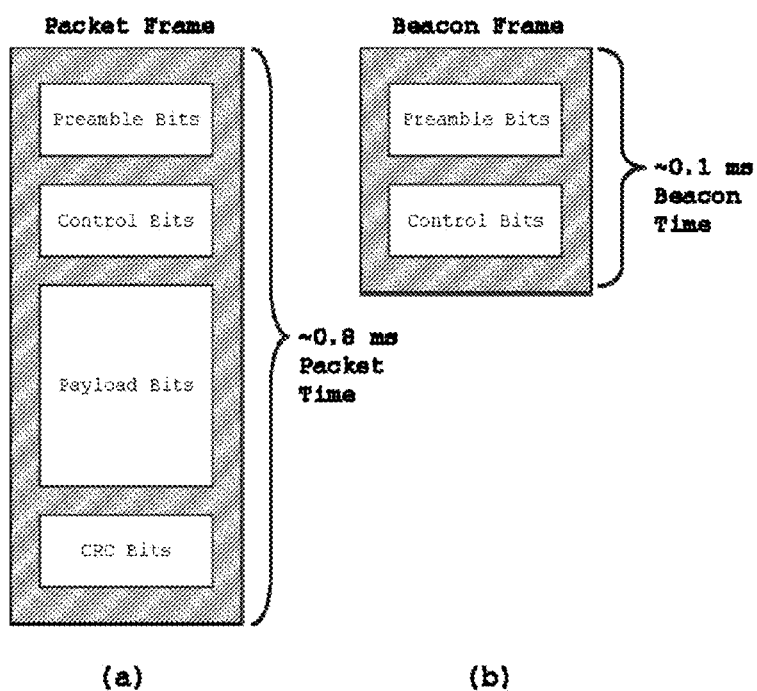
FIG. 47 (a)-(b) show an example of the formatting of data packets.

FIG. 47 elaborates on the structure of message packets that are transmitted in single bursts between repeaters. A data packet as shown in FIG. 47a includes a preamble, which is a constant bit pattern used to synchronize transmitter and receiver, various control bits, the actual user data (payload) and cyclic-redundancy check (CRC) bits. FIG. 47b shows a so-called beacon packet, which does not transmit user data, but is used to establish a connection between repeaters for subsequent data transfer.

Figure 48:
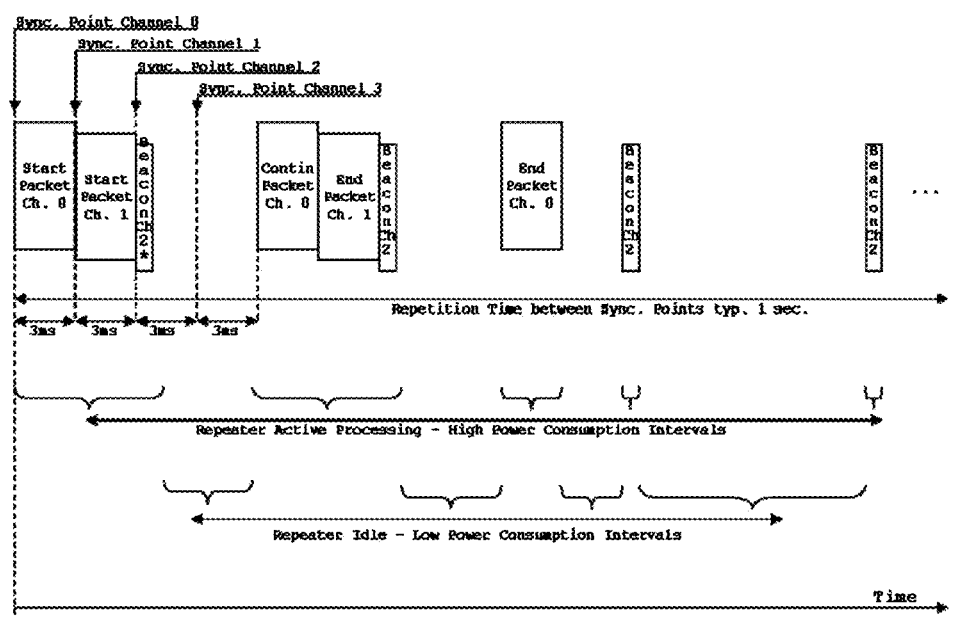
FIG. 48 shows an example of packetized messages of different lengths transmitted in TDMA channels.

FIG. 48 illustrates the packetization process of user payload data. The user data is formatted into variable-length messages, which in turn are broken down into fixed-length payload chunks, each wrapped into a packet frame. The packets are transmitted using a modified time-division, multiple-access (TDMA) protocol. There are multiple channels, numbered 0 and up, that can be requisitioned or released on demand, depending on the user transmission rate. These channels access the physical transmission medium in a round-robin schedule, with each channel given in this example access for 3 ms per time slot. Three milliseconds then becomes the minimum time a packet resides at a particular repeater, including reception time, transmission time and confirmation time.

The example given in FIG. 48 assumes the parallel transmission of a longer message in Channel 0 and a shorter message in Channel 1. In addition, Channel 2 is in the process of being requisitioned, a condition that is signaled by a series of beacon packets placed in the time slots of Channel 2. Channels 3 and onward are dormant in this example as no activity takes place in these time slots. The message in Channel 0 is broken down into a start packet, a continuation packet and an end packet. The message in Channel 1 requires only a start packet and an end packet. All messages are required to begin with a start packet placed at the synchronization point of the channel the message is placed in. These synchronization points occur typically once every second and are staggered by channel as shown in FIG. 48. If a repeater is not synchronized to a particular channel, it follows the trail of beacon signals transmitted in that channel until it finds the synchronization frame, denoted by "*" in FIG. 48. With the number of channels selected as 6 and a per-channel slot time of 3 ms, the round-robin cycle takes 18 ms. The overall repetition time of 1 second can accommodate 330 packets, split among 6 channels for 55 packets/channel/repetition time. The maximum message length is then given by 55× number of bits per packet. The minimum message length is a single, "start/end" data packet.

The messaging protocol has been organized around variable message lengths and fixed synchronization points to minimize the power consumption in the repeater's electronics. Once synchronized, a repeater can predict when the next synchronization point will occur, respectively when the start packet of the next message will arrive. As soon as the end packet for a message has been processed, no more data packets will arrive on that particular channel until the next synchronization point and the repeater can, assuming no more channels are active, enter a low-power state with only an internal timer counting down to the next synchronization point. In addition, the repeater electronics enters low power states whenever a gap in communication is to be expected, such as during time slot reserved for idle channels. The concept of channels is also useful when the processing and transmission workload is distributed among multiple repeaters. In short, channels will be allocated to available repeaters in an equitable manner. This allocation can be dynamically and transparently modified as necessary. These concepts will be further discussed below. The discussion of the following figures is purposefully simplified as it assumes only one repeater per pipe joint.

Another advantage of the messaging protocol is the automatic time synchronization between repeaters. Each repeater maintains local time to wake up from low-power states to receive and/or transmit data packets at their allocated times. The clocks maintaining local time are subject to drifts, in particular during low-power intervals and at elevated temperatures. Even without data transmission requests from the terminal points, the system generates "heartbeat" transmissions every 1 second, events to which every repeater resynchronizes its internal timekeeping. In addition, since the retention time of a packet at a node is known and the total number of transmissions a packet has undergone is known as well, each repeater can calculate "absolute time" by inspecting the header information in a packet, i.e. it can synchronize itself to the time maintained at the surface and/or in the BHA. Assuming a worst-case drift of 100 ppm, the maximum time drift during a 1-second interval is 0.1 ms. Reception and retransmission of a packet is subject to random processing time jitter at every node; however, that jitter tends to average out over many nodes, leaving only a constant delay per node plus clock "noise" that is proportional to the square root of the number of nodes in series. From these considerations it can be estimated that a BHA periodically adjusting its clock to the time information from the arriving heartbeat packets will stay synchronized to the surface (rig) clock to within 0.1 ms. In comparison, an autonomous BHA clock, synchronized once at the surface and free running for 100 downhole hours would have to maintain time accurate to an impossible-to-achieve precision of $3 \times 10^{-10}$ to track surface time to within 0.1 ms.

Figure 49:
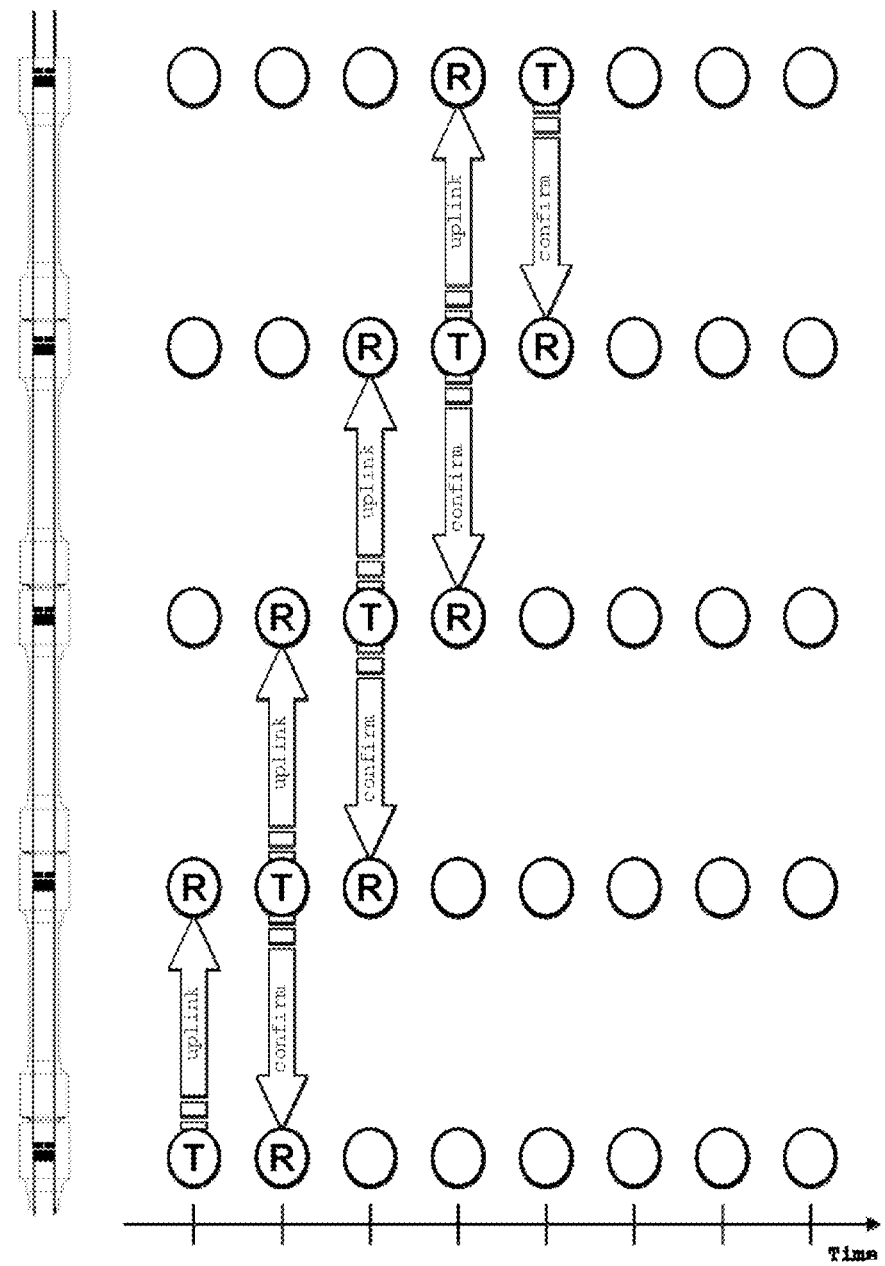
FIG. 49 shows the transmission of a data packet through the transmission system at low data rates.

FIG. 49 illustrates the transport of a single data packet through the network of connected pipe joints. Time increments of 1 millisecond are assumed for this example. Five connections are pictured (left) and the states of the repeaters are symbolized as "T" (transmitting), "R" (receiving), and " " (idle) on the right-hand side of the diagram. The sequence begins with the uplink of a packet from the lowest repeater to its next neighbor. Since the physical level transmissions are bidirectional, any uplinked packet automatically bounces back to the previous repeater. The previous repeater maintains a copy of a sent packet and compares is to the bounced-back version it receives in the next time slot. Therefore, every bit in every packet is always checked for transmission errors. Assuming no transmission errors occur, the packet proceeds through the chain of repeaters at a speed of one repeater hop per time increment or 10 meters per millisecond. Thus, a typical uplink propagation speed would be 10 km/s, ignoring extra packet processing time required for error detection and correction.

Figure 50:
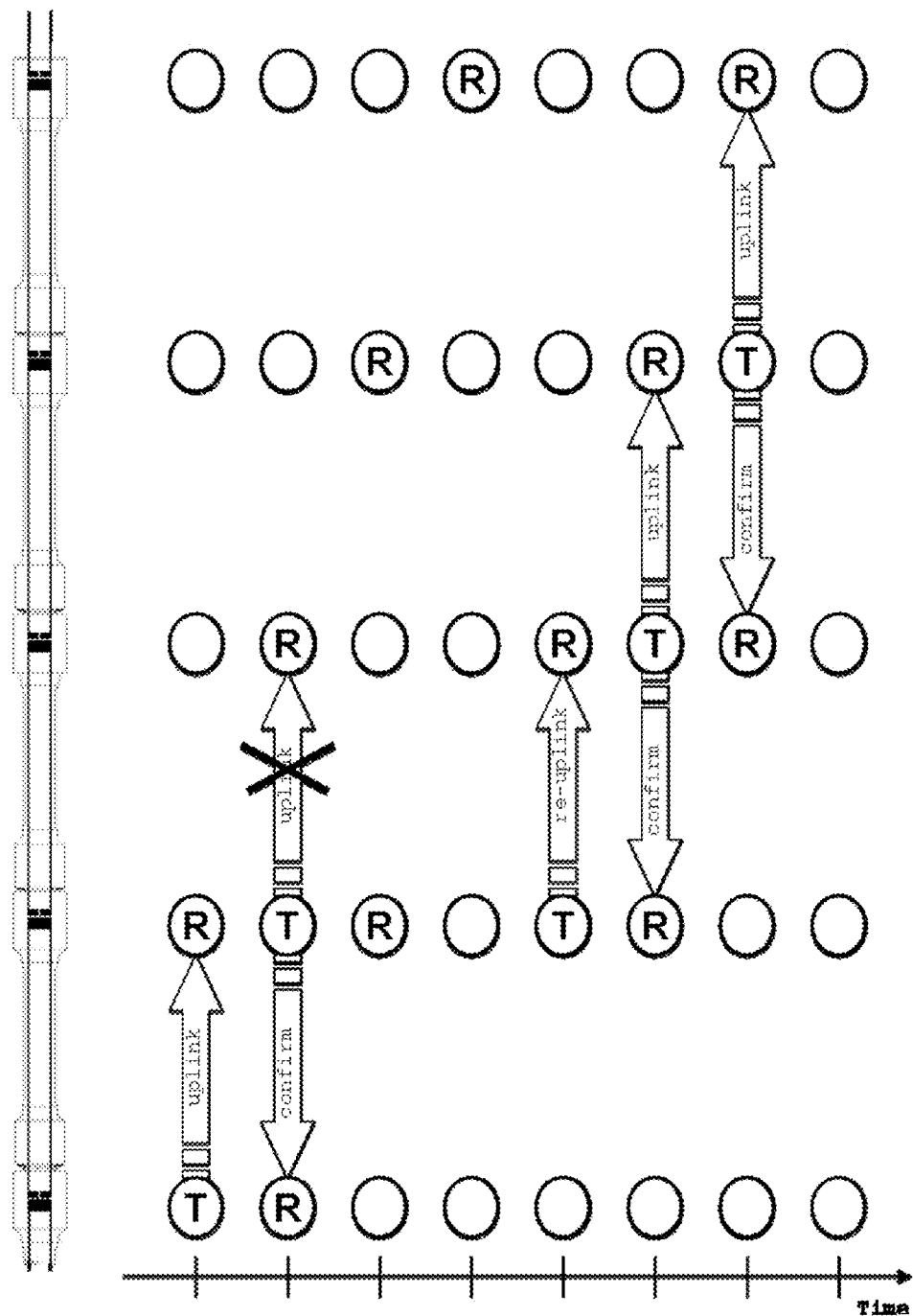
FIG. 50 shows the occurrence of a transient transmission error and its correction at low data rates.

FIG. 50 diagrams the events caused by an intermittent transmission problem. It is assumed that the transmission between the second and third repeater (from bottom) is temporarily corrupted ("X"). The receiving repeater detects the problem from the CRC checksum. A single-bit error can be typically corrected on the fly and the repeater forwards a corrected version. In this example, serious corruption of the data packet is assumed, in which case the repeater skips transmission and instead prepares itself for another reception event. The previous repeater does not see packet confirmation, waits for a pre-specified time interval and retransmits the stored packet ("re-uplink"). If this repeat transmission is successful, the uplink continues, otherwise the retransmission attempts continue for a number of times.

Figure 51:
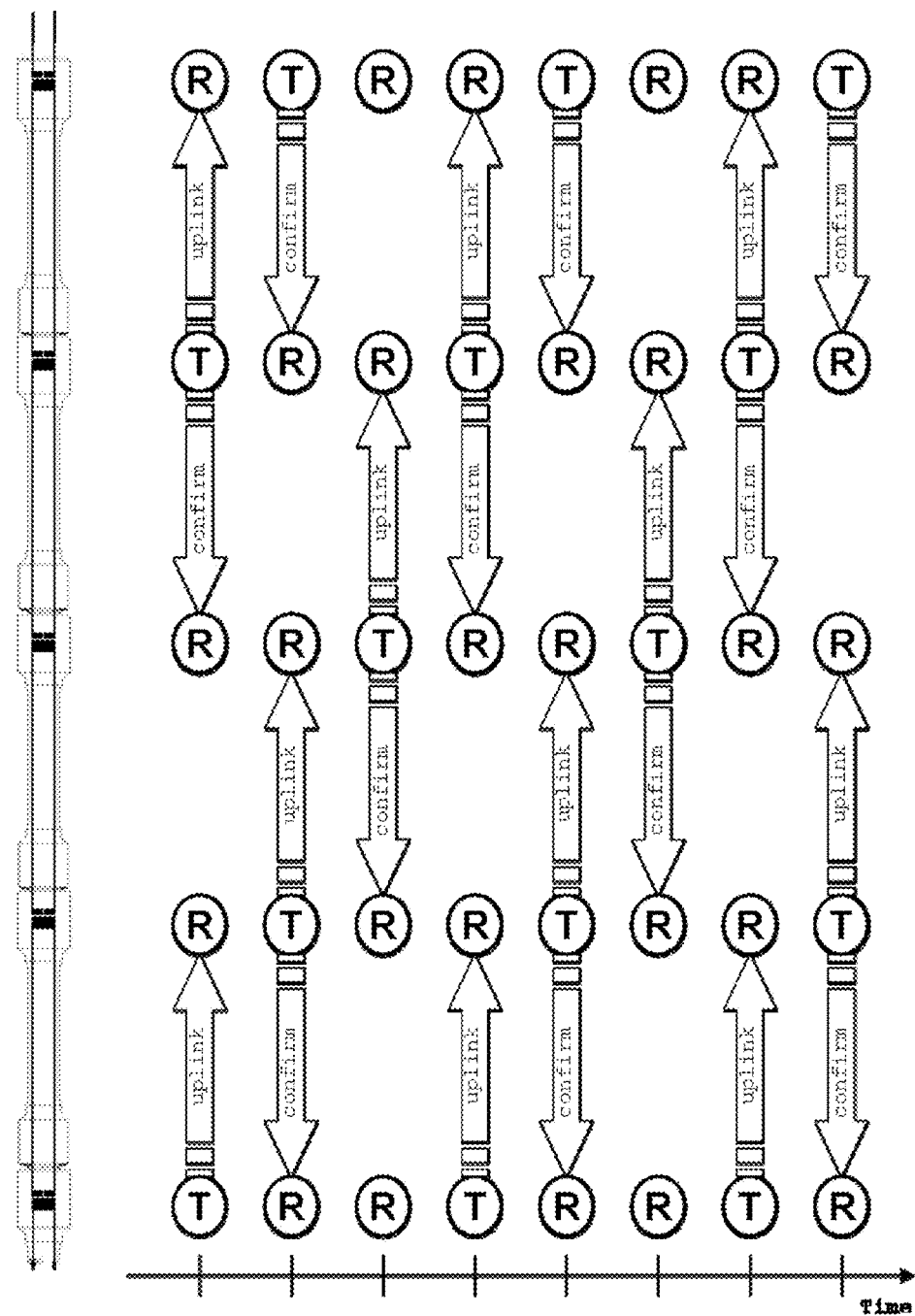
FIG. 51 shows the transmission of data packets through the transmission system at high data rates in unidirectional mode.

FIG. 51 shows the transport of multiple data packets at full uplink capacity. Data packets percolate serially from bottom to top at a speed of 10 km/s and at a rate of 1 packet every 3 milliseconds. Assuming a payload capacity of 500 bit/packet, the net (user) data rate in this case is 166 kbps. The end-to-end user data transfer in this case is unidirectional.

Figure 52:
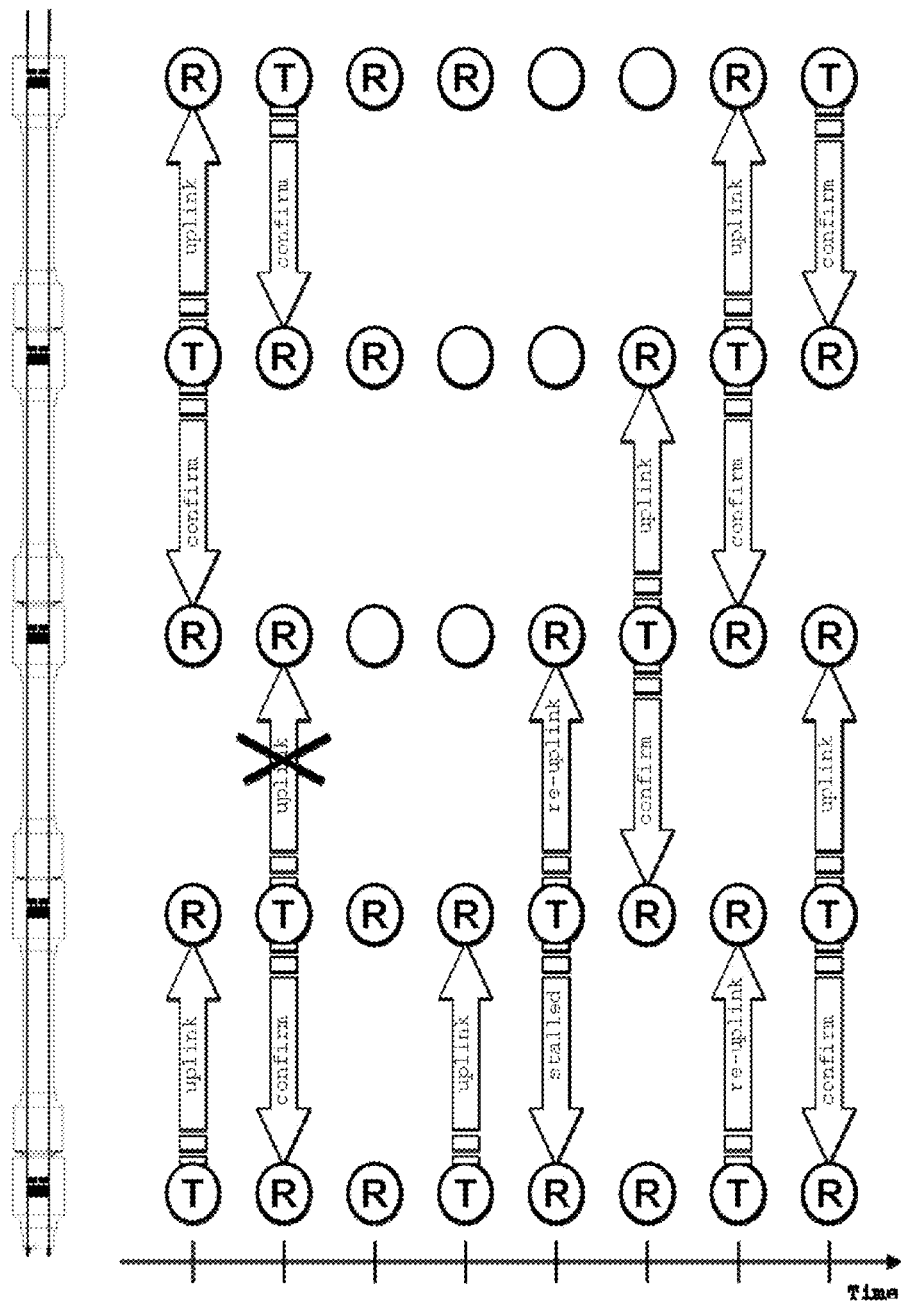
FIG. 52 shows the occurrence of a transient transmission error and its correction at high data rates.

FIG. 52 shows the events in case of a transmission problem in a full-capacity uplink condition. Again, it is assumed that a single failed uplink event ("X") triggers a re-uplink that succeeds and restarts the pipeline. The repeater below and once-removed from the failure location sees the same packet bounced twice back to it. This is the signal that a transmission error has occurred somewhere above and instructs the repeater to temporarily stall transmissions. This pattern of repeated bounces percolates down the pipeline and causes all repeaters to stall for one cycle. In effect, the memory of the entire pipeline is used to buffer the data in transit until the problem has cleared. The stalled repeater retransmits the previous packet (although it already had been confirmed in an earlier cycle). If the problem has been cleared in the meantime, the stalled repeater will receive confirmation for the just-repeated packet; if not, it will receive a copy of an older packet. In the latter case, the repeater will stall for another cycle and will keep re-sending the packet it holds in memory. A pipeline stall condition routinely occurs when a new connection is made at the surface. In that case, the surface communications sub is temporarily disconnected from the drill string, which causes all uplink in progress to stall. There is little use in repeaters endlessly attempting to uplink data that becomes increasingly stale. Instead, the repeaters give up after several repeated uplink attempts, clear their internal data buffers and enter a low-power mode in which they transmit only beacons in order to re-establish communications from scratch.

Figure 53:
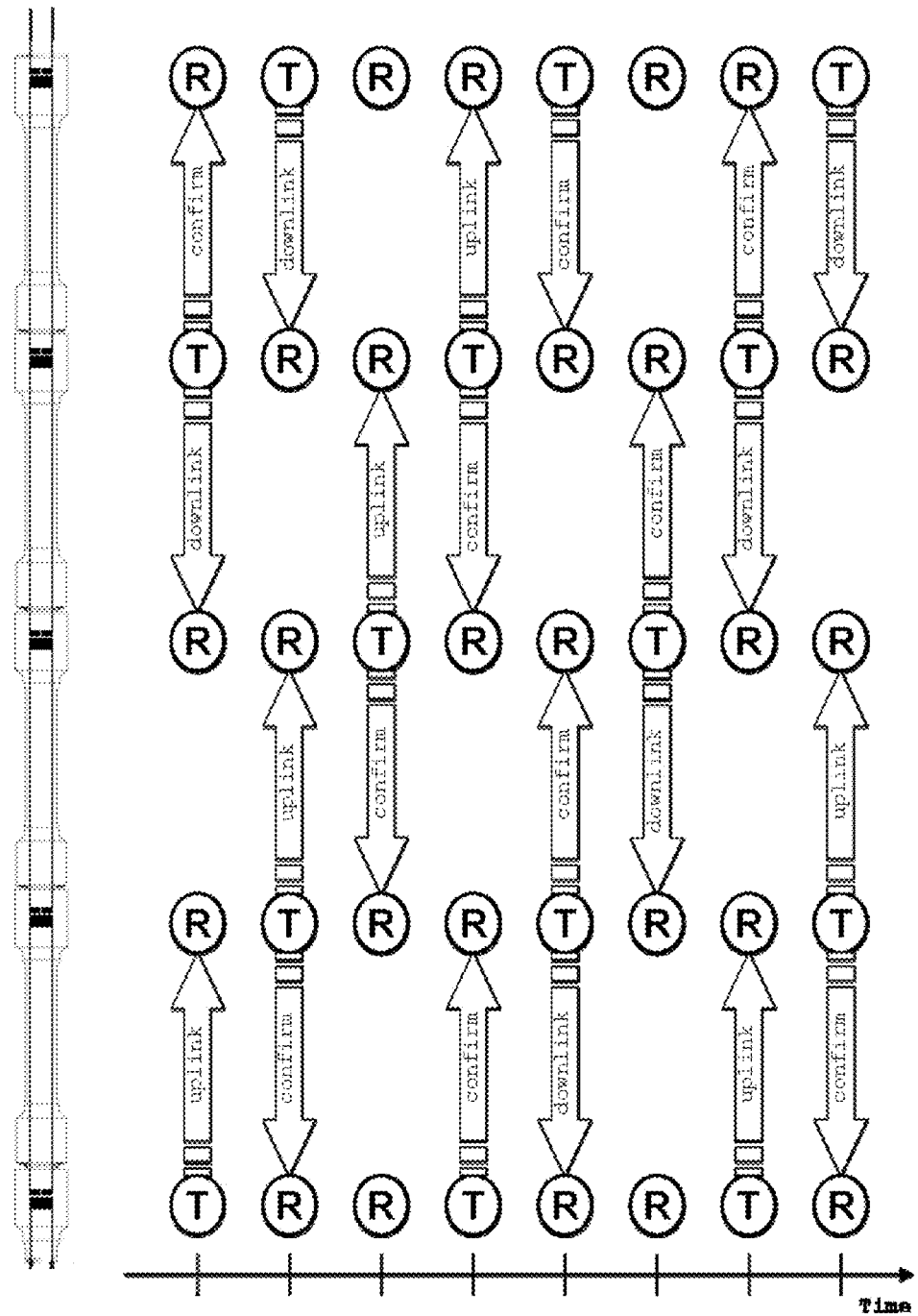
FIG. 53 shows the transmission of data packets through the transmission system at high data rates in bidirectional mode.

FIG. 53 introduces full bidirectional data transfer. The total transmission capacity has been split 50:50 between uplink and downlink capacity, resulting in uplink/downlink rates of one packet per 6 milliseconds. This mode is asymmetric with respect to transmission speed and latency: uplink occurs at a rate of 1 hop per millisecond, equal to 10 km/s, but the downlink requires 5 milliseconds per hop, equal to 2 km/s. Obviously, by simply turning the diagram on its head, the downlink could be made the faster direction, with the uplink being the slower direction. The downlink transfer handles both user data such as commands to downhole equipment, but also plays a role in end-to-end network control functions between the surface communications sub and the downhole interface sub. Such network control functions are data rate adjustments, switches between bi- and unidirectional modes and the handshaking procedure after the physical connection between surface sub and downhole sub has been established.

FIG. 54 shows a pipe string in the process of new pipe being added at the surface. The downhole interface sub keeps the network synchronized by sending test data packets through the pipeline. These test packets stall at the orphaned repeater, which sends out beacon signals in an attempt to attract new repeaters to the network. The beacons are short packets without user data, but with timing information necessary to synchronize with the TDMA time slots. In the meantime, the stall condition percolates downwards and reaches the downhole interface sub that keeps track of the stall situation. As soon as a new pipe joint has been added, the new repeater picks up the beacons emitted by the orphaned repeater, synchronizes itself to the pattern and acknowledges the beacon by a short transmission to the orphaned repeater that switches to regular transmissions. The link-up event is also recognized by the surface communications sub, which in response attempts an end-to-end communication with the downhole sub. If successful, the two subs handshake by exchanging control packets, exchange information about the bandwidth required by the user data streams in each direction, further exchange information about network status and jointly determine mode and transfer capacity for the next data transmission period. The mode chosen may range from the basic MWD mode in which the pipeline is configured for bidirectional data transfer and a single packet is uplinked every second, to SWD (seismic-while-drilling) mode, in which large amounts of data is uplinked in unidirectional mode at high data rates.

Figure 55:
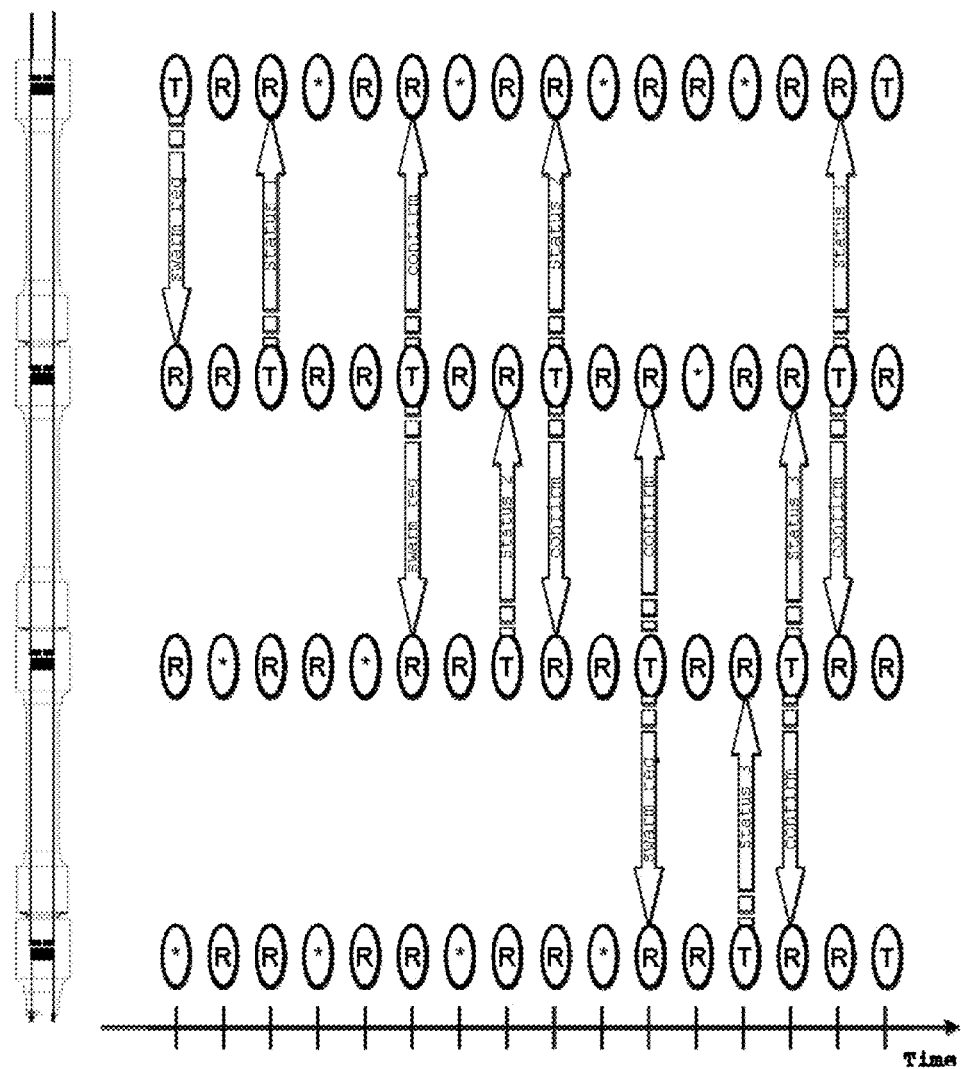
FIG. 55 shows the transmission of data packets in "swarm" mode, in which every repeater reports status and data to the surface.

FIG. 55 shows an implementation of a "swarming" protocol, useful for interrogating a complete network status and/or for collecting distributed sensor data. The surface system sends out a special packet requesting a swarm, which causes each repeater to respond with a status/data message and also to forward another swarm request packet. As the request packet travels downhole, a "swarm" of response packets travels uphole with the net result that the surface receives a stream of status messages, where each message corresponds to the status of one network node.

The forgoing discussion has been purposefully simplified by assuming only one repeater per pipe joint. In reality, there are 2-3 repeaters operating in parallel per pipe joint to implement a fully redundant network. It is advantageous to evenly distribute the transport workload across all repeaters that are available. That way, the failure of a single repeater becomes immediately known throughout the network and corrective action can be taken. This capability is implemented using the channel concept. As already mentioned, a channel is a logical communications link between downhole and surface that exists independent of other links. The primary (highest-priority) uplink connection is Channel 0 and the primary (highest-priority) downlink connection is Channel 1. The number of channels is arbitrary; however, the most practical number is the redundancy parameter m (i.e., the number of repeaters per repeater housing) times the number of directions, i.e. 2. If, for example, m=3, then a good number of channels is 6, numbered 0 (highest priority) to 5 (lowest priority). In the example of full-speed unidirectional uplink, the three repeaters take turns handling consecutive packets. The control bits contained in each packet indicate the channel number, which in turn directs the packet to its managing repeater and also indicates priority and up/down direction. By examining a single data packet, a repeater can tell which channel the data packet belongs to. Since channels follow a strict round-robin time schedule, this information is sufficient to synchronize any repeater to the channel timing. Further, every repeater checks the incoming channel number against the repeater's table of channels to determine whether or not it should handle the packet (error-checking and forwarding) or not. These tables are initialized with preferred values that allocate to each repeater an equal share of the workload; however, the tables can be dynamically adjusted. Operational redundancy and failure tolerance are achieved by any repeater's ability to listen-in to channels that are managed by other repeaters. Since channels are independent logical connections, it is possible to have connected channels and broken channels at the same time. Repeaters are programmed to accept beacon signals received during a listen-in period—which indicate a broken channel—and to service that channel if the broken condition persists over a pre-determined time. This latency time differs between repeaters based on their initial channel allocations and current workloads, thereby avoiding a race condition in channel pick-up.

Figure 56:
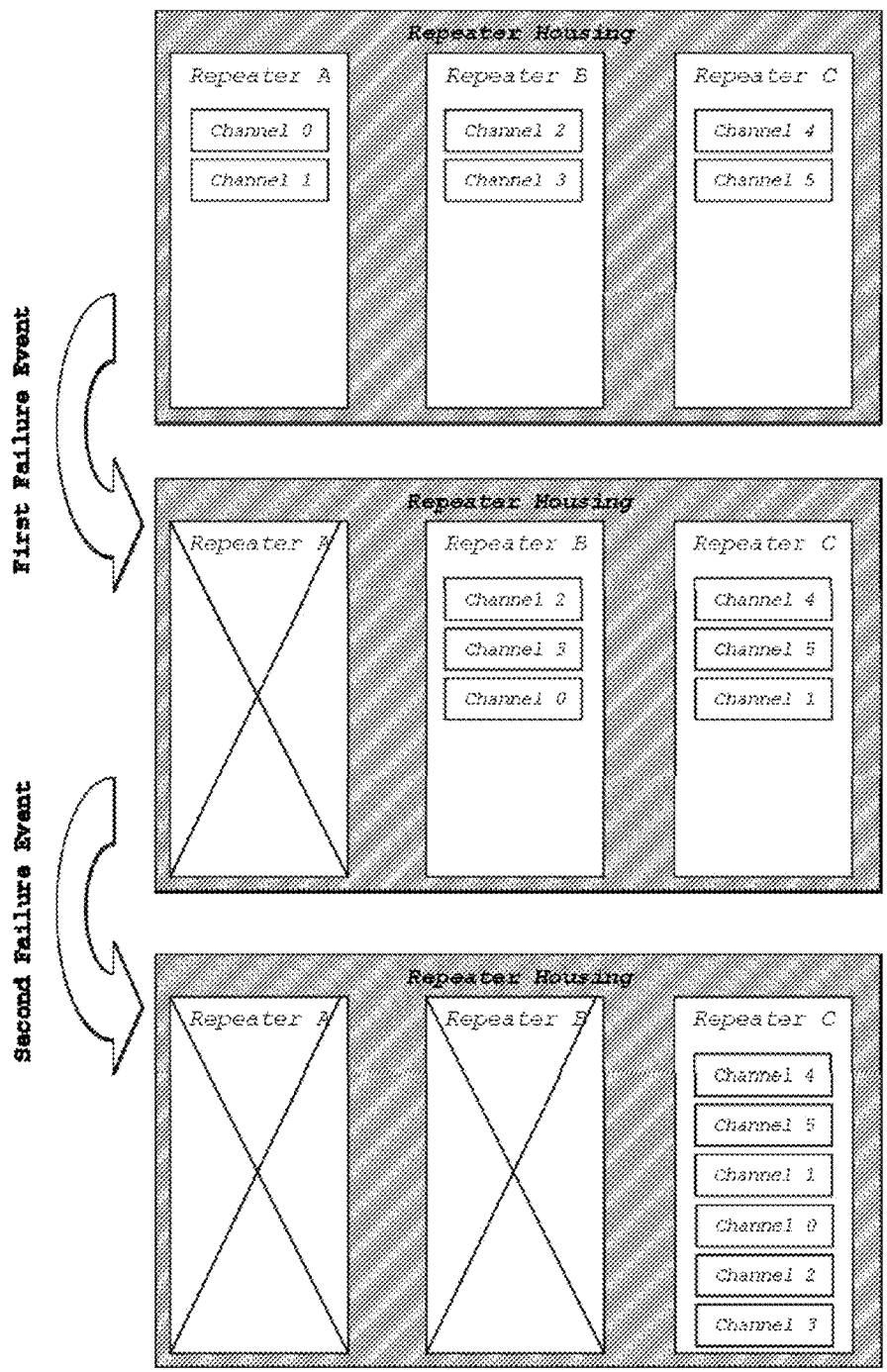
FIG. 56 depicts the series of events that occur when one or more repeaters located in the same repeater housing fail.

FIG. 56 shows the sequence of events during partial failure of repeaters. FIG. 56, top, is the normal state in an m=3 repeater group. Channels 0 (uplink) and 1 (downlink) are allocated to Repeater A, Channels 2 and 3 are routed through Repeater B and Channels 4 and 5 go through Repeater C. In FIG. 56, center, a sudden, total failure in Repeater A is assumed, an event that breaks Channels 0 and 1. Therefore, a "broken pipe" condition exists in Channels 0 and 1, while Channels 2-5 continue to operate. After the number of attempted repeat packet transmissions has been exhausted, the last working repeater or repeaters transmitting on Channels 0 or 1 begin to send out beacons in an attempt to find working repeaters. The chain of beacons is intercepted by Repeaters B and C during their listen-in periods. Repeater B is the next in line for service and responds to the beacon exactly like a fresh repeater in a newly-added pipe joint would. Repeater B adds Channel 0 to its table of channels and starts regular service on Channel 0, in addition to Channels 2 and 3. The computation of channel pick-up time takes into account the length of the channel list, resulting in Repeater C to react first to the beacons that are still sent out on Channel 1. So, in return, Repeater C picks up Channel 1 and acknowledges the start of service, resulting in the new configuration shown in FIG. 56, center. The first packet transmitted through the channel that has been picked up is a network service packet that describes what has happened in terms of which repeater has picked up which channel, including the serial number of the pipe joint the event has occurred in. This packet is processed by the communications sub or interface sub at the receiving end, logged and is reflected back to the other end of the network. At the surface, the hardware failure is logged, formatted as an operator alert and transmitted over the rig network. Although the breakdown of a single repeater is a "soft" failure that does not immediately require intervention, the affected pipe joint is tagged for removal and service at the next opportunity. The sequence of events described above repeats itself in case another failure on the same group of repeaters occurs. As shown in FIG. 56, bottom, assuming Repeater B has broken down as well, Repeater C goes through the same motions by picking up all broken channels in beacon mode and starts managing the entire workload consisting of Channels 0-5.

Figure 57:
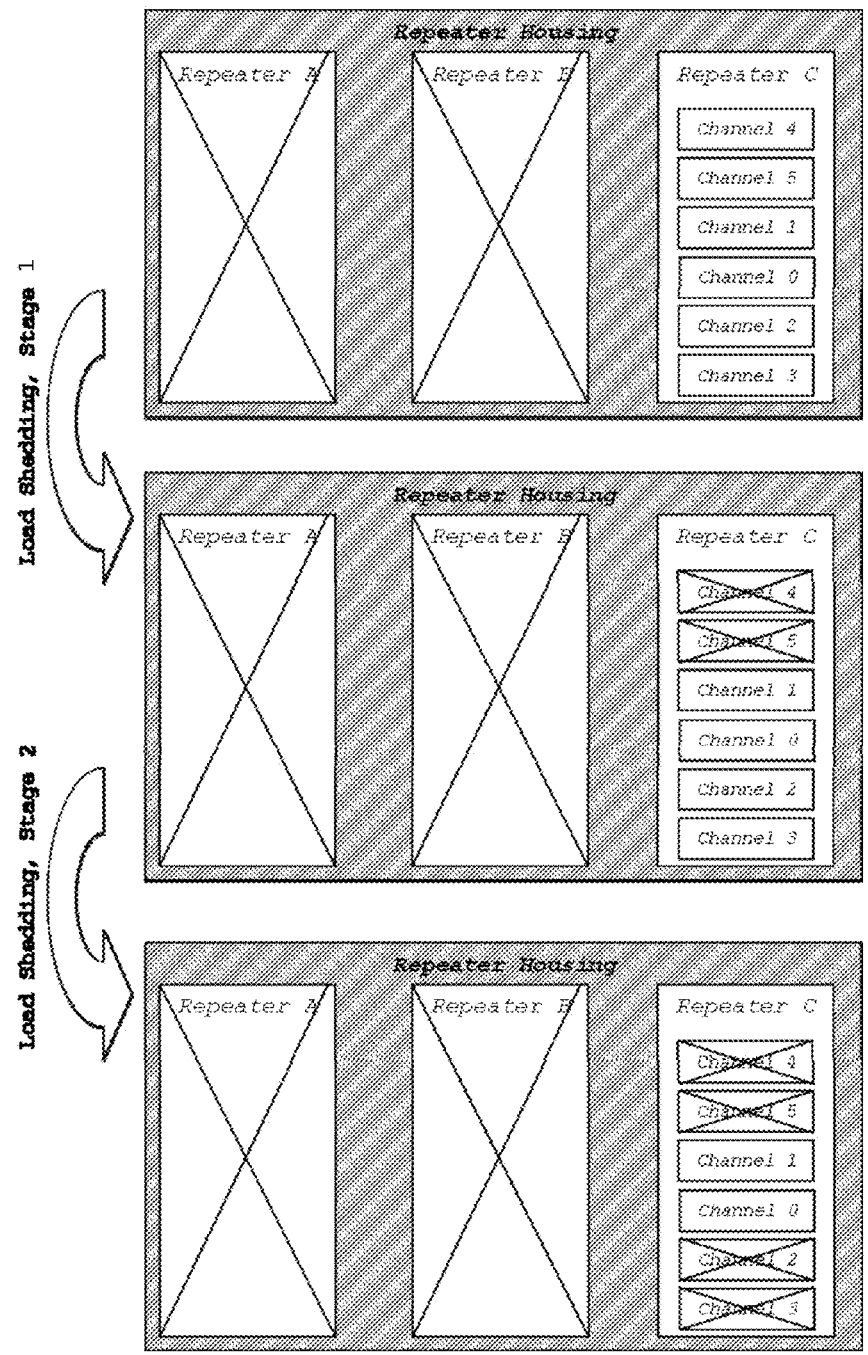
FIG. 57 depicts the series of events that occur when a single repeater sheds transmission workload in order to increase the repeater's expected service lifetime.

The doubled or tripled workload per repeater results in faster depletion of the working repeater(s)' batteries. The repeater's MPU continuously monitors battery status by measuring battery voltage under load and also estimates remaining battery life based on the history of workload and temperature profiles over past times. If the MPU's battery maintenance algorithm indicates that the battery charge becomes critical, load shedding occurs. This process is shown in FIG. 57 using the same triple-repeater example shown in FIG. 56. The tripled workload, accumulated over time, has stressed Repeater C to the point where successful completion of the current downhole run at full data rate may not achievable (FIG. 57, top). Repeater C examines its channel table in an attempt to reduce the workload. Starting at the highest-numbered, lowest-priority channels, Repeater C sends out a maintenance packet indicating the impending shutdown of a certain channel, which it identifies by channel number. The communication interfaces immediately respond by taking that channel off-line, i.e. stop scheduling transmissions on that channel. Repeater C proceeds to purge the channel from the channel list and will no longer respond to packets that occur in that channel's time slot. Channel shedding continues until a more stable operating point is found (FIG. 57, center)). A severely stressed repeater will service only Channels 0 (uplink) and 1 (downlink) as shown in FIG. 57, bottom. The capability of channel shedding enables repeaters to throttle the data throughput and therefore manage their battery current drain to a certain amount. Since the communication subs are fully aware that a stressed repeater is shedding capacity, they will further assist that repeater by throttling the data rates at their respective ends and reducing the per-channel throughput based on priority information supplied with the user data.

Figure 58:
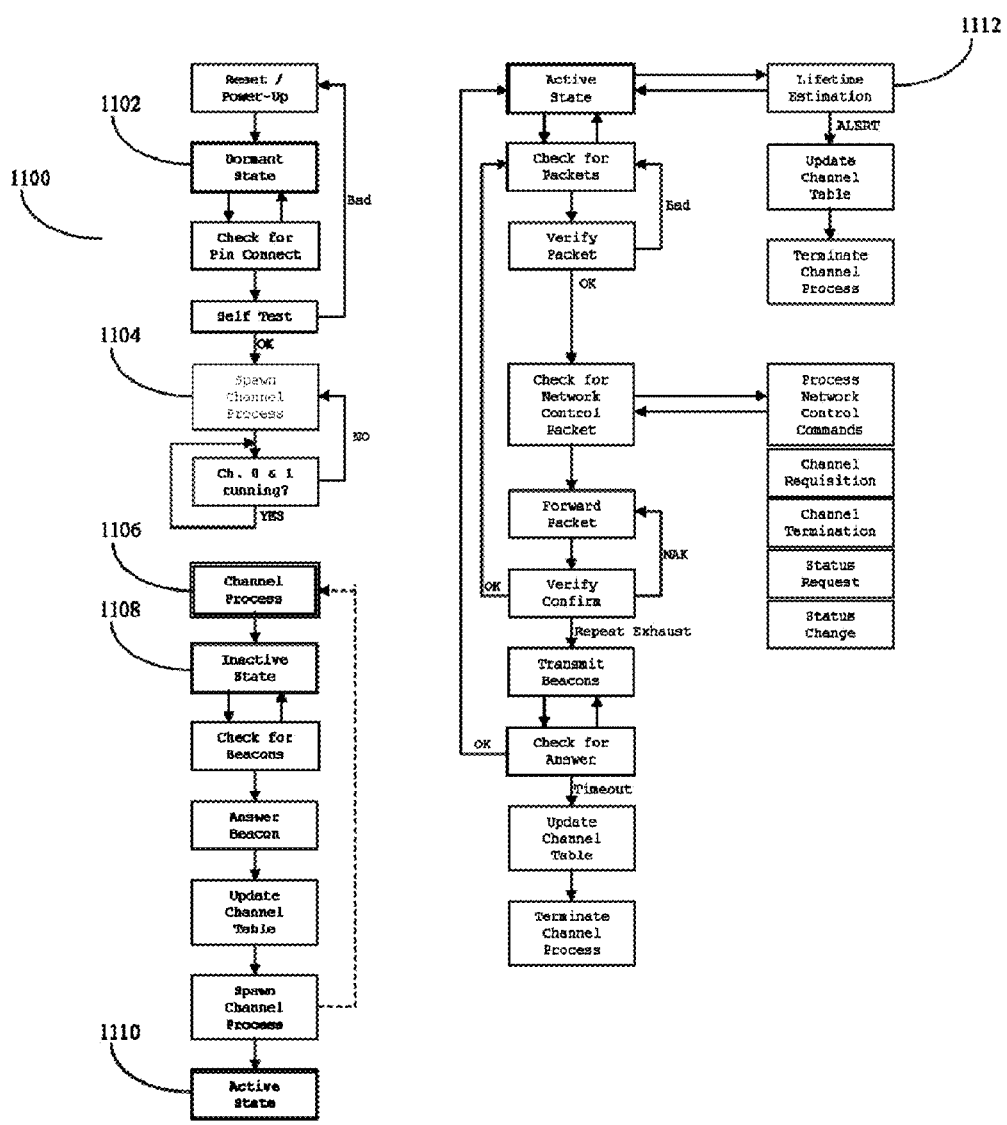
FIG. 58 is a simplified flow diagram of a repeater's operation.

FIG. 58 is a simplified flow diagram of a repeater's operation meant to illustrate the aforementioned operational concepts. The repeater's firmware program 1100 starts from power-up entering the low-power Dormant State 1102. While dormant, the repeater checks every few seconds for a connection-made-up condition by measuring the resonance frequency of the electrode tank circuit 550. If the resonance frequency indicates that no ground connection is present, the Dormant State 1102 continues. In the presence of a ground connection, indicating that a pin thread is contacting the repeater housing, the program starts ("spawns") the Channel Process at 1104. A single channel process can serve a single transmission channel and therefore typically runs in multiple copies on the same repeater. The Channel Process 1106 first enters the low-power Inactive State 1108. While inactive, the Channel Process 1106 checks for beacon signals by periodically turning on the repeater's receiver. Without a beacon received, the Inactive State 1108 continues. It is important to note that a data packet cannot trigger an exit from the Inactive State 1108; only a beacon can. If a valid beacon is detected during the time frame allocated for the specific channel is received, the beacon is answered by sending back an acknowledgement signal, the channel is marked as active and the currently running channel process spawns another copy of itself. That copy starts monitoring the next channel as per channel table. In the meantime, the original channel process enters the Active State 1110. While active, the channel process operates the channel by watching for data packets, verifying their integrity, correcting bit errors if possible and forwarding correct packets. If a packet is corrupted beyond repair, the channel process does not forward it, which is equivalent to not sending a confirmation back to the originating repeater. In this case the current channel process expects the originating repeater to re-send a copy of the data packet several times and attempts to decode those copies as they are being received. Likewise, a forwarded packet requires confirmation from the next repeater. The channel process maintains a copy of the packet being forwarded and repeats its transmission should no confirmation been sent back. This loop continues for about 10-20 retries, after which the current data packet is discarded. The channel process proceeds to send out a string of beacon signals to signal a persistent problem with the channel. If another repeater in the next pipe joint is available to take on this channel, it will do so at this point. Otherwise, the string of beacons is terminated after a time-out period, an error packet is sent back through the network using one of the remaining channels and the channel is closed by terminating the current channel process. The only channels that cannot be closed in this fashion are the basic channels 0 for uplink and 1 for downlink. While active, the channel process is also responsible for assessing the remaining battery lifetime and the overall health of the repeater's hardware at 1112. If the repeater's history, the battery's voltage, the temperature profile and the current workload indicate that the repeater may not live through the current deployment cycle, it will start shedding channels (except 0 and 1) by notifying the network and by shutting down the associated channel processes.

The data transmission system is designed for up to 2,000 downhole service hours or one year, whatever comes first, before the batteries in the repeater housings need to be replaced. 2,000 service hours correspond approximately to 100 drilling days or to 50,000 feet of drilled hole. Of those 50,000 feet, it is assumed that 40,000 feet are not in reservoirs, require a data rate of 100 bps, and 10,000 feet are in reservoir zones, requiring a data rate of 1,000 bps. Thus, the total number of bits transmitted during a service interval is 100 bps×3600 sec/hr×1600 hrs+1000 bps×3600 sec/hr× 400 hrs=2 gigabit. The number of data packets processed is 40 million, if one data packet carries about 50 payload bits. Further, it is assumed that two repeaters per pipe joint (m=2) are used and equitable workload distribution is provided such that the total number of data packets processed per repeater is 20 million. The current consumption of a repeater strongly depends on its activity level. With the analog frontends turned off and the MPU in sleep mode, the electronics power consumption is close to the battery self-discharge rate. In Active Mode and during intervals when the MPU is processing data packets, the MPU consumes an estimated 5 mA. Transmitter and receiver, when turned on, consume an additional 5 mA each. Each data packet requires reception, transmission and confirmation for a total of 3 ms. Therefore, the electric charge consumed by processing a data packet is about 30 microcoulomb. The electric charge consumed during the entire service interval is 30 microcoulomb/packet×20 million packets=600 coulombs or 0.17 Ah. In addition, non-productive time is necessary to establish and to monitor communications by transmitting and receiving beacon signals. The bulk of this non-productive time occurs when pipe joints are assembled in stands—i.e. with connection made—and the repeaters listen for beacon signals in their inactive states. This activity costs 10 mA for 1 ms every second or a total charge of 0.01 Ah over a maximum of 1,000 hours. Beaconing is a power-intensive activity for a short time period, but occurs only very infrequently on the level of an individual repeater. Its contribution to the energy budget can be estimated as another 0.01 Ah. The repeaters also require quiescent current for their periodic power-up, whether or not they are in service. This current drain is about 10 mA for 1 millisecond every 10 seconds, equivalent to a constant 1 microampere. Over the course of one year, this drain accumulates to a charge of 0.01 Ah.

The Electrochem 10-25-150 lithium cell has a rated capacity of 0.5 Ah at a discharge current of 2 mA. The cell loses about 0.1 Ah in capacity when discharged with 2 mA for 200 hours at 150° C. This loss is equivalent to an extra current drain of 500 microampere. Below about 100° C., the self-discharge current is relatively small; between 100° C. and 150° C., and a linear relationship between temperature and discharge current is assumed.

Figure 59:
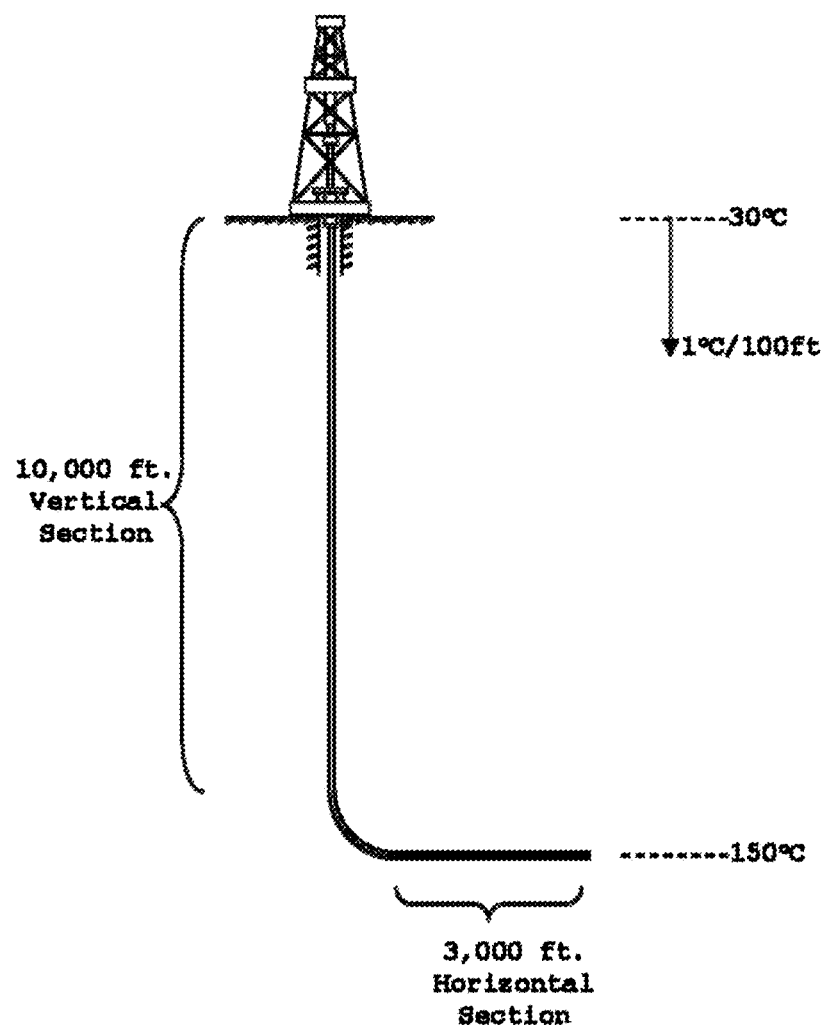
FIG. 59 is a diagram of an example wellbore layout.

FIG. 59 shows an example well layout used to calculate a worst-case temperature profile. Given a typical earth temperature gradient of 1° C./100 ft. and a typical well profile of 10,000 ft. vertical, 2,000 ft. build-out and 3,000 ft. horizontal, a simplified temperature profile for the bottom repeater of 20 days below 100° C. and 10 days at 150° C. can be assumed. The battery charge lost due to self-discharge is then approximately 0.12 Ah or about 25% of the rated capacity. The battery charge expended on actual work is 0.19 Ah/3=0.06 Ah, leaving a remainder of 0.32 Ah in the battery. It can be further assumed that on the next well the pipe joints will be shuffled such that the repeaters having experienced worst-case bottom-hole conditions will remain in the upper portion of the well and at temperatures below 100° C. This "low"-temperature deployment cycle will reduce the battery charge by another 0.06 Ah to 0.26 Ah, which is sufficient for one more high-temperature cycle costing 0.18 Ah. These assumptions are not valid for repeaters installed in collars, since the collars as part of the BHA experience high temperatures on every well. The collar repeater batteries lose 25% of their nominal charge per well and need to be replaced on every other well under nominal operating conditions: two deployments consume, including self-discharge, 0.36 Ah or 72% of the battery's capacity.

The preceding discussion focused on possible failures in the repeaters. Equally important are failures in the transmission lines. As already discussed, the electrical coupling between repeaters and the electrodes is weak with the advantage that a failed transmission segment is only seen as an incremental load against ground. The particular failure, i.e. an open circuit or a short against ground, and the location of the failure along the electrodes and/or transmission lines determine the nature of load, which can be capacitive or inductive. From the repeater's point of view, a broken transmission segment and an operating transmission segment in parallel manifest themselves as a drop in received signal strength (RSS) of approximately 6 dB, i.e. one-half of the original signal strength. In the case of doubly-redundant transmission elements, the RSS drops to ⅔ (−3.6 dB) for a single hardware failure and to ⅓ (−10 dB) for a double hardware failure. As shown earlier, the worst case of a highly conductive medium and a short to ground result in a receiver voltage about 30 times stronger than the noise r.m.s. voltage. By taking the absolute minimum RSS as three times the noise voltage, it is found that the system operates at or above a 20 dB signal-to-noise margin. Thus, a loss of 66% in RSS still allows the system to function. As an added safeguard, each pair of repeaters experiencing low RSS may elect to communicate at a reduced data rate. As an example, sending each bit not just once, but in 10 copies allows the receiving repeater to average over 10 bit intervals and to recover an additional 10 dB in signal-to-noise margin, i.e. the amount lost in a double failure. This process is a simple example of signal recovery through digital filtering with the benefit that the receiver filters realized in hardware do not need to be changed.

It is desirable to immediately detect and diagnose not only repeater failures but also transmission line failures. For this reason, every repeater calculates a received signal strength indicator (RSSI), which is stored on-board all repeaters as part of the history log. The two RSSI values for the uplink direction and for the downlink direction are also part of the status messages that are collected periodically from all repeaters by the surface communications sub. A failed transmission line segment manifests itself by two repeaters separated by a single pipe joint length that show lower RSSI levels for downlink and for uplink, respectively, compared to the RSSI levels pointing away from the failed line segment. This pattern immediately points to the pipe joint containing the failed transmission line segment. The pattern of a failed transmission line is best recognized by the surface interface that periodically sends a "swarm" request down the communications pipeline. As discussed above, such a global status request traveling down the pipe triggers a status response from each repeater, resulting in a swarm of status packets arriving at the surface. This maintenance procedure is repeated every 1-10 minutes. The surface system analyzes the totality of all status responses, flags all "soft" and "hard" failures and presents a unified system health status to the operator. The system health status includes a list of pipe joints that should be replaced at the next opportunity and an estimate of remaining operating time based on history and current usage. If the estimated remaining time is too low for successful completion of the current job, the surface system takes preventive action by requesting reduction in data throughput from the downhole interface.

A further advantage of the data transmission system is the automatic detection and calculation of drill string length. In current rig operations, the number of pipe joints added to the drill string is often recorded manually, leading to omissions and therefore errors in calculations of total depth and true depth. In the system described above, every repeater has in memory the actual pipe joint length as part of the maintenance and repair records. These values can be easily recalled during operation and added up to calculate the current, actual drill pipe length.

Figure 60:
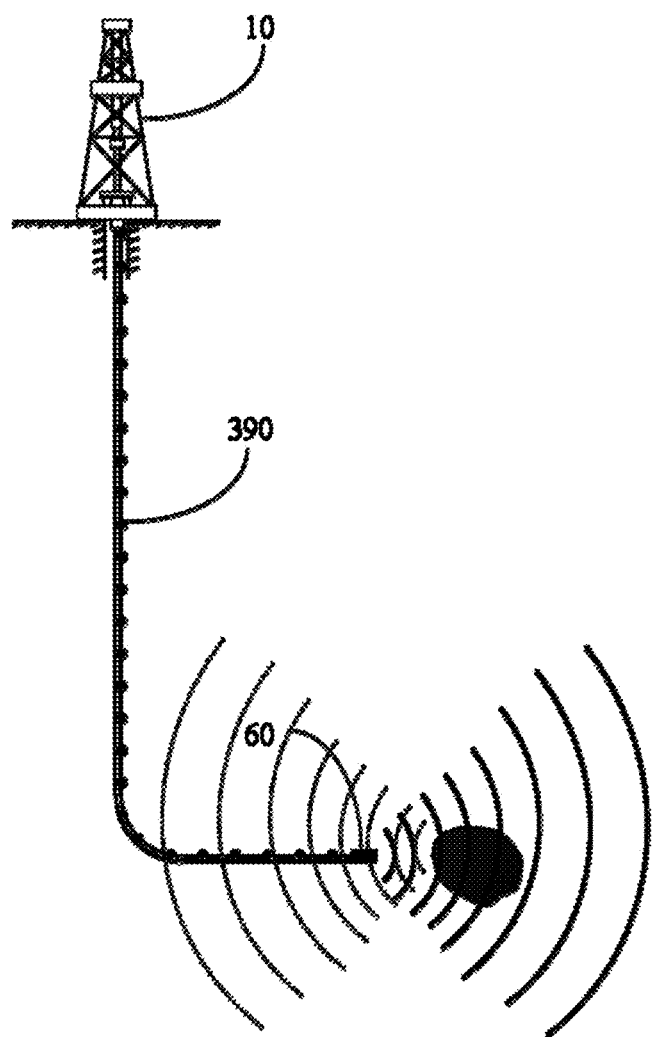
FIG. 60 is a conceptual diagram showing distributed sensors picking up and processing seismic waves arising from acoustic drill bit noise.

FIG. 60 shows a drill string instrumented with the data transmission system and the optional sensor inserts 390, located in pipe joints 30 and/or sensor subs 395. A typical drill string of 15,000 ft. length contains about 500 pipe joints or collar joints, which translates to 500 measurement points distributed along the drill string. In the example of FIG. 60, the sensors are geophones listening to the noise emanating from the drill bit 60 during drilling. These sounds travel through the rock and are partially reflected at boundaries where the acoustic impedance changes. Such acoustic targets may be indicative of hydrocarbon bearing zones, rock beds or cavities. The data gathered by the geophones correspond to multiple acoustics paths through the formation and can be used to solve by inversion for an acoustic impedance map around the borehole, thus illuminating portions of the underground formations not penetrated by the borehole.

Figure 61:
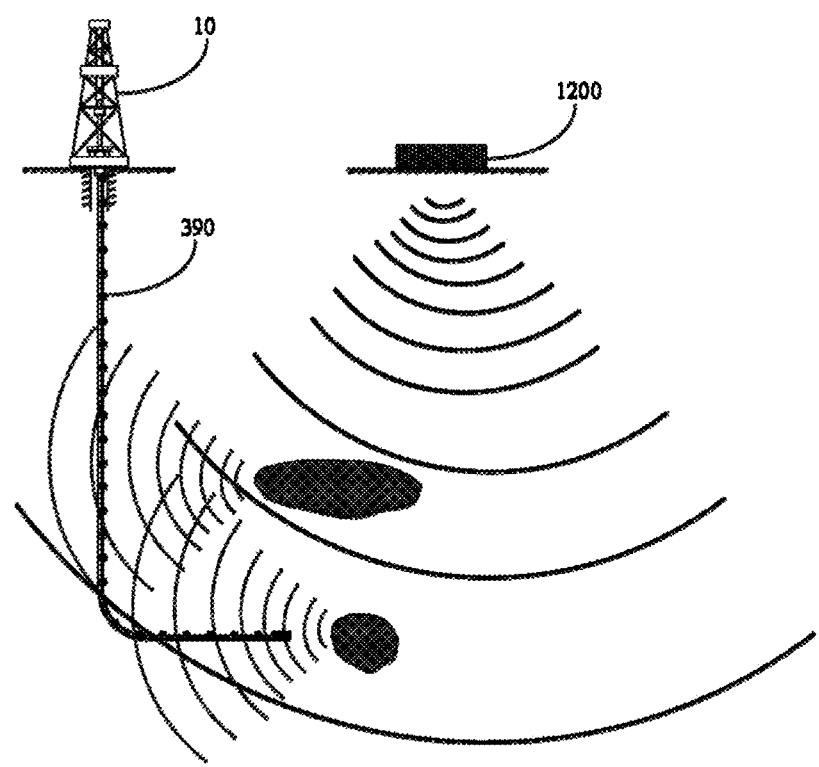
FIG. 61 is a conceptual diagram showing distributed sensors picking up and processing seismic waves through the earth formation from a seismic transmitter at the surface.

FIG. 61 illustrates a similar principle using the drill string as distributed sensor array, but in this case a dedicated seismic surface source 1200 is used instead of the bit noise. The advantage are the known power density function of the transmitter and the ability to gather both reflective and transitive transmission properties as the acoustic wave travels through the rock formations. Similar techniques have long been used in wireline logging and are known as Vertical Seismic Profiling (VSP). The key difference between VSP and the present invention is the ability to conduct seismic surveys at any time during brief intervals between drilling activity, e.g. every time another drill joint is added. In contrast, VSP is a survey that runs on wireline after a well has been drilled. VSP uses a limited number of wireline-mounted geophones, requiring repetitive operations at different stations in the borehole. In contrast, the present invention gathers seismic data along large sections of the borehole at fine resolutions, using a minimum of or no additional rig time.

Figure 62:
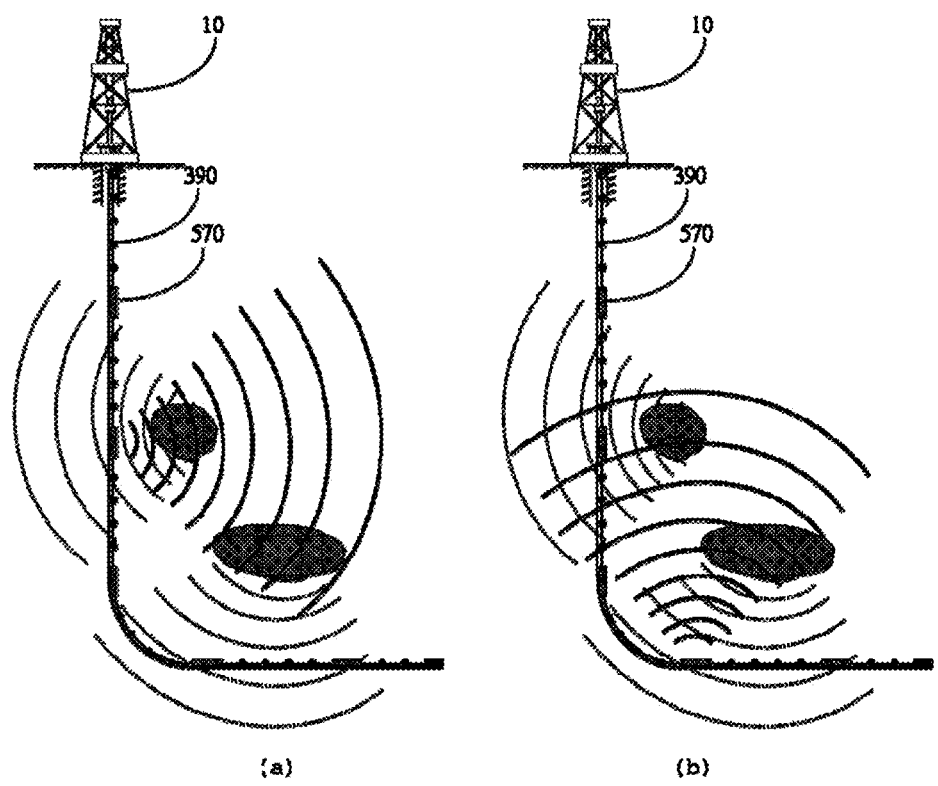
FIG. 62(a)-(b) is a conceptual diagram showing distributed sensors picking up seismic waves through the earth formation from acoustic transmitters located on in-string instrumentation subs.

FIG. 62 shows a drill string instrumented with geophones 390—possibly located in sensor subs/inserts 395—and with seismic sources housed in instrument subs 570. The cartoons FIG. 62a and FIG. 62b illustrate different phases in the firing sequence of the seismic sources. The sources are fired sequentially with all geophones 390 listening to each seismic event. The received forwarded and reflected waves are indicative of the acoustic impedance map of the surrounding rock. This map can be approximately calculated by inverting the received seismic waveforms, a process that may lead to the identification of hydrocarbon accumulations in the vicinity of the borehole.

Figure 63:
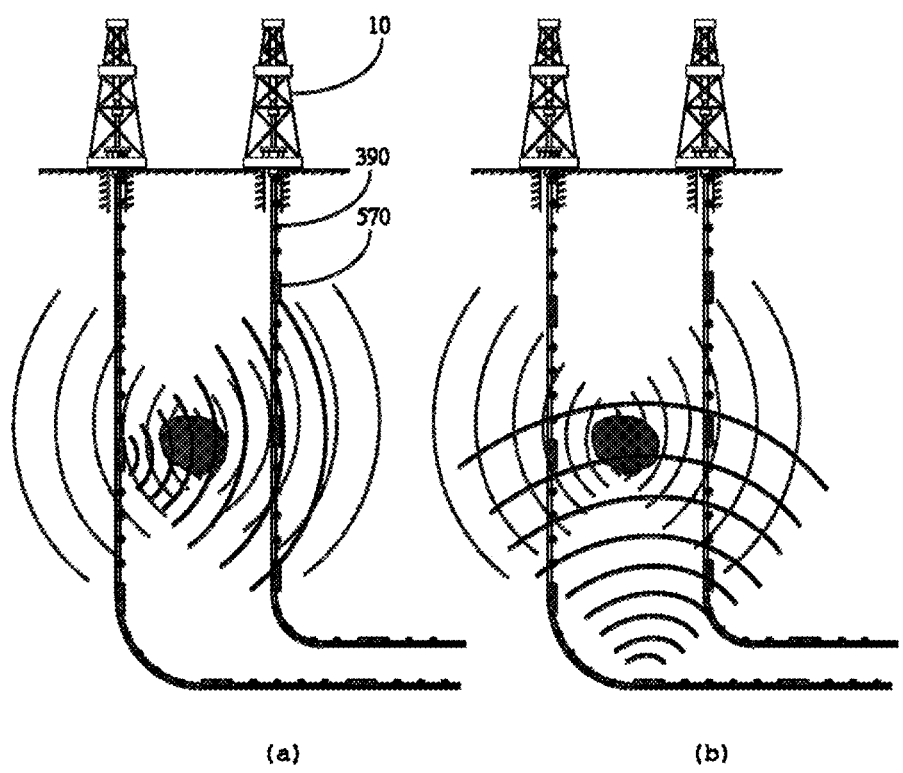
FIG. 63(a)-(b) is a conceptual diagram showing distributed sensors picking up seismic waves through the earth formation from acoustic transmitters located on in-string instrumentation subs in the same or in an adjacent well.

FIG. 63 shows the situation of two adjacent boreholes, a situation useful for increasing the drainage rate of a reservoir or for gravity-assisted drainage. Both wellbores are instrumented similar to the single wellbore of FIG. 62. In addition to receiving signals from sources located in the same wellbore as the receivers, the acoustic waves transverse the rock space between the wellbores and are received in the adjacent well. FIGS. 63a and 63b picture two phases in the serial firing sequence of the seismic sources. This technique, known as cross-well tomography greatly benefits from the large number of sensors (1,000 or more in this case) made available by the data transmission system.

For all seismic examples shown in FIGS. 60-63 it is essential that each local geophone 390 can determine the arrival of seismic waveforms in terms of "absolute" time, i.e. the delay after a seismic surface source or a source located in an instrument sub or the BHA has been fired. As discussed earlier, time information is distributed at least once every second throughout the data transmission system. Although it takes the time information up to a second or more to travel through the data transmission system, each node can reconstruct absolute time from the number of transmissions the heartbeat packet has undergone. Overall, the entire data transmission system and therefore every repeater and every sensor insert or sensor sub remain synchronized to known or "absolute" time to within 0.1 ms. Given a representative speed of sound in a formation of 5,000 m/s, the time uncertainty translates to a distance uncertainty for seismic mapping of 0.5 m.

Using the data transmission system as a high-density distributed receiver system as described in the foregoing discussion represents a step-change over previous attempts to distribute sensors along a drill string, the main difference being that instead of receivers spaced several thousand feet apart as discussed in the literature, the receiver array as part of the present data transmission system consists of hundreds of nodes that are only 30 ft. (10 m) apart from their next neighbors. The resulting high-resolution sampling allows for precise back projection of the received time-domain data into the rock space adjacent to a borehole or between boreholes with spatial resolutions of, e.g. bed boundary locations, improved by 1-2 orders of magnitude.

It should be understood that this invention is not limited to the particular embodiments disclosed, but it is intended to cover modifications within the spirit and scope of the present invention as defined by the appended claims. All such aspects of the invention are intended to be covered by the appended claims.

I claim:

1. A downhole signal transmission system for providing communications along a string of downhole components comprising a plurality of interconnected downhole components having rotary connections, comprising:
  a plurality of signal repeaters spaced along said string of downhole components, said signal repeaters being receptive to radiofrequency signals having information modulated thereon, and
  a concentric repeater housing arranged concentrically around the inner periphery of one of said interconnected downhole components, the repeater housing holding electronic components,
  wherein at least one of said rotary connections is adapted to accept said repeater housing, and
  wherein said repeater housing is under compressional force when said adapted rotary connection is in a tightened state.

2. A downhole signal transmission system as in claim 1, wherein said adapted rotary connection is of the single-shouldered type.

3. A downhole signal transmission system as in claim 1, wherein said adapted rotary connection is of the double-shouldered type.

4. A downhole signal transmission system as in claim 1, wherein said downhole components comprise one or more of the following: pipe joints, pup joints, drill collars, heavyweight pipe, jars, kellys, subs, saver subs, crossover subs, instrumentation subs, sensor subs, interface subs, communication subs and/or checkout boxes.

5. A downhole signal transmission system as in claim 1, wherein the frequencies of said radiofrequency signals are in a range from 1 MHz to 1 GHz.

6. A downhole signal transmission system as in claim 1, wherein stopping action provided by said repeater housing and said compressional force keeps said adapted rotary connection from being over-torqued.

7. A downhole signal transmission system as in claim 1, wherein said signal repeaters are arranged in said string of downhole components whereby a failure of one or more of said signal repeaters does not inhibit the transmission of said radiofrequency signals through said string of downhole components.

8. A downhole signal transmission system as in claim 7, wherein the number of said signal repeaters is substantially larger than the number of signal repeaters necessary to receive and transmit data.

9. A downhole signal transmission system as in claim 1, wherein said radiofrequency signals are modulated with said information using on-off keying.

10. A downhole signal transmission system as in claim 1, wherein said information is transmitted in packets.

11. A downhole signal transmission system as in claim 1, wherein said information is transmitted in bursts.

12. A downhole signal transmission system as in claim 1, wherein said radiofrequency signals are modulated with information identifying a particular downhole component and information regarding said particular downhole component is communicated along said string of downhole components using said plurality of signal repeaters.

13. A downhole signal transmission system as in claim 1, wherein said radiofrequency signals are modulated with information identifying a particular signal repeater and information regarding said particular signal repeater is communicated along said string of downhole components using said plurality of signal repeaters.

14. A downhole signal transmission system as in claim 1, further comprising a sensor that communicates with at least one of said signal repeaters.

15. A downhole signal transmission system as in claim 14, wherein said sensor comprises at least one of the following: an accelerometer, a temperature sensor, a pressure sensor, a geophone, an acoustic sensor and an electric current sensor.

16. A downhole signal transmission system as in claim 14, wherein said sensor investigates properties of a formation adjacent the borehole.

17. A downhole signal transmission system as in claim 14, wherein said sensor investigates properties of an outer borehole annulus.

18. A downhole signal transmission system as in claim 14, wherein said radiofrequency signals are modulated with information identifying a particular sensor and information regarding said particular sensor is communicated along said string of downhole components using said plurality of signal repeaters.

19. A downhole signal transmission system as in claim 1, further comprising a sensor downhole component with at least one sensor, said sensor downhole component being connected in said string of downhole components so as to enable communications of sensor signals along said string of downhole components using said plurality of signal repeaters.

20. A downhole signal transmission system as in claim 19, wherein said sensor comprises at least one of the following: an accelerometer, a temperature sensor, a pressure sensor, a geophone, an acoustic sensor and an electric current sensor.

21. A downhole signal transmission system as in claim 19, wherein said sensor investigates properties of a formation adjacent the borehole.

22. A downhole signal transmission system as in claim 19, wherein said sensor investigates properties of an outer borehole annulus.

23. A downhole signal transmission system as in claim 1, further comprising an in-line instrument sub that is connected between respective downhole components in said string of downhole components and configured to gather data along the borehole and/or to transmit stimuli that can be received along the string of downhole components by at least one sensor.

24. A method of providing communications along a drill string of downhole components comprising a plurality of interconnected downhole components having rotary connections, comprising the steps of:
  generating radiofrequency signals having information modulated thereon;
  providing a plurality of signal repeaters spaced along said drill string of downhole components, said signal repeaters being receptive to said radiofrequency signals;
  providing a concentric repeater housing arranged concentrically around the inner periphery of one of said interconnected downhole components, the repeater housing holding electronic components; and
  tightening at least one of said rotary connections to said repeater housing such that said repeater housing is under compressional force when the at least one rotary connection is in a tightened state.

25. A method as in claim 24, wherein the frequencies of said radiofrequency signals are in a range from 1 MHz to 1 GHz.

26. A method as in claim 24, further comprising keeping said rotary connection with said repeater housing from being over-torqued by providing stopping action from said repeater housing and said compressional force.

27. A method as in claim 24, further comprising arranging said signal repeaters in said string of downhole components whereby a failure of one or more of said signal repeaters does not inhibit the transmission of said radiofrequency signals through said string of downhole components.

28. A method as in claim 27, wherein the number of said signal repeaters is substantially larger than the number of signal repeaters necessary to receive and transmit data.

29. A method as in claim 24, wherein generating said radiofrequency signals includes modulating said radiofrequency signals with said information using on-off keying.

30. A method as in claim 24, further comprising transmitting said information in packets.

31. A method as in claim 24, further comprising transmitting said information in bursts.

32. A method as in claim 24, wherein generating said radiofrequency signals comprises modulating said radiofrequency signals with information identifying a particular downhole component and communicating information regarding said particular downhole component along said string of downhole components using said plurality of signal repeaters.

33. A method as in claim 24, wherein generating said radiofrequency signals comprises modulating said radiofrequency signals with information identifying a particular signal repeater and communicating information regarding said particular signal repeater along said string of downhole components using said plurality of signal repeaters.

34. A method as in claim 24, further comprising providing a sensor that communicates with at least one of said signal repeaters.

35. A method as in claim 34, wherein said sensor comprises at least one of the following: an accelerometer, a temperature sensor, a pressure sensor, a geophone, an acoustic sensor and an electric current sensor, further comprising investigating properties of a formation adjacent the borehole with said sensor.

36. A method as in claim 34, wherein said sensor comprises at least one of the following: an accelerometer, a temperature sensor, a pressure sensor, a geophone, an acoustic sensor and an electric current sensor, further comprising investigating properties of an outer borehole annulus with said sensor.

37. A method as in claim 34, wherein generating said radiofrequency signals comprises modulating said radiofrequency signals with information identifying a particular sensor and communicating information regarding said particular sensor along said string of downhole components using said plurality of signal repeaters.

38. A method as in claim 24, wherein said drill string of downhole components includes a sensor downhole component with at least one sensor, further comprising connecting said sensor downhole component in said string of downhole components so as to enable communications of sensor signals along said string of downhole components using said plurality of signal repeaters.

39. A method as in claim 38, wherein said sensor comprises at least one of the following: an accelerometer, a temperature sensor, a pressure sensor, a geophone, an acoustic sensor and an electric current sensor, further comprising investigating properties of a formation adjacent the borehole with said sensor.

40. A method as in claim 38, wherein said sensor comprises at least one of the following: an accelerometer, a temperature sensor, a pressure sensor, a geophone, an acoustic sensor and an electric current sensor, further comprising investigating properties of an outer borehole annulus with said sensor.

41. A method as in claim 24, wherein said drill string of downhole components includes an in-line instrument sub that is connected between respective downhole components in said string of downhole components, further comprising said in-line instrument sub gathering data along a borehole and/or transmitting stimuli that can be received along the string of downhole components by at least one sensor.

* * * * *